United States Patent
Kim et al.

(10) Patent No.: US 11,471,813 B2
(45) Date of Patent: Oct. 18, 2022

(54) AIR CLEANER

(71) Applicant: LG ELECTRONICS INC., Seoul (KR)

(72) Inventors: Taehyun Kim, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 290 days.

(21) Appl. No.: 16/497,078

(22) PCT Filed: Apr. 26, 2019

(86) PCT No.: PCT/KR2019/005088
§ 371 (c)(1),
(2) Date: Sep. 24, 2019

(87) PCT Pub. No.: WO2020/218652
PCT Pub. Date: Oct. 29, 2020

(65) Prior Publication Data
US 2021/0331112 A1  Oct. 28, 2021

(51) Int. Cl.
*B01D 46/44*  (2006.01)
*F24F 11/63*  (2018.01)
(Continued)

(52) U.S. Cl.
CPC .......... *B01D 46/442* (2013.01); *A47L 9/2805* (2013.01); *A47L 9/2815* (2013.01);
(Continued)

(58) Field of Classification Search
CPC .... A47L 9/2852; A47L 9/2894; A47L 9/2805; A47L 2201/04; A47L 9/2815;
(Continued)

(56) References Cited

U.S. PATENT DOCUMENTS

| | | | |
|---|---|---|---|
| 2002/0095239 A1* | 7/2002 | Wallach | G05D 1/0295 700/245 |
| 2006/0064204 A1* | 3/2006 | Kim | F24F 11/30 700/276 |
| 2018/0279847 A1* | 10/2018 | Park | A47L 9/2868 |

FOREIGN PATENT DOCUMENTS

| CN | 108247647 A | * 7/2018 | .......... A47L 11/4011 |
|---|---|---|---|
| KR | 10-2007-0098024 A | 10/2007 | |

(Continued)

OTHER PUBLICATIONS

KR20180080404A_ENG (Espacenet machine translation of Kim) (Year: 2018).*

(Continued)

*Primary Examiner* — Gabriel E Gitman
(74) *Attorney, Agent, or Firm* — Birch, Stewart, Kolasch & Birch, LLP

(57) ABSTRACT

Disclosed herein is an air cleaner disposed in an indoor space. An air cleaner according to an embodiment includes a blowing device including a suction port and a discharge port, a fan motor configured to generate an air flow, a purifying unit installed inside the blowing device to purify air, a driving portion configured to move the air cleaner, a communication unit configured to communicate with a moving agent moving in the indoor space, and a processor configured to receive status information including at least one of air quality information and dust occurrence information collected by the moving agent, determine a specific zone in which air purification is to be performed using the status information collected by the moving agent, and perform air purification in the specific zone.

11 Claims, 40 Drawing Sheets

(51) Int. Cl.
   *A47L 9/28* (2006.01)
   *B01D 46/00* (2022.01)
   *B01D 46/42* (2006.01)
   *B01D 46/46* (2006.01)
   *B25J 9/16* (2006.01)
   *F24F 8/10* (2021.01)

(52) U.S. Cl.
   CPC ........... *A47L 9/2852* (2013.01); *A47L 9/2894* (2013.01); *B01D 46/0049* (2013.01); *B01D 46/429* (2013.01); *B01D 46/4227* (2013.01); *B01D 46/46* (2013.01); *B25J 9/1664* (2013.01); *F24F 11/63* (2018.01); *A47L 2201/04* (2013.01); *B01D 46/42* (2013.01); *B01D 2273/30* (2013.01); *F24F 8/10* (2021.01); *F24F 2221/42* (2013.01)

(58) Field of Classification Search
   CPC . A47L 2201/06; B01D 46/0049; B01D 46/42; B01D 46/4227; B01D 46/429; B01D 46/442; B01D 46/46; B01D 2273/30; B25J 9/1664; F24F 11/63; F24F 2221/42; F24F 8/80; F24F 2110/00
   See application file for complete search history.

(56) References Cited

FOREIGN PATENT DOCUMENTS

| | | | | |
|---|---|---|---|---|
| KR | 20070098024 A | * | 10/2007 | ........... B01D 46/429 |
| KR | 20070098024 A | * | 10/2007 | ........... B01D 46/429 |
| KR | 10-2017-0086246 A | | 7/2017 | |
| KR | 20170086246 A | * | 7/2017 | ................ A47C 7/02 |
| KR | 10-2018-0017771 A | | 2/2018 | |
| KR | 20180017771 A | * | 2/2018 | ........... F24F 11/0001 |
| KR | 108247647 A | * | 7/2018 | ........... A47L 11/4011 |
| KR | 20180080404 A | * | 7/2018 | ............ B25J 9/1664 |
| KR | 10-1930211 B1 | | 12/2018 | |
| WO | WO 2007/097547 A2 | | 8/2007 | |

OTHER PUBLICATIONS

KR20170086246A_ENG (Espacenet machine translation of Shin) (Year: 2017).*
KR20180017771A_ENG (Espacenet machine translation of Song) (Year: 2018).*
CN108247647A_ENG (Espacent machine translation of Zhang) (Year: 2018).*
KR20070098024A_ENG (Espacenet machine translation of Yim) (Year: 2007).*
CN108247647A_ENG (Espacenet machine translation of Zhang) (Year: 2018).*

\* cited by examiner (a)

(b)

(a)

(b)

(a)

(b)

(a)

(b)

(a)

(b)

(a)

(b)

(a)

(b)

(a)

(b)

AIR CLEANER

CROSS REFERENCE TO RELATED APPLICATIONS

This application is the National Phase of PCT International Application No. PCT/KR2019/005088, filed on Apr. 26 2019, which is hereby expressly incorporated by reference into the present application.

BACKGROUND OF THE INVENTION

1. Field of the Invention

The present invention relates to an air cleaner for determining a zone in which air purification is to be performed using status information collected by a moving agent, and moving to the determined zone to perform air purification.

2. Discussion of the Related Art

Artificial intelligence is a field of computer engineering and information technology that research a method for allowing computers to do thinking, learning, self-development or the like that can be done by human intelligence and means that computers is allowed to imitate human intelligent behavior.

In addition, artificial intelligence has many direct and indirect links with other fields of computer science, rather than exists in itself. Especially, artificial intelligent factors have been introduced in the various field of information technology, and it has been actively attempted to utilize them to solve problems in the field.

On the other hand, techniques for perceiving and learning surrounding environment using artificial intelligence, providing information desired by a user in a desired form, or performing an operation or function desired by the user are being actively studied.

An air cleaner is understood as an apparatus for sucking and purifying contaminated air, and then discharging the purified air. As an example, the air cleaner may include a blowing device for introducing outside air into the air cleaner, and a filter capable of filtering out dust or bacteria in the air.

On the other hand, the air cleaner is an apparatus for keeping air in a predetermined space in a most suitable state according to use and purpose. The predetermined space may be variously proposed depending on a place where the air cleaner is used. As an example, when the air cleaner is installed in a home or an office, the predetermined space may be an indoor space of a house or an indoor space of a building.

Recently, an air cleaner has emerged, which searches for areas with poor air quality while moving and performs air purification.

However, since a single air cleaner performs both the dust detection and the air purification, there may occur a problem that the sensing range becomes narrow.

For example, when the air cleaner is purifying air in a specific area, the air cleaner is not able to sense an air quality in the other areas. In addition, since the sensing range is limited only by the movement path of the air cleaner, there may occur a problem that it is hard to find a place where air purification is most required.

SUMMARY OF THE INVENTION

The present invention has been made to solve the above-mentioned problems, and an object of the present invention is to provide an air cleaner that determines a zone in which air purification is to be performed using status information collected by a moving agent, moves to the determined zone, and perform air purification.

An air cleaner according to an embodiment of the present invention includes a blowing device including a suction port and a discharge port, a fan motor configured to generate an air flow, a purifying unit installed inside the blowing device to purify air, a driving portion configured to move the air cleaner, a communication unit configured to communicate with a moving agent moving in the indoor space, and a processor configured to receive status information including at least one of air quality information and dust occurrence information collected by the moving agent, determine a specific zone in which air purification is to be performed using the status information collected by the moving agent, and perform air purification in the specific zone.

DETAILED DESCRIPTION OF THE PREFERRED EMBODIMENTS

Figure 1:
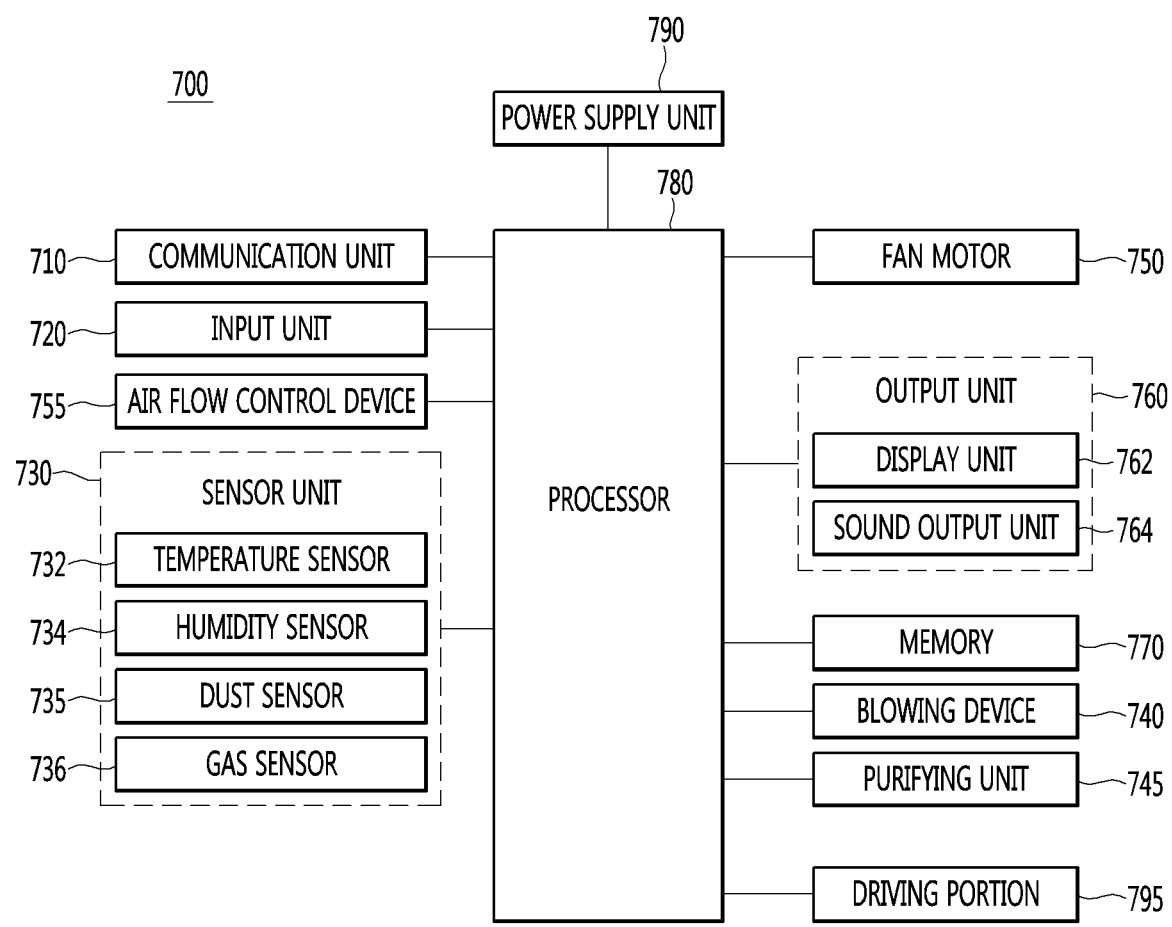
FIG. 1 is a schematic block diagram of components included in an air purifier according to an embodiment of the present invention.

Hereinafter, the embodiments disclosed herein will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function. Further, in describing the present invention, a detailed description of well-known techniques will be omitted when it is determined that the detailed description may obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

The terms coming with ordinal numbers such as 'first', 'second', or the like may be used to denote various components, but the components are not limited by the terms. The terms are used merely for the purpose to distinguish a component from the other component.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, singular forms may include plural forms as well unless the context clearly indicates otherwise. It will be further understood that the terms "comprises," "comprising," "having," "having," "includes," "including" and/or variations thereof, when used in this specification, specify the presence of stated features, integers, steps, operations, elements, and/or components, but do not preclude the presence or addition of one or more other features, integers, steps, operations, elements, components, and/or groups thereof.

Although the present invention is implemented to have components for convenience of description, these components may be embodied in a single device or module, or one component may be embodied in multiple devices or modules.

FIG. 1 is a schematic block diagram of components included in an air cleaner according to an embodiment of the present invention.

Referring to FIG. 1, an air cleaner 700 may include a communication unit 710, an input unit 720, a sensor unit 730, a blowing device 740, a fan motor 750, an output unit 760, a memory 770, a processor 780, and a power supply unit 790. The components shown in FIG. 1 are not essential for implementing an air cleaner and therefore, the air cleaner described herein may have more or less components than those listed above.

More specifically, the communication unit 710 of the above-mentioned components may include one or more modules for enabling wired communication or wireless communication between the air cleaner 700 and an external device (e.g., a mobile air cleaner such as a moving agent, a smartphone, or a tablet PC, or a fixed air cleaner such as a desktop computer) or between the air cleaner 700 and an external server.

The communication unit 710 may also include one or more modules that connect the air cleaner 700 to one or more networks.

When the communication unit 710 supports wireless communication, the communication unit 710 may include at least one of a wireless Internet module and a short-range communication module.

The wireless Internet module refers to a module for wireless Internet access and may be built in the air cleaner 700 or installed on the enclosure thereof.

The wireless Internet module is configured to transmit and receive wireless signals in a communication network according to wireless Internet technologies. The wireless Internet technologies may include, for example, WLAN (Wireless LAN), Wi-Fi (Wireless-Fidelity), Wi-Fi (Wireless Fidelity) Direct, and DLNA (Digital Living Network Alliance).

The short-range communication module is for short-range communication and may support short-range communication by using at least one of technologies such as Bluetooth™, Infrared Data Association (IrDA), ZigBee, and NFC (Near Field Communication. The short-range communication module may support wireless communication between the air cleaner 700 and the external device through wireless area networks. The wireless area networks may be wireless personal area networks.

Meanwhile, under the control of the processor 780, the communication unit 710 may communicate with the moving agent moving in the indoor space according to various communication methods described above.

The input unit 720 may include a touch key, a mechanical key, a dial key, and the like for receiving information or commands from a user. According to an embodiment, the input unit 720 may be understood as a concept including an interface unit that receives information or commands from a separate remote control device.

Specifically, the input unit 720 is for receiving information from the user, and the processor 780 may control operation of the air cleaner 700 so as to correspond to input information when the information is inputted through the input unit 720.

The input unit 720 may include a mechanical input unit (or a mechanical key such as a button located on the front, rear or side of the air cleaner 700, a dome switch, a jog wheel, a jog switch, or the like) and touch-type input means.

For example, the touch-type input means may include a virtual key, a soft key or a visual key displayed on a touch screen through software processing, or include a touch key disposed on a portion other than the touch screen.

Meanwhile, the virtual key or the visual key may be displayed on the touch screen in various forms, and may be for example, a graphic, a text, an icon, a video, or a combination thereof.

The sensor unit 730 may include one or more sensors for sensing at least one of surrounding environment information of the air cleaner 700 and user information.

For example, the sensor unit 730 may include a temperature sensor 732 for sensing a temperature of a space in which the air cleaner 700 is installed, and a humidity sensor 734 for sensing a humidity of the space.

The sensor unit 730 may include a dust sensor 735 for sensing the amount of dust in the air and a gas sensor 736 for sensing the amount of gas in the air.

The output unit 760 is for generating an output related to sight, hearing, or the like, and may include at least one of a display unit 762 and an sound output unit 764 (e.g., a speaker).

The display unit 762 may have a double-layered structure with a touch sensor or may be integrally formed with the touch sensor to realize a touch screen. Such a touch screen may function as the input unit 720 that provides an input interface between the air cleaner 700 and the user and may provide an output interface between the air cleaner 700 and the user.

The display unit 762 may display various types of information related to the operation of the air cleaner 700. For example, the display unit 762 may display information such as an air volume, an air flow direction, a current room temperature, a humidity, or an air quality, and information on an operation mode such as a power saving mode, a general mode, or a sleep mode.

The sound output unit 764 may output a speech-form signal to notify occurrence of an event of the air cleaner 700. Examples of events occurring in the air cleaner 700 may include an alarm, power on/off, error occurrence, operation mode change, and the like.

The memory 770 may store data that supports various functions of the air cleaner 700. The memory 770 may store various data and instructions for the operation of the air cleaner 700.

The memory 770 may include at least one type of storage medium among a flash memory type, a hard disk type, a solid state disk type, an Silicon Disk Drive type (SDD) type, a multimedia card micro type, a card type memory (e.g., SD or XD memory), random access memory (RAM), static random access memory (SRAM), read-only memory (ROM), electrically erasable programmable read-only memory (EEPROM) programmable read-only memory (PROM), magnetic memory, magnetic disk, and optical disk.

The processor 780 may typically control the overall operation of the air cleaner 700. The processor 780 may provide or process appropriate information or functionality to the user by processing signals, data, information, or the like that are input or output through the components discussed above.

The processor 780 may adjust at least one of the fan motor 750 and the air flow control device 755 based on the purification information of the air cleaner 700. Here, the purification information may include at least one of an operation mode, an air volume, and an air flow direction.

The blowing device 740 may include a suction port and a discharge port.

The air flow control device 755 may change an air flow direction of the air discharged from the discharge port of the blowing device.

The fan motor 750 is installed inside the blowing device 740 and may blow air by rotating a blowing fan (not shown) provided inside the blowing device 740. Accordingly, the fan motor 750 may generate an air flow.

That is, when the fan motor 750 is driven, the blowing fan rotates. As the blowing fan rotates, air is sucked through the suction port, and air may be discharged through the discharge port.

Further, a purifying unit 745 is installed inside the blowing device 740, and the purifying unit may purify air as the air is sucked through the suction port and the air is discharged through the discharge port.

The processor 780 may control the operation of at least one of the fan motor 750 and the air flow control device 755 based on the operation mode of the purification information. As the operation of at least one of the fan motor 750 and the air flow control device 755 is controlled, the operation mode of the air cleaner may be adjusted.

The processor 780 may also control the operation of at least one of the fan motor 750 and the air flow control device 755 based on the air volume among the purification information. As the operation of at least one of the fan motor 750 and the air flow control device 755 is controlled, the air volume of the air cleaner 780 may be adjusted.

The processor 780 may control the operation of the air flow control device 755 based on the air flow direction among the purification information. As the operation of the air flow control device 755 is controlled, the air flow direction of the air cleaner 700 may be adjusted.

The power supply unit 790 receives external power and internal power under the control of the processor 780 and supplies power to the components included in the air cleaner 700.

A driving portion 795 includes drive wheels and a motor, and may be controlled by the processor 780 to move the air cleaner.

The drive wheel may be driven by the driving force of the motor.

The processor 780 may individually control a plurality of drive wheels. By controlling rotational directions and rotational speeds of the drive wheels differently, the air cleaner may travel and rotate in various directions.

At least some of the components may operate in cooperation with one another to implement the operation, control, or control method of the air cleaner according to various embodiments described below. Also, the operation, control, or control method of the air cleaner may be implemented on the air cleaner by executing at least one application program stored in the memory 770.

The robot cleaner will be described below as an example of the moving agent. However, the moving agent is not limited to the robot cleaner, and may be any device capable of moving in the indoor space, such as a pet robot, a guide robot, or the like.

The moving agent may move in the indoor space.

Figure 2A:
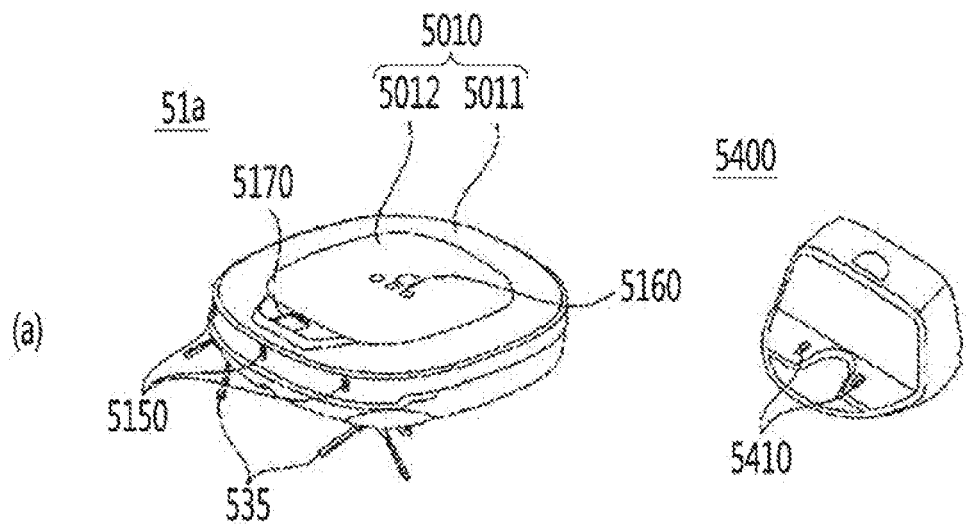
FIG. 2A is a perspective view of a robot cleaner according to an embodiment of the present invention.
Figure 2A:
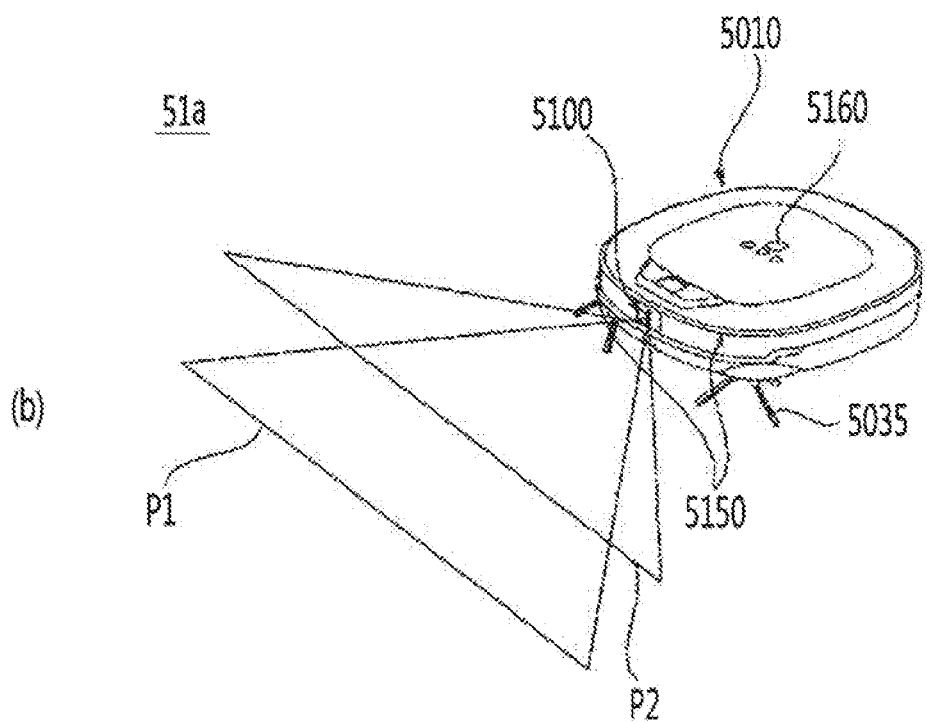
Figure 2B:
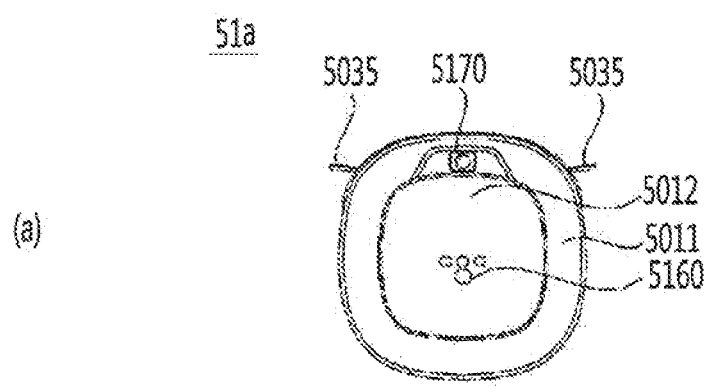
FIG. 2B shows a horizontal angle of view of the robot cleaner of FIG. 2A.
Figure 2B:
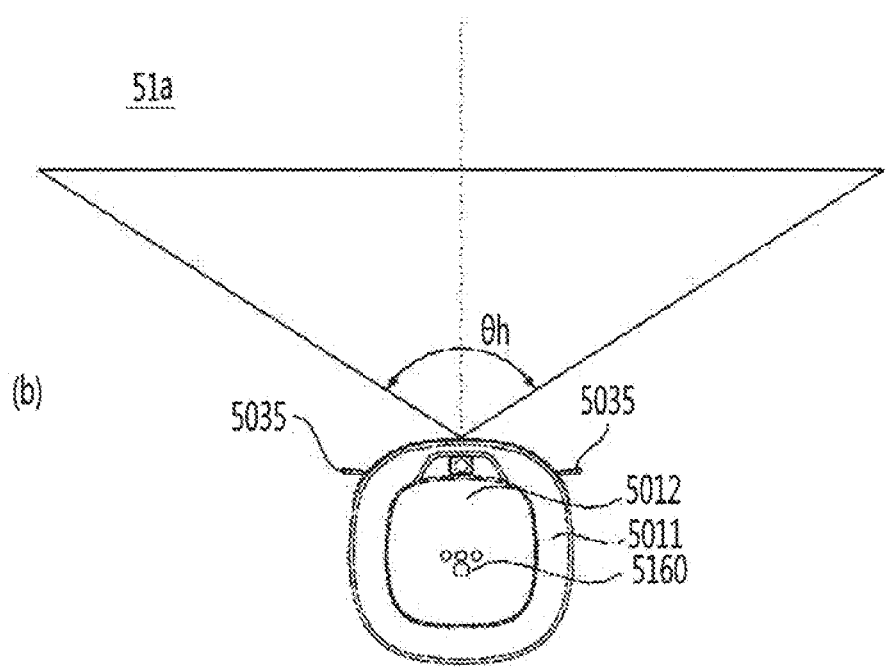
Figure 2C:
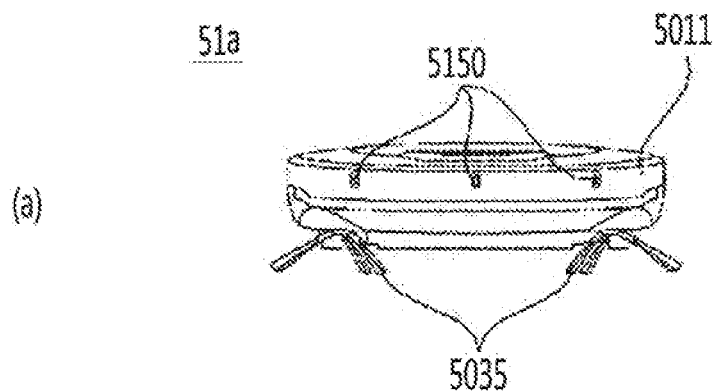
FIG. 2C is a front view of the robot cleaner of FIG. 2A.
Figure 2C:
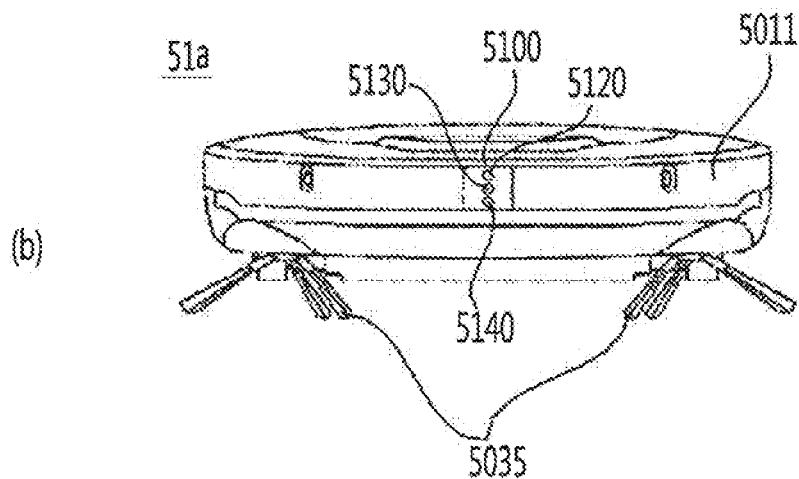
Figure 2D:
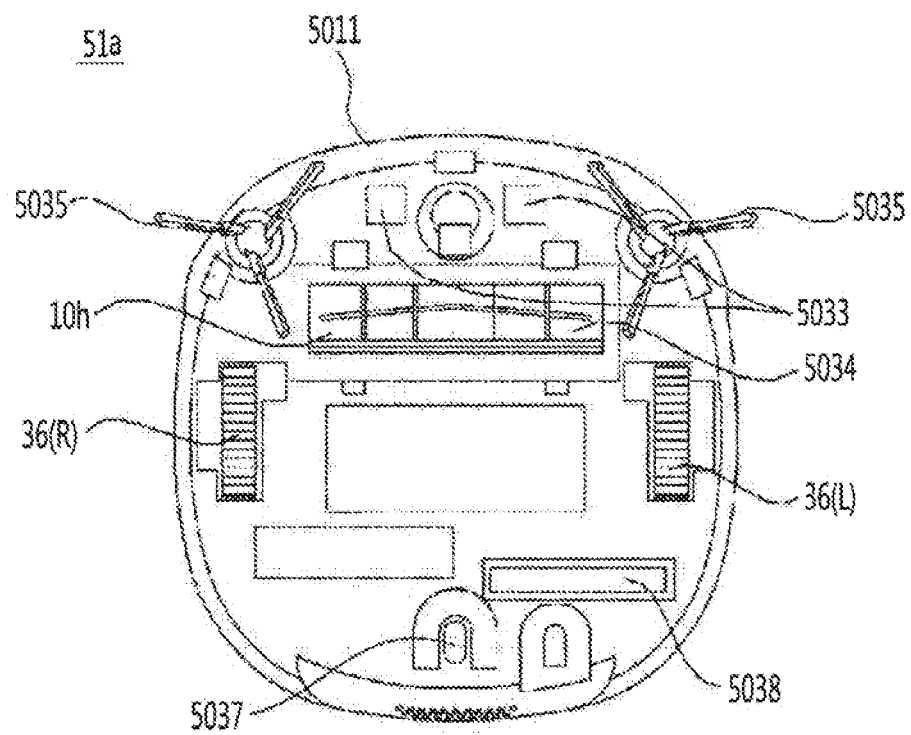
FIG. 2D shows the bottom of the robot cleaner of FIG. 2A.

FIG. 2A is a perspective view of a robot cleaner according to an embodiment of the present invention. FIG. 2B shows a horizontal angle of view of the robot cleaner of FIG. 2A. FIG. 2C is a front view of the robot cleaner of FIG. 2A. FIG. 2D shows the bottom of the robot cleaner of FIG. 2A.

Referring to FIGS. 2A to 2D, a robot cleaner 51 according to an embodiment of the present invention may include a body 5010 that moves along the floor of a cleaning area and sucks foreign substances such as dust on the floor, and an obstacle detection unit 5100 disposed on the front of the body 5010.

The body 5010 may include a casing 5011 that forms an outer surface and forms a space in which parts constituting the body 5010 are accommodated, a suction unit 5034 that is disposed in the casing 5011 and sucks foreign substances such as dust or trash, and a left wheel 36 (L) and a right wheel 36 (R), which are rotatably provided in the casing 5011, As the left wheel 36 (L) and the right wheel 36 (R) rotate, the body 5010 may move along the floor of the cleaning area, and suction foreign substances through the suction unit 5034 while moving.

The suction unit 5034 may include a suction fan (not shown) that generates a suction force and a suction port through which air flow generated by the rotation of the suction fan is suctioned. The suction unit 5034 may include a filter (not shown) for collecting foreign substances in the air flow sucked through the suction port and a foreign substance collecting box (not shown) in which foreign substances collected by the filter are accumulated.

In addition, the body 5010 may include a travel driving portion for driving the left wheel 36 (L) and the right wheel 36 (R). The travel driving portion may include at least one drive motor. The at least one drive motor may include a left wheel drive motor for rotating the left wheel 36 (L) and a right wheel drive motor for rotating the right wheel 36 (R).

The left and right wheel drive motor and the right wheel drive motor may be controlled to be operated independently by a drive control unit of the control unit so that the body 5010 may move straight, reverses, or turns. For example, when the body 5010 travels straight, the left wheel drive motor and the right wheel drive motor are rotated in the same direction. However, when the left wheel drive motor and the right wheel driving motor are rotated at different speeds or in opposite directions, the travel direction of the body 5010 may be changed. At least one auxiliary wheel 5037 for stably supporting the body 5010 may be further provided.

A plurality of brushes 5035, disposed on the front side of the bottom portion of the casing 5011 and each having a sweeper composed of a plurality of radially extending wings, may be further provided. By the rotation of the plurality of brushes 5035, dusts are removed from the floor of the cleaning area, and the dusts separated from the floor are sucked through the suction port and gathered in the collecting box.

A control panel including an operation unit 5160 for receiving various commands for control of the robot cleaner 51 from the user may be provided on the upper surface of the casing 5011.

The obstacle detection unit 5100 may be disposed on the front of the body 5010.

The obstacle detection unit 5100 is fixed to the front of the casing 5011 and includes a first pattern projecting unit 5120, a second pattern projecting unit 5130, and an image acquiring unit 5140. In this case, the image acquiring unit is fundamentally installed below the pattern projecting unit as shown in FIC 2C, but may be disposed between the first and second pattern projecting units depending on cases. In addition, a second image acquiring unit (not shown) may be further provided at an upper end of the body. The second image acquiring unit may photograph an image of a portion above the body, that is, a ceiling.

The body 5010 is provided with a rechargeable battery 5038. A charging terminal 5033 of the battery 5038 is connected to a commercial power supply (for example, a power socket in a home) (not shown) or the body 5010 is docked on a separate charging stand (not shown) connected to the commercial power supply and the charging terminal 5033 is electrically connected to the commercial power supply, thus achieving charging of the battery 5038. Electric parts constituting the robot cleaner 51 may be supplied with power from the battery 5038 and therefore the robot cleaner 51 may travel by itself although being electrically separated from the commercial power supply in a state in which the battery 5038 is charged.

Figure 2E:
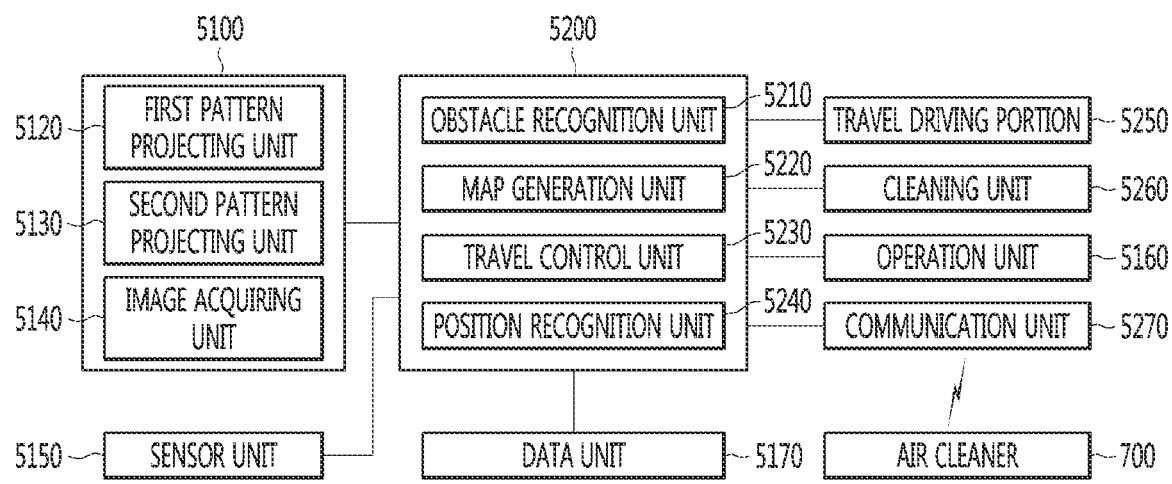
FIG. 2E is a block diagram illustrating the main parts of a robot cleaner according to an embodiment of the present invention.

FIG. 2E is a block diagram illustrating the main parts of a robot cleaner according to an embodiment of the present invention.

As shown in FIG. 2E, the robot cleaner 51 includes a travel driving portion 5250, a cleaning unit 5260, a data unit 5280, an obstacle detection unit 5100, a sensor unit 5150, a communication unit 5270, an operation unit 5160, and a control unit 5200 that controls overall operation. The control unit may be implemented with one or more microprocessors, and may be implemented with a hardware device.

The operation unit 5160 includes input means such as at least one button, a switch, and a touch pad, and receives a user command. The operation unit may be provided at the upper end of the body 5010 as described above.

The data unit 5280 may store an obstacle detection signal input from the obstacle detection unit 5100 or the sensor unit 5150, store reference data used to determine an obstacle by an obstacle recognition unit 5210, and store obstacle information. Further, the data unit 5280 may store control data for controlling the operation of the robot cleaner, data related to a cleaning mode of the robot cleaner, and a map including the obstacle information generated by a map generation unit. The data unit 5280 may store a basic map, a cleaning map, a user map, and a guide map. The obstacle detection signal may include a sensing signal of ultrasonic wave/laser or the like by the sensor unit, and an acquisition image of the image acquiring unit.

In addition, the data unit 5280 may store data that is readable by a microprocessor, and may include a hard disk drive (HDD), a solid state disk (SSD), a silicon disk drive (SDD), a ROM, a RAM, a CD-ROM, magnetic tape, floppy disk, optical data storage, and the like.

The communication unit 5270 may communicate with the air cleaner in a wireless communication manner. In addition, the communication unit 5270 may be connected to an Internet network via a premises network and communicate with an external server or an air cleaner.

The communication unit 5270 may transmit a generated map to the air cleaner, and transmit data on an operation state or cleaning state of the robot cleaner to the air cleaner. The communication unit 5270 may include a communication module such as not only short-range wireless communication such as ZigBee and Bluetooth, but also Wi-Fi and WiBro to transmit and receive data.

The travel driving portion 5250 may include at least one drive motor, and allow the robot cleaner to travel according to a control command of a travel control unit 5230. As described above, the travel driving portion 5250 may include a left wheel drive motor for rotating the left wheel 36 (L) and a right wheel drive motor for rotating the right wheel 36 (R).

The cleaning unit 5260 may make dust or foreign substances around the robot cleaner easy to suck by operating the brush and operate a suction device to suck the dust or foreign substances. The cleaning unit 5260 may control the operation of a suction fan included in the suction unit 34 that sucks foreign substances such as dust or trash to allow the dust to be introduced into the foreign substance collecting box through the suction port.

The obstacle detection unit 5100 may include a first pattern projecting unit 5120, a second pattern projecting unit 5130, and an image acquiring unit 5140.

The sensor unit 5150 may include a plurality of sensors to assist in detecting an obstacle. The sensor unit 5150 may include at least one of a laser sensor, an ultrasonic sensor, and an infrared sensor. The sensor unit 5150 may detect an obstacle in front of the body 5010, that is, in the travel direction, using at least one of laser, ultrasound, and infrared rays. When the transmitted signal is reflected and incident, the sensor unit 5150 may input information on the presence or absence of an obstacle or a distance to an obstacle to the control unit 5200 as an obstacle detection signal.

In addition, the sensor unit 5150 may include at least one tilt sensor to sense a tilt of the body. The tilt sensor may calculate a tilt direction and an angle when being tilted in the front, rear, left, or right direction of the body. The tilt sensor may be an acceleration sensor, or the like. In the case of the acceleration sensor, any of a gyro type, an inertial type, and a silicon semiconductor type is applicable.

Meanwhile, the sensor unit 5150 may include at least one of the components of the obstacle detection unit 5100, and may perform the function of the obstacle detection unit 5100.

In the obstacle detection unit 5100, the first pattern projecting unit 5120, the second pattern projecting unit 5130 and the image acquiring unit 5140 are installed in the front of the robot cleaner, and light of first and second patterns P1 and P2 are projected in front of the robot cleaner and the light of the projected pattern is photographed to acquire an image.

The sensor unit 5150 may include a dust sensor for sensing the amount of dust in the air and a gas sensor for sensing the amount of gas in the air.

The obstacle detection unit 5100 may input the acquisition image to the control unit 5200 as an obstacle detection signal.

The first and second pattern projecting units 5120 and 5130 of the obstacle detection unit 5100 each may include a light source and an optical pattern projection element (OPPE) that generates a predetermined pattern by transmitting the light projected from a light source. The light source may be a laser diode (LD), a light emitting diode (LED), or the like. Laser light is superior to other light sources in monochromaticity, straightness and connection characteristics, and therefore precise distance measurement is possible. In particular, a laser diode is preferably used as the light source because infrared rays or visible rays have a problem in that deviation in the accuracy of distance measurement is largely generated depending on factors such as the color and material of an object, or the like. A pattern generator may include a lens and a diffractive optical element (DOE). Depending on the configuration of the pattern generator provided in each of the pattern projecting units 5120 and 5130, light of various patterns may be projected.

The first pattern projecting unit 5120 may project light of the first pattern P1 (hereinafter, referred to as first pattern light) toward the front lower side of the body 5010. Accordingly, the first pattern light P1 may be incident on the floor of the cleaning area.

The first pattern light P1 may be configured in the form of a horizontal line Ph. It is also possible that the first pattern light P1 is configured in the form of a cross pattern in which the horizontal line Ph and the vertical line Pv intersect each other.

The first pattern projecting unit 120, the second pattern projecting unit 5130, and the image acquiring unit 5140 may be vertically arranged in a line. The image acquiring unit 5140 is disposed on the lower side of the first pattern projecting unit 5120 and the second pattern projecting unit 5130, but the present invention is not limited thereto. The image acquiring unit 5140 may be disposed on an upper side of the first pattern projecting unit and the second pattern projecting unit.

In the embodiment, the first pattern projecting unit 5120 may be disposed on the upper side and may project the first pattern light P1 downward toward the front to detect an obstacle located below the first pattern projecting unit 5120.

The second pattern projecting unit 5130 is positioned on the lower side of the first pattern projecting unit 5120 and may project light of a second pattern P2 (hereinafter referred to as second pattern light) upward toward the front. Therefore, the second pattern light P2 may be incident on a wall or an obstacle or a certain portion of the obstacle located higher than at least the second pattern projecting unit 5130 from the bottom of the cleaning area.

The second pattern light P2 may have a pattern different from that of the first pattern light P1, and preferably includes a horizontal line. Here, the horizontal line is not necessarily a continuous line, but may be a dotted line.

In FIG. 2 described above, a projection angle θh shown in FIG. 2 represents a horizontal projection angle of the first pattern light P1 projected from the first pattern projecting unit 5120. The projection angle θh is an angle between both ends of the horizontal line Ph and the first pattern projecting unit 5120, and is preferably set in the range of 130° to 140°, but is not limited thereto. The dotted line shown in FIG. 2 is directed toward the front of the robot cleaner 51, and the first pattern light P1 may be configured to be symmetrical with respect to the dotted line.

Similarly to the first pattern projecting unit 5120, with respect to the second pattern projecting unit 5130, a horizontal projection angle is preferably set in the range of 130° to 140°. According to an embodiment, the second pattern projecting unit 5130 may project the pattern light P2 at the same horizontal projection angle as that of the first pattern projecting unit 5120, and in this case, the second pattern light P2 may be configured to be symmetrical with respect to the dotted line shown in FIG.

The image acquiring unit 5140 may acquire an image in front of the main body 5010. Particularly, the pattern light P1 or P2 appears in an image acquired by the image acquiring unit 5140 (hereinafter, referred to as an acquisition image). Hereinafter, the image of the pattern light P1 or P2 is referred to a light pattern. Since the pattern light P1 or P2 incident on the actual space is substantially formed on the image sensor, the same reference numerals as the pattern lights P1 and P2 are assigned to the first pattern light P1 And the second pattern light P2 are referred to as a first light pattern P1 and a second light pattern P2, respectively.

The image acquiring unit 5140 may include a digital camera that converts an image of an object into an electrical signal and then converts the digital signal into a digital signal and stores the digital signal in a memory device. The digital camera includes an image sensor (not shown).

An image sensor is an apparatus for converting an optical image into an electrical signal. The image sensor is composed of a chip on which a plurality of photo diodes are integrated, and a photodiode is exemplified as a pixel. Charges are accumulated in the respective pixels by an image formed on the chip by the light passing through the lens, and the charges accumulated in the pixels are converted into an electrical signal (for example, voltage). As the image sensors, a Charge Coupled Device (CCD), a Complementary Metal Oxide Semiconductor (CMOS) and the like have been well known.

The image processing unit may generate a digital image based on an analog signal output from the image sensor. The image processing unit may include an AD converter that converts an analog signal into a digital signal, a buffer memory that temporarily stores digital information according to the digital signal output from the AD converter, and a digital signal processor (DSP) that processes information recorded on the buffer memory to configure a digital image.

The control unit 5200 may include an obstacle recognition unit 5210, a map generation unit 5220, a travel control unit 5230, and a position recognition unit 5240.

The obstacle recognition unit 5210 may determine an obstacle through the acquisition image input from the obstacle detection unit 5100, and the travel control unit 5230 may change a movement direction or a travel route in accordance with obstacle information, and allow the travel driving portion 5250 to travel while passing or avoiding the obstacle.

The travel control unit 5230 may control the travel driving portion 5250 by independently control the operations of the left wheel drive motor and the right wheel drive motor to allow the main body 5010 to travel straight or rotate.

The obstacle recognition unit 5210 may store an obstacle detection signal input from the sensor unit 5150 or the obstacle detection unit 5100 in the data unit 5280 and analyze the obstacle detection signal to determine an obstacle.

The obstacle recognition unit 5210 may determine whether or not there is an obstacle ahead based on a signal of the sensor unit, and analyzes the acquisition image to determine the position, size, and shape of the obstacle.

The obstacle recognition unit 5210 may analyze the acquisition image to extract a pattern. The obstacle recognition unit 5210 may extract a light pattern appearing when the pattern light projected from the first pattern projecting unit or the second pattern projecting unit is projected to the floor or the obstacle, and determine the obstacle based on the extracted light pattern.

The obstacle recognition unit 5210 may detect the light pattern P1 or P2 from the image (acquisition image) acquired by the image acquiring unit 5140. The obstacle recognition unit 5210 may detect features such as points, lines, and surfaces with respect to predetermined pixels constituting the acquisition image (feature detection), and detect the points, the lines, the surfaces, and the like constituting the light pattern P1 or the light pattern P2.

The obstacle recognition unit 5210 may extract line segments constituted by consecutive pixels brighter than the surrounding area and extract a horizontal line Ph constituting the first light pattern P1 and a horizontal line constituting the second light pattern P2. However, the present invention is not limited thereto. Various techniques for extracting a desired pattern from a digital image are already known. The obstacle recognition unit 5210 may extract the first light pattern P1 and the second light pattern p2 using the well-known techniques.

In addition, the obstacle recognition unit 5210 may determine the presence or absence of an obstacle based on the detected pattern, and determine a shape of the obstacle. The obstacle recognition unit 5210 may determine an obstacle through the first light pattern and the second light pattern, and may calculate a distance to the obstacle. In addition, the obstacle recognition unit 5210 may determine the size (height) and shape of the obstacle through the shapes of the first light pattern and the second light pattern and changes in the light patterns, which are caused in the case of approaching the obstacle.

The obstacle recognition unit 5210 may determine an obstacle based on distances between the first and second light patterns and a reference position. When the first light pattern P1 appears at a position lower than the reference position, the obstacle recognition unit 5210 may determine that the downhill ramp exists, and when the first light pattern P1 disappears, determine that a cliff exists. In addition, when the second light pattern appears, the obstacle recognition unit 5210 may determine an obstacle ahead or an obstacle above.

The obstacle recognition unit 5210 may determine whether the body is tilted based on the tilt information input from the tilt sensor of the sensor unit 5150, and when the body is tilted, compensate for the tilt with respect to a position of the light pattern of the acquisition image.

The travel control unit 5230 may control the travel driving portion 5250 so as to perform cleaning operation while traveling on a specified area of the cleaning area, and control the cleaning unit 5260 to perform cleaning by sucking the dust during traveling.

The travel control unit 5230 may determine whether traveling or entry is possible with respect to the obstacle recognized by the obstacle recognition unit 5210, and configure a travel route to approach the obstacle, pass the obstacle, or avoid the obstacle and then control the travel driving portion 5250.

The map generation unit 5220 may generate a map for the cleaning area based on information on the obstacle determined by the obstacle recognition unit 5210.

The map generation unit 5220 may generate a map for the cleaning area based on obstacle information while traveling on the cleaning area in the initial operation or when the map for the cleaning area is not stored. Further, the map generation unit 5220 may update the previously-generated map based on the obstacle information acquired during traveling.

The map generation unit 5220 may generate a basic map based on information acquired from the obstacle recognition unit 5210 during traveling, and generate a cleaning map by dividing an area from the basic map. Further, the map generation unit 5220 may arrange areas for the cleaning map and set attributes for the areas to generate a user map and a guide map.

The basic map is a map in which the shape of the cleaning area obtained through traveling is indicated by an outline, and the cleaning map is a map in which the area is divided on the basic map. The basic map and the cleaning map include a travelable area of the robot cleaner and obstacle information. The user map is a map obtained by simplifying the area of the cleaning map and cleaning up the shape of the outline, in which visual effects are added. The guide map is a map in which the cleaning map and the user map are superimposed. Since the cleaning map is displayed on the guide map, a cleaning command may be inputted based on the area where the robot cleaner is capable of actually traveling.

After generating the basic map, the map generation unit 5220 may divide the cleaning area into a plurality of areas, and generate a map including connection paths connecting the plurality of areas, and information on obstacles in each area. The map generation unit 5220 may divide a small area and set a representative area for area division on the map. Then the map generation unit 5220 may set the divided small as a separate sub-area and merge into the representative area to generate a map in which the areas are distinguished from one another.

The map generation unit 5220 processes the shape of the area for each of the divided areas. The map generation unit 5220 sets attributes for the divided areas, and processes the shape of the area according to the attribute for each area.

The map generation unit 5220 may first determine a main area based on the number of contacts with other areas among the areas. The main area may be basically a living room, but the main area may be changed to any one of a plurality of rooms in some cases. The map generation unit 5220 may set attributes for the remaining areas with the main area as reference. For example, the map generation unit 5220 may set an area of a predetermined size or more arranged with the living room (that is main area) as a center, as a room, and set the other areas as other areas.

The map generation unit 5220 may perform processing such that each area has a specific shape according to a criterion according to the attribute of the area in processing the shape of the area. For example, the map generation unit 5220 may process the shape of an area based on the shape of a room in a general home, for example, a square. The map generation unit 5220 may expand the shape of the area based on the outermost cell of the basic map and process the shape of the area by deleting or reducing the area with respect to the area that is not accessible due to the obstacle.

In addition, the map generation unit 5220 may display obstacles of a predetermined size or larger on the basic map in accordance with the size of the obstacle and delete obstacles smaller than the predetermined size from a relevant cell such that the obstacles are not displayed. For example, the map generation unit may display furniture such as a chair or sofa having a predetermined size or more on the map, and delete a temporary obstacle and a small size obstacle, such as a small toy from the map. The map generation unit 5220 may store the position of a charging stand on the map together when the map is generated.

The map generation unit 5220 may add an obstacle on the map based on the obstacle information input from the obstacle recognizing unit 21 with respect to the obstacle detected after the map is generated. The map generator 5220 may add an obstacle to the map when a specific obstacle is repeatedly detected at a fixed position, and ignores the obstacle when the obstacle is temporarily detected.

The map generation unit 5220 may generate both the user map which is a processed map, and the guide map which is displayed such the user map and the cleaning map are superimposed on each other.

When a virtual wall is set, the map generation unit 5220 may set the position of the virtual wall in the cleaning map based on data on the virtual wall received through the communication unit, and calculate the coordinates of the virtual wall corresponding to the cleaning area. The map generation unit 5220 may register the virtual wall as an obstacle in the cleaning map.

The map generation unit 5220 may store the data on the set virtual wall, for example, a level of the virtual wall, and information on the attribute of the virtual wall together.

The map generation unit 5220 may extend the set virtual wall and register it as an obstacle. During traveling, the virtual wall, set such that the body 5010 does not contact the virtual wall or does not invade the virtual wall, is expanded to be set to a wider range.

When a current position of the body 5010 cannot be determined by the position recognition unit 5240, the map generation unit 5220 may generate a new map for the cleaning area. The map generation unit 5220 may determine movement to a new area and initialize a preset virtual wall.

The map generation unit 5220 may additionally set a virtual wall in the map such that the body 5010 operates in response to the virtual wall when the body 5010 travels in a case where the data on the virtual wall is received while traveling For example, when a new virtual wall is added or a level or an attribute of a virtual wall is changed, or when the position of a preset virtual wall is changed, the map generation unit 5220 may update the map based on received data, reflect information on the changed virtual wall to the map.

The location recognition unit 5240 may determine the current position of the body 5010 based on the map (the cleaning map, the guide map, or the user map) stored in the data unit.

When a cleaning command is input, the position recognition unit 5240 may determine whether a position on the map matches the current position of the body. When the current position does not match the position on the map or when the current position is not able to be identified, the position recognition unit 5240 may recognize the current position and restore the current position of the robot cleaner 51. When the current position is restored, the travel control unit 5230 may allow the travel driving portion to move to a specified area based on the current position. The cleaning command may be input from a remote control (not shown), the operation unit 5160, or the air cleaner.

When the current position does not match the position on the map or the current position is not able to be identified, the position recognition unit 5240 may analyze the acquisition image inputted from the image acquiring nit 5140 and estimate the current position based on the map.

The position recognition unit 5240 may process the acquisition image obtained at each position during the map generation by the map generation unit 5220, and recognize a global position of the body in association with the map.

The position recognition unit 5240 may compare the map with the acquisition image for each position on the map by using the acquisition image of the image acquiring unit 5140 to figure out the current position of the body, thus estimating and recognizing the current position even when the position of the body is suddenly changed.

The position recognition unit 5240 may analyze various features included in the acquisition image, such as ceiling lights, edges, corners, blobs, ridges to determine a position. The acquisition image may be inputted from the image acquiring unit or a second image acquiring unit provided at an upper end of the body.

The position recognition unit 5240 may detect features from each of the acquisition images. Various methods for detecting features from an image (Feature Detection) are well known in the technical field of computer vision. Several feature detectors suitable for detecting these features have been known. For example, there are Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR, Gray-level blobs detector and the like.

The position recognition unit 5240 may calculate a descriptor based on each of the features. The position recognition unit 5240 may convert the features into a descriptor using a Scale Invariant Feature Transform (SIFT) technique for feature detection. The descriptor may be denoted by an n-dimensional vector. The SIFT may detect invariant features for scale, rotation, and brightness change of a subject to be photographed. The invariant features (that is, Rotation-invariant) even though the same area is photographed with different postures of the robot cleaner 51 may be detected. Of course, various other techniques (e.g., Histogram of Oriented Gradient (HOG), Haar feature, Fems, Local Binary Pattern (LBP), Modified Census Transform (MCT) may be applied without being limited thereto.

The position recognition unit 5240 may classify at least one descriptor for each acquisition image into a plurality of groups according to a predetermined sub-classification rule based on descriptor information obtained through the acquisition image of each position, and convert descriptors belonging to the same group into a sub-representative descriptor, respectively according to a predetermined sub-representative rule. As another example, it is also possible to classify all descriptors gathered from acquisition images in a predetermined area, such as a room, into a plurality of groups according to a predetermined sub-classification rule, and convert the descriptors belonging to the same group into a sub-representative descriptor according to the predetermined sub-representative rule.

The position recognition unit 5240 may obtain a feature distribution of each position through the above process. Each position feature distribution may be expressed by a histogram or an n-dimensional vector. As another example, a learning module 143 may estimate an unknown current position based on a descriptor calculated from each feature, without going through a predetermined sub-classification rule and a predetermined sub-representative rule.

Further, when the current position of the robot cleaner 51 is unknown due to a positional jump or the like, the position recognition unit 5240 may estimate a current position based on data such as the descriptor or the sub-representative descriptor previously stored.

The position recognition unit 5240 may obtain an acquisition image through the image acquiring unit 5140 at an unknown current position and when various features such as ceiling lights, edges, corners, blobs, ridges, and the like are identified through the image, detect features from the acquisition image.

The position recognition unit 5240 may perform conversion to a position (recognition feature sub-distribution) capable of being compared to position information (e.g., feature distribution of each position) to be compared according to a predetermined sub-conversion rule based on at least one recognition descriptor information obtained through the acquisition image of the unknown current position. According to a predetermined sub-comparison rule, each position feature distribution may be compared with each recognition feature distribution to calculate each similarity degree. The similarity degree (probability) for each position may be calculated corresponding to each position, and the position where the greatest probability is calculated may be determined as the current position.

When the map is updated by the map generation unit 5220 during traveling, the control unit 5200 may transmit the updated information to the air cleaner 700 through the communication unit, to allow the maps stored in the air cleaner and the robot cleaner 51 to be identical to each other.

When the cleaning command is input, the travel control unit 5230 may allow the travel driving portion to move to the specified area of the cleaning area and operate the cleaning unit to allow cleaning to be performed while traveling.

When a cleaning command for a plurality of areas is inputted, the travel control unit 5230 may move to an area according to whether a priority is set to the area or a specified order so that the cleaning is performed. When the order is not specified, the travel control unit 5230 may move to a near area or an adjacent area according to distances to perform cleaning.

In addition, when a cleaning command for an arbitrary area is inputted regardless of discrimination in the areas, the travel control unit 5230 may move to an area included in an arbitrary area and perform cleaning.

When a virtual wall is set, the travel control unit 5230 may identify the virtual wall based on the coordinate values inputted from the map generation unit 5220 and control the travel driving portion.

Even when the obstacle recognition unit 5210 determines that the obstacle does not exist, the travel control unit 5230 may recognize that the obstacle exists at the corresponding position and restrict the travel when the virtual wall is set.

When the settings of the virtual wall are changed during traveling, the travel control unit 5230 may reset a travel route by distinguishing the travelable area and the non-travelable area according to the changed virtual wall settings.

The travel control unit 5230 may control the travel in accordance with any one of setting 1 for noise, setting 2 for a travel route, setting 3 for avoidance, and setting 4 for security according to an attribute set on the virtual wall.

The travel control unit 5230 may move close to the virtual wall and perform a specified operation (traveling route, setting 2), reduce the noise occurring in the body and perform cleaning (noise, setting 1), travel while avoiding the virtual wall without moving to the virtual wall by a certain distance or more (avoidance, setting 3), or photograph an image of a predetermined area based on the virtual wall (security, setting 4), according to the attribute of the virtual wall.

The control unit 5200 may store a cleaning history on the data unit when the cleaning for the set specified area is completed.

In addition, the control unit 5200 may transmit the operation state or the cleaning state of the robot cleaner 51 to the air cleaner at predetermined intervals through the communication unit 5270.

Based on the data received from the robot cleaner 51, the air cleaner may display a position of the robot cleaner together with the map on the screen of an application being executed, and also output information on the cleaning state.

When information on the obstacle is added, the air cleaner may update the map based on the received data.

When the cleaning command is input, the robot cleaner may travel by distinguishing the travelable area from the non-travelable area on the basis of the information on the set virtual wall.

Meanwhile, the sensor unit 5150 may include a camera. Further, the control unit 5200 may obtain an image of the indoor space by controlling the camera to photograph the indoor space.

Meanwhile, the sensor unit 5150 may include at least one of a laser sensor, an ultrasonic sensor, an infrared sensor, and a camera. The sensor unit 5150 may generate a map of the indoor space using at least one of laser, ultrasonic wave, infrared ray, and the image photographed through the camera.

Further, the sensor unit 5150 may include a temperature sensor for measuring a temperature of the indoor space, a first heat detection sensor (for example, an infrared sensor) for sensing a temperature of the user, and a second heat detection sensor for sensing an operation state of a gas range or an electric range, or heat information such as heat of an electronic product.

The sensor unit 5150 may also include a microphone for receiving sound.

The sensor unit 5150 may include a dust sensor for sensing the amount of dust in the air and a gas sensor for sensing the amount of gas in the air.

Figure 3:
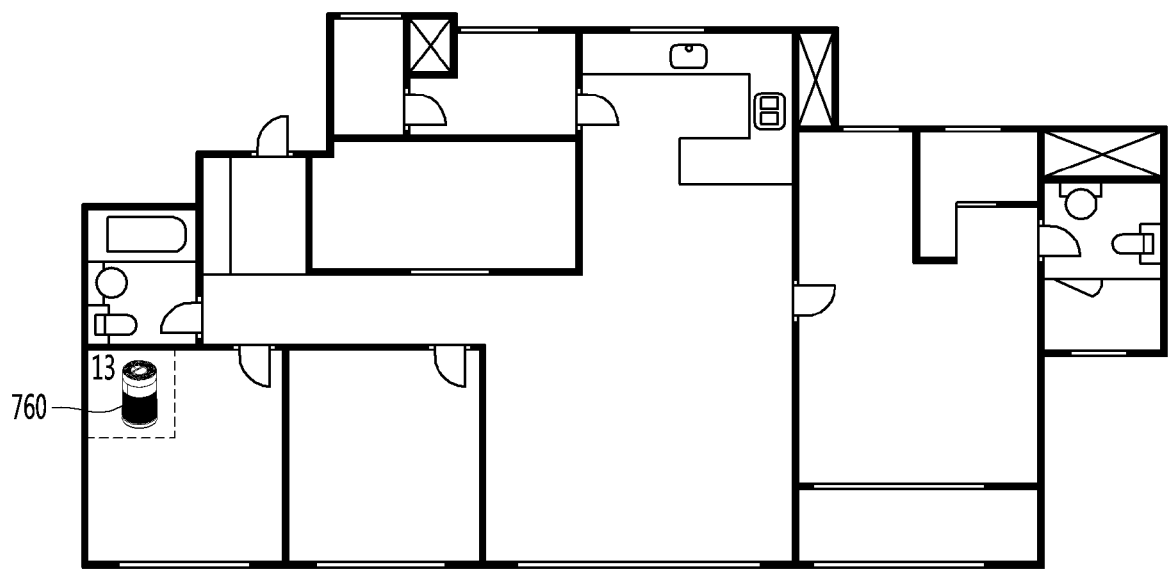
FIGS. 3 and 4 are diagrams for describing conventional problems.
Figure 4:
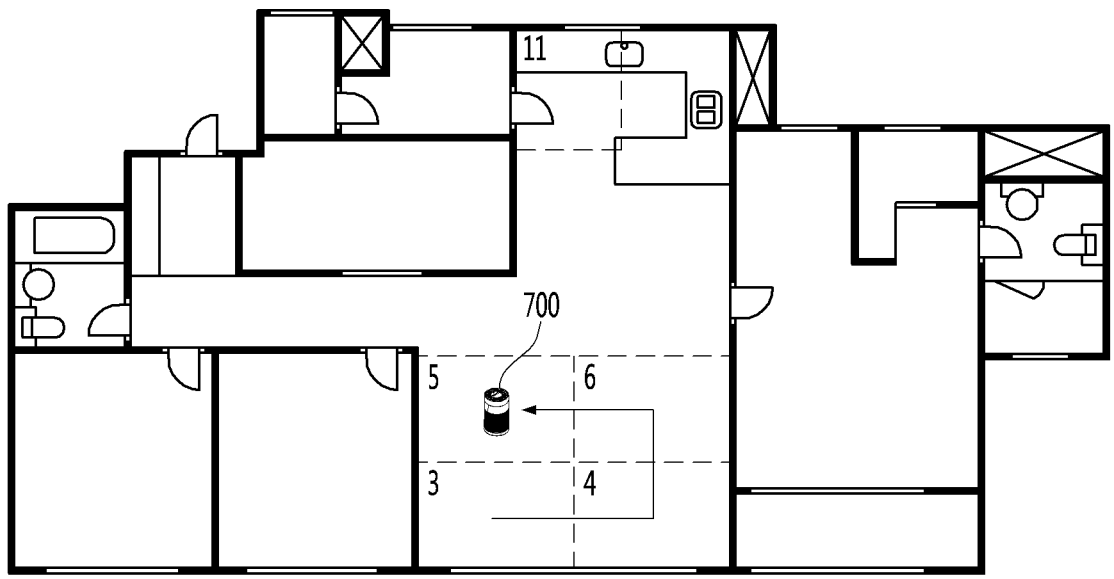

FIGS. 3 and 4 are diagrams for describing conventional problems.

Recently, an air cleaner has emerged, which searches for areas with poor air quality while moving and performs air purification However, since a single air cleaner performs both the dust detection and the air purification, there may occur a problem that the sensing range becomes narrow.

For example, as shown in FIG. 3, the air cleaner 700 is not able to detect the air quality of another zone, while purifying the air in the specific zone (zone 13).

That is, the air cleaner 700 is not able to detect in which zone of other zones the air quality has deteriorated while purifying the air in the specific zone (zone 13).

Therefore, when the air purification in the specific zone (zone 13) is completed, there is a problem that the air cleaner needs to travel to find a place with poor air quality.

Also, as shown in FIG. 4, the air cleaner 700 may sense the air quality while moving and perform air purification accordingly.

However, since the sensing range is limited only by the movement path of the air cleaner, the air cleaner may sense only the air quality of some zones (zones 3, 4, 5, 6). Therefore, there may arise a problem that a place where air purification is most required cannot be found.

On the other hand, it is possible to consider sensing the air quality in various zones of the indoor space by arranging sensors in the various zones. However, to this end, a large number of sensors may be necessary, which may lead to an increase in cost. Further, due to the installation of the plurality of sensors, the appearance may be damaged or the installation of the sensors may be troublesome.

On the other hand, there is an electronic device which needs to travel in the indoor space. The examples of the electronic device may include moving agents such as robot cleaners, pet robots, or guide robots.

Therefore, when the moving agent is appropriately utilized, the sensing range may be expanded at a low cost.

On the other hand, the air quality described in the present invention may depend on the amount of dust in the air. That is, a good air quality may mean that the amount of dust in the air is small, and a poor air quality may mean that there is a large amount of dust in the air.

Figure 5:
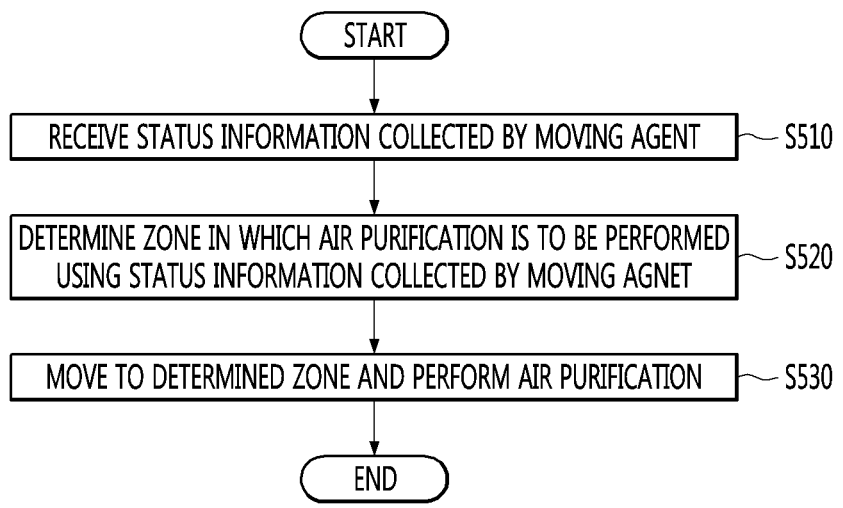
FIG. 5 is a view for describing a method for operating an air cleaner according to the embodiment of the present invention.

FIG. 5 is a view for describing a method for operating an air cleaner according to the embodiment of the present invention.

The method for operating an air cleaner according to an embodiment of the present invention may include receiving status information collected by a moving agent (S510), determining a specific zone in which air purification is to be performed using the status information collected by the moving agent (S520), and allowing a driving portion to move to the specific zone, and performing air purification in the specific zone (S530).

Here, the status information may include air quality information.

Specifically, the moving agent 51 may collect air quality information and transmit the air quality information to the air cleaner 700. Here, the air quality information may include the amount of dust obtained by the moving agent 51 or an evaluation value obtained based on the amount of dust.

The status information may also include dust occurrence information.

Specifically, a control unit of the moving agent may detect a status in which dust occurs by using various sensors included in the sensor unit 5150.

For example, when the user is shaking the bedding, the control unit of the moving agent may obtain dust occurrence information indicating that dust occurs at a specific position through sound, an image photographed by a camera, or the like and transmit the obtained dust occurrence information to the air cleaner 700.

Also, the status information may include the air quality information for each zone.

Specifically, the indoor space in which the air cleaner and the moving agent are located may include a plurality of zones.

In this case, the moving agent may sense the amount of dust in each of the plurality of zones in the indoor space and transmit the sensed amount of dust to the air cleaner 700. In this case, the processor of the air cleaner 700 may obtain the air quality of each of the plurality of zones based on the amount of dust in each of the plurality of zones.

On the other hand, the status information may include location information (or zone information) in which the air quality is collected, or location information (or zone information) in which the dust occurrence information is collected.

On the other hand, the processor of the air cleaner 700 may receive the status information and may determine a specific zone in which air purification is to be performed based on the received status information. Here, the specific zone in which air purification is to be performed may mean a zone where the level of air purification should be raised according to the status information.

In other words, the specific zone in which air purification is to be performed may mean a zone in which it is necessary to speed up air purification or rapidly improve air quality compared to other zones.

The indoor space may be divided into a plurality of zones. The moving agent 51 may sense the amount of dust in one or more of the plurality of zones and transmit the detected amount of dust to the air cleaner 700.

In this case, the air cleaner 700 may determine the air quality of one or more zones based on the amount of dust received. On the other hand, it is also possible for the moving agent to determine the air quality of one or more zones based on the amount of dust in the one or more zones, and then transmit the air quality of the one or more zones to the air cleaner 700.

On the other hand, the specific zone in which air purification is to be performed may be determined in various ways.

Specifically, the specific zone may be a zone where the air quality is lower than a predetermined value. In this case, the processor of the air cleaner may set a zone of which the air quality is lower than the predetermined value as a specific zone. Here, the fact that the air quality is lower than the predetermined value may mean that the air quality is worse than a preset degree.

On the other hand, a plurality of zones in which the air quality is lower than the predetermined value may exist. In this case, the processor of the air cleaner may set any one of the plurality of zones of which air quality is lower than the preset value as a specific zone in which air purification is to be performed.

As another example, the processor of the air cleaner may set a zone of which the air quality is worse than that of the others among the plurality of zones of which air quality is lower than the preset value as a specific zone in which air purification is to be performed.

On the other hand, the specific zone may be a zone with the worst air quality in the indoor space.

Specifically, the processor of the air cleaner may determine the zone with the worst air quality among the one or more zones in which the air quality is sensed as a specific zone in which air purification is to be performed.

On the other hand, the specific zone may be a zone of which the air quality does not reach a target air quality set by the user in the indoor space.

Further, the processor of the air cleaner may determine a zone of which the air quality does not reach the target air quality among the plurality of zones in the indoor space as a specific zone in which air purification is to be performed.

On the other hand, there may be a plurality of zones of which the air quality does not reach the target air quality. In this case, the processor of the air cleaner may set any one of the plurality of zones of which air quality does not reach the target air quality as a specific zone in which air purification is to be performed.

As another example, the processor of the air cleaner may set a zone of which the air quality is worse than that of the others, among the plurality of zones of which air quality does not reach the target air quality as a specific zone in which air purification is to be performed.

Further, the specific zone may also be a zone indicated by the dust occurrence information.

For example, when the user is shaking the bedding, the control unit of the moving agent may obtain dust occurrence information indicating that dust occurs at a specific position through sound, an image photographed by a camera, or the like and transmit the obtained dust occurrence information to the air cleaner 700.

In this case, the processor of the air cleaner may set the zone indicated by the dust occurrence information to a specific zone.

Figure 6:
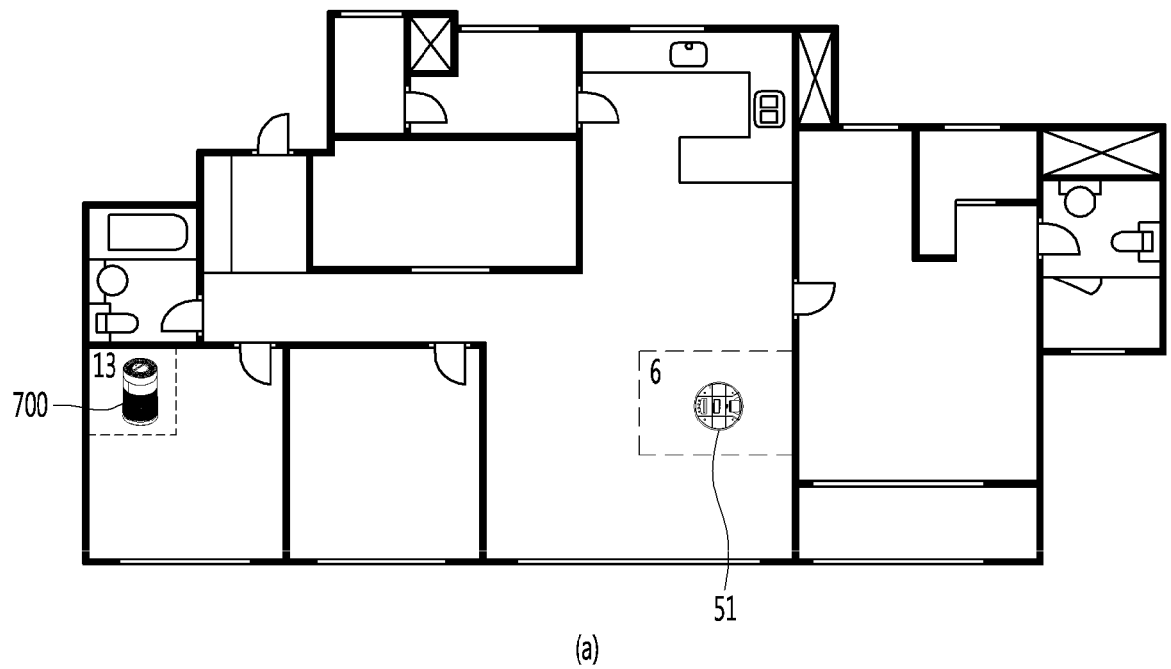
FIG. 6 is a diagram for describing a method for determining a zone in which air purification is to be subsequently performed based on status information collected by a moving agent while performing the air purification according to an embodiment of the present invention.
Figure 6:
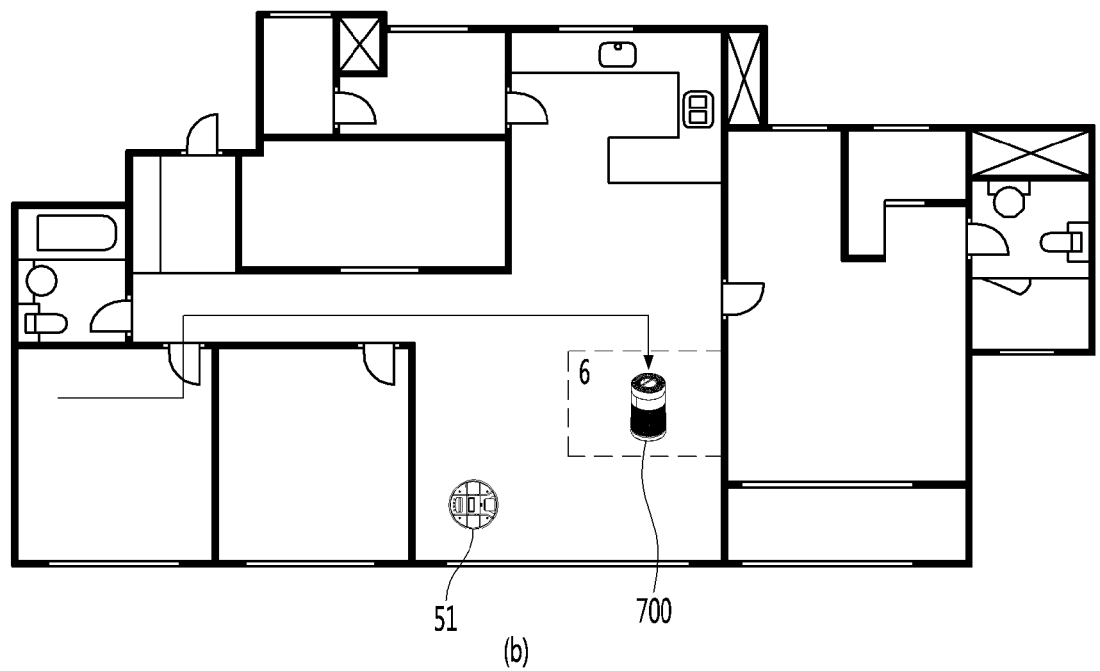

FIG. 6 is a diagram for describing a method for determining a zone in which air purification is to be subsequently performed based on status information collected by a moving agent while performing the air purification according to an embodiment of the present invention.

Meanwhile, while the air purification for a zone 13 in which the air cleaner 700 is currently located is being performed, the moving agent 51 may move in the indoor space and receive status information.

The moving agent 51 may receive the status information while moving in the indoor space and performing cleaning when the moving agent 51 is a cleaning robot, and receive the status information while moving in the indoor space and performing guide when the moving agent 51 is a guide robot.

The processor of the air cleaner may receive the status information collected by the moving agent 51 while the air cleaner 700 is performing the air purification for the zone 13 in which the air cleaner is currently located.

Specifically, the moving agent 51 may transmit the status information for a zone 6 where the moving agent 51 is currently located or a zone where the moving agent 51 has passed, to the air cleaner.

In this case, based on the status information collected by the moving agent 51, the processor of the air cleaner may determine a specific zone 6 in which air purification is to be performed.

Specifically, when the air quality of the zone in which the status information is collected by the moving agent 51 is lower than a predetermined value, the processor of the air cleaner may determine the zone where the status information is collected as a specific zone 6 in which air purification is to be subsequently performed.

Further, when the air quality of the zone in which the status information is collected by the moving agent 51 is lower than a target air quality set by the user, the processor of the air cleaner may determine the zone in which the status information is collected as a specific zone in which air purification is to be performed.

Further, when the moving agent 51 obtains dust occurrence information of a predetermined zone, the processor of the air cleaner may determine the zone where the dust occurrence information is collected as a specific zone in which air purification is to be subsequently performed.

Meanwhile, the processor of the air cleaner may complete air purification for the zone 13 where the air cleaner 700 is currently located.

Specifically, the processor of the air cleaner may complete the air purification after performing the air purification for a predetermined time for the zone 13 where the air cleaner 700 is currently located.

Further, when the air quality of the zone 13 in which the air cleaner 700 is currently located is improved to be a predetermined value or more, the processor of the air cleaner may complete the air purification.

When the air purification for the zone in which the air cleaner 700 is currently located is completed, the processor of the air cleaner may control the driving portion such that the air cleaner moves to the specific area 6.

As described above, according to the present invention, the air cleaner may collect the status information of other zones while performing the air purification, and may move when the air purification is completed.

Thus, there is an advantage that the air cleaner is able to move immediately without having to navigate to search for a place in which the air purification is to be subsequently performed.

Meanwhile, the moving agent may transmit position information (or zone information) of a predetermined zone to the air cleaner when the air quality of the predetermined zone is lower than a predetermined value or the target air quality set by the user.

In this case, when the air purification for the zone where the air cleaner is currently located is completed, the processor of the air cleaner may move to a predetermined zone using the position information (or zone information) of the predetermined zone and then perform air purification for the predetermined zone.

Also, the moving agent may transmit the status information of the predetermined zone to the air cleaner only when the air quality of the predetermined zone is lower than the predetermined value or the target air quality set by the user.

Figure 7:
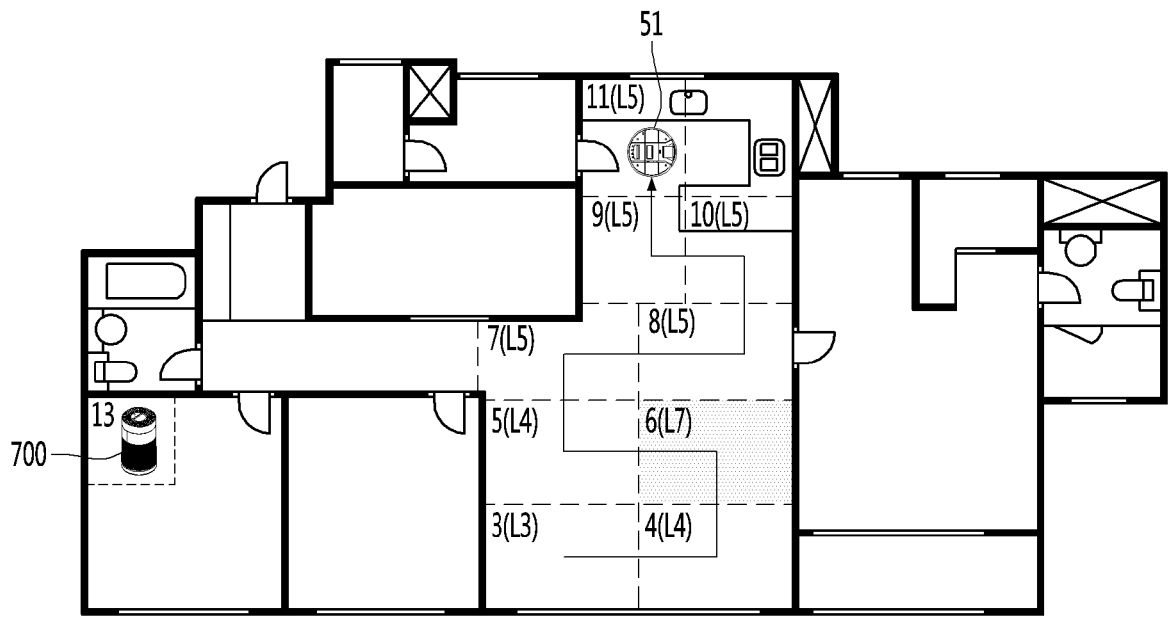
FIG. 7 is a diagram for describing a method for determining a zone in which air purification is to be subsequently performed based on status information of a plurality of zones collected by a moving agent while performing the air purification according to an embodiment of the present invention.
Figure 7:
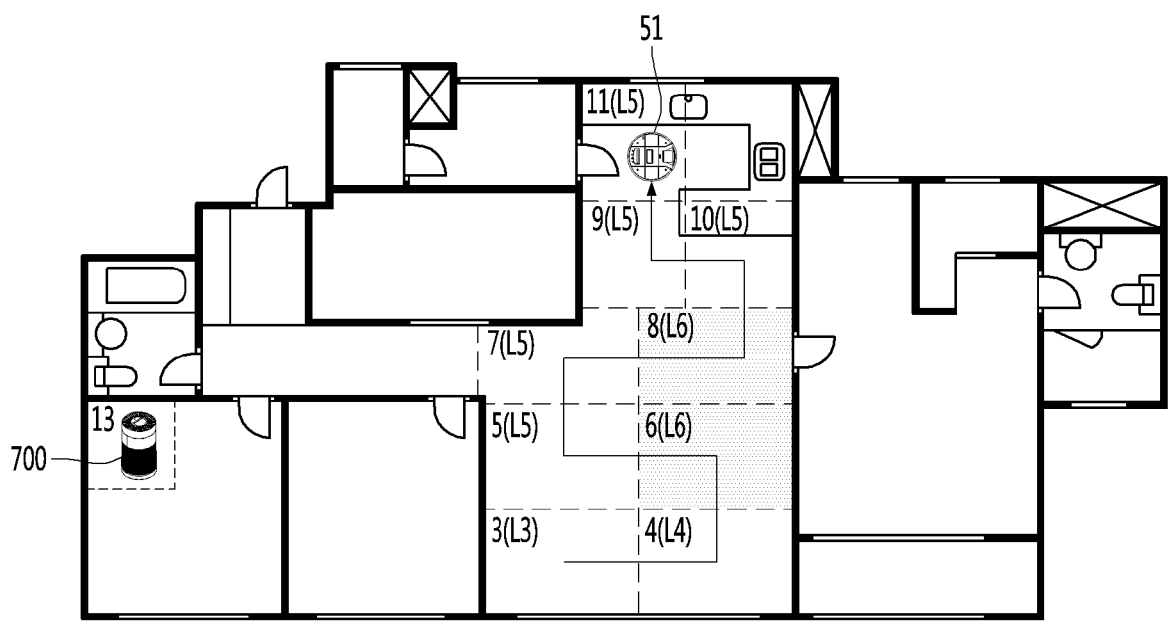

FIG. 7 is a diagram for describing a method for determining a zone in which air purification is to be subsequently performed based on status information of a plurality of zones collected by a moving agent while performing the air purification according to an embodiment of the present invention.

While the air purification for a zone 13 in which the air cleaner 700 is currently located is being performed, the moving agent 51 may move in the indoor space and collect status information. In this case, the moving agent 51 may collect status information for a plurality of zones 3, 4, 5, 6, 7, 8, 9, 10, and 11.

While the air purification for a zone 13 in which the air cleaner 700 is currently located is being performed, a processor of the air cleaner may receive the status information of the plurality of zones which is collected by the moving agent 51.

On the other hand, when the moving agent collects the status information for the plurality of zones while the air cleaner performing the air purification for a zone where the air cleaner is currently located, the specific zone may be a zone of which air quality is worst among the plurality of zones.

Specifically, based on the status information for the plurality of zones 3, 4, 5, 6, 7, 8, 9, 10 and 11 collected by the moving agent 51, the processor of the air cleaner may determine a zone of which the air quality is worst among the plurality of zones 3, 4, 5, 6, 7, 8, 9, 10 and 11. Then, the processor of the air cleaner may determine a zone of which air quality is worst among the plurality of zones 1, 2, 3, 4, 5, 6, 7, 8, 9, 10, and 11 as a specific zone in which air purification is to be subsequently performed.

For example, referring to FIG. 7A, the air quality of a third zone is at a three level and is best among the plurality of zones 3, 4, 5, 6, 7, 8, 9, 10 and 11, and the air quality of a sixth zone is worst among the plurality of zones 3, 4, 5, 6, 7, 8, 9, 10 and 11. In this case, Then, the processor of the air cleaner may determine the sixth zone of which air quality is worst among the plurality of zones 1, 2, 3, 4, 5, 6, 7, 8, 9, 10, and 11 as a specific zone in which air purification is to be subsequently performed.

Meanwhile, the specific zone may be any one zone in which an air quality is lower than a predetermined value among the plurality of zones 3, 4, 5, 6, 7, 8, 9, 10, and 11 when the moving agent 51 collects the status information for the plurality of zones 3, 4, 5, 6, 7, 8, 9, 10, and 11 while the air purification for a zone 13 in which the air cleaner 700 is currently located is being performed.

Specifically, based on the status information for the plurality of zones 3, 4, 5, 6, 7, 8, 9, 10 and 11 collected by the moving agent 51, the processor of the air cleaner may determine a plurality of zones of which air quality is lower than the predetermined value among the plurality of zones 3, 4, 5, 6, 7, 8, 9, 10 and 11. Further, the processor of the air cleaner may determine any one of the plurality of zones of which air quality is lower than the predetermined value as a specific zone in which air purification is to be subsequently performed.

For example, referring to FIG. 7B, the air quality of the eighth and sixth zones are at a six level and are worst among the plurality of zones 3, 4, 5, 6, 7, 8, 9, 10, and 11. In this case, the processor of the air cleaner may determine any one of the eighth and sixth zones as a specific zone in which air purification is to be subsequently performed.

In this case, the processor of the air cleaner may determine a zone closest to a current position of the air cleaner among the plurality of zones of which air quality is lower than the predetermined value as a specific zone in which air purification is to be subsequently performed.

On the other hand, the specific zone may be any one zone of which air quality is lower than a target air quality set by a user when the moving agent 51 collects the status information for the plurality of zones while the air purification for the zone where the air cleaner 700 is currently located is being performed.

As described above, according to the present invention, the air cleaner may collect the status information of a plurality of zones even during the air purification, and move when the air purification is completed. Thus, there is an advantage that the air cleaner is able to move immediately to a place where air purification is most required, without having to go around to search for a place in which the air purification is to be subsequently performed.

Figure 8:
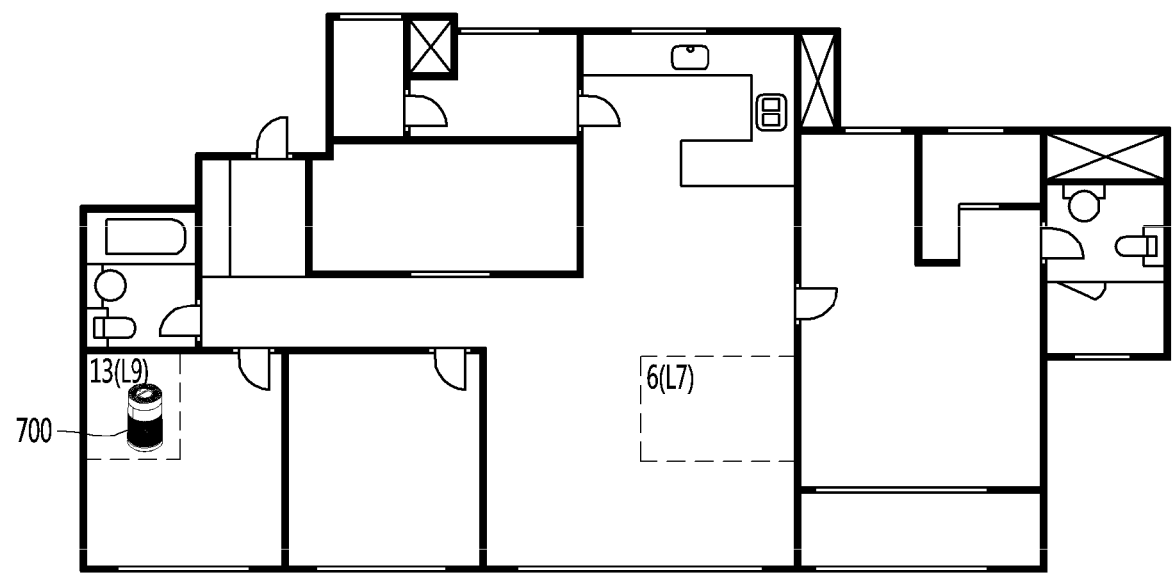
FIG. 8 is a diagram for describing a method for completing air purification for a zone in which an air cleaner is currently located, according to an embodiment of the present invention.
Figure 8:
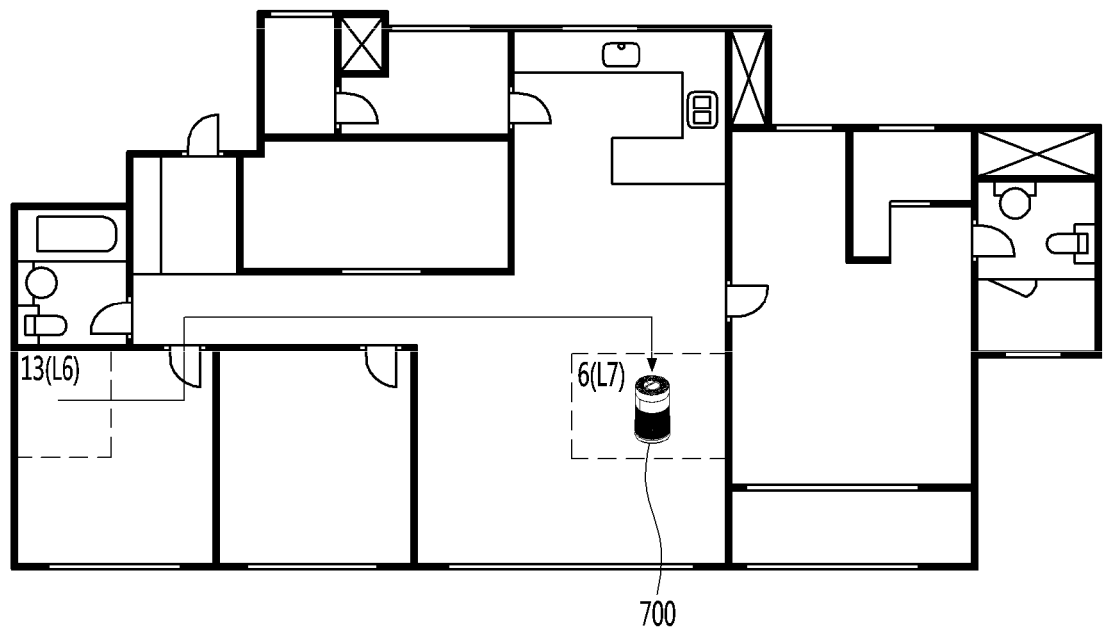

FIG. 8 is a diagram for describing a method for completing air purification for a zone in which an air cleaner is currently located, according to an embodiment of the present invention.

It has been described above that, when the air cleaner 700 has performed air purification for a zone in which the air cleaner is currently located for a predetermined time or more, or when the air quality of the zone 13 in which the air cleaner 700 is currently located is improved to be a predetermined value or more, the processor of the air cleaner has completed air purification.

The present invention is not limited thereto, and the processor of the air cleaner may compare the air quality of a zone where the air cleaner is currently located and the air quality of a specific zone to determine when to complete the air purification.

Specifically, the air cleaner may include a sensor for collecting status information including at least one of air quality and dust occurrence information.

The processor of the air cleaner may collect status information for the zone 13 where the air cleaner 700 is currently located while the air cleaner 700 is performing the air purification for the zone 13 where the air cleaner 700 is currently located.

Meanwhile, while the air purification for a zone 13 in which the air cleaner 700 is currently located is being performed, the moving agent 51 may move in the indoor space and receive status information.

The processor of the air cleaner may receive the status information collected by the moving agent 51 while the air cleaner 700 is performing the air purification for the zone 13 in which the air cleaner is currently located.

In this case, based on the status information collected by the moving agent 51, the processor of the air cleaner may determine a specific zone 6 in which air purification is to be performed.

Meanwhile, the processor of the air cleaner may complete air purification for the zone 13 where the air cleaner 700 is currently located.

In this case, the processor may complete air purification for the zone 13 in which the air cleaner 700 is currently located and move to the specific zone 6 when the air quality of the zone 13 where the air cleaner 700 is currently located is better than the air quality of the specific zone 6.

For example, referring to FIG. 8A, when the air quality of the zone 13 where the air cleaner 700 is currently located is at a nine level, the processor of the air cleaner had received the status information indicating that the air quality of the sixth zone is at a seven level.

In this case, since the air quality of the zone 13 where the air cleaner 700 is currently located is worse than the air quality of the sixth zone, the processor of the air cleaner may continuously perform air purification in the zone 13 where the air cleaner 700 is currently located.

On the other hand, referring to FIG. 8B, the air quality of the zone 13 in which the air cleaner 700 is currently located has improved to be a six level after time elapse. In this case, since the air quality of the zone 13 where the air cleaner 700 is currently located has been better than the air quality of the specific zone 6, the processor of the air cleaner may complete air purification for the zone 13 in which the air cleaner 700 is currently located and move to the specific zone 6

Thereafter, the processor of the air cleaner may perform air purification for the specific zone 6.

When the air quality of the zone where the air cleaner is currently located is worse than the air quality of the specific zone, the air purification is more urgent for the zone where the air cleaner is currently located. According to the present invention, since the air cleaner moves to a specific zone after sufficiently performing the air purification for the zone where the air cleaner is currently located, there is an advantage that air purification may be preferentially performed from a zone of which air quality is worst.

On the other hand, air purification for the zone in which the air cleaner is currently located may be terminated due to other factors.

Specifically, when the air cleaner performs air purification for the zone 13 in which the air cleaner is current located for a predetermined time or more, the processor of the air cleaner may complete the air purification for the zone 13 in which the air cleaner is currently located, and move to the specific zone 6. Thereafter, the processor of the air cleaner may perform air purification for the specific zone 6.

Further, when the air quality of the zone 13 where the air cleaner is currently located is improved to be a predetermined value or more, the processor of the air cleaner may complete the air purification for the zone 13 where the air cleaner is currently located and move to the specific zone 6. Thereafter, the processor of the air cleaner may perform air purification for the specific zone 6.

Completing the air purification and moving when the air quality of the zone where the air cleaner is currently located is better than the air quality of the specific zone may cause frequent movement of the air cleaner.

Accordingly, the present invention may prevent the inefficiency that may be caused by the frequent movement of the air cleaner by allowing the air cleaner to sufficiently perform air purification for a zone being cleaned and then move.

It has been described in the above embodiment, that the moving agent collects the status information of another place while moving when the air cleaner performs the air purification.

A case in which both the air cleaner and the moving agent collect the status information while moving will be describe below.

Figure 9:
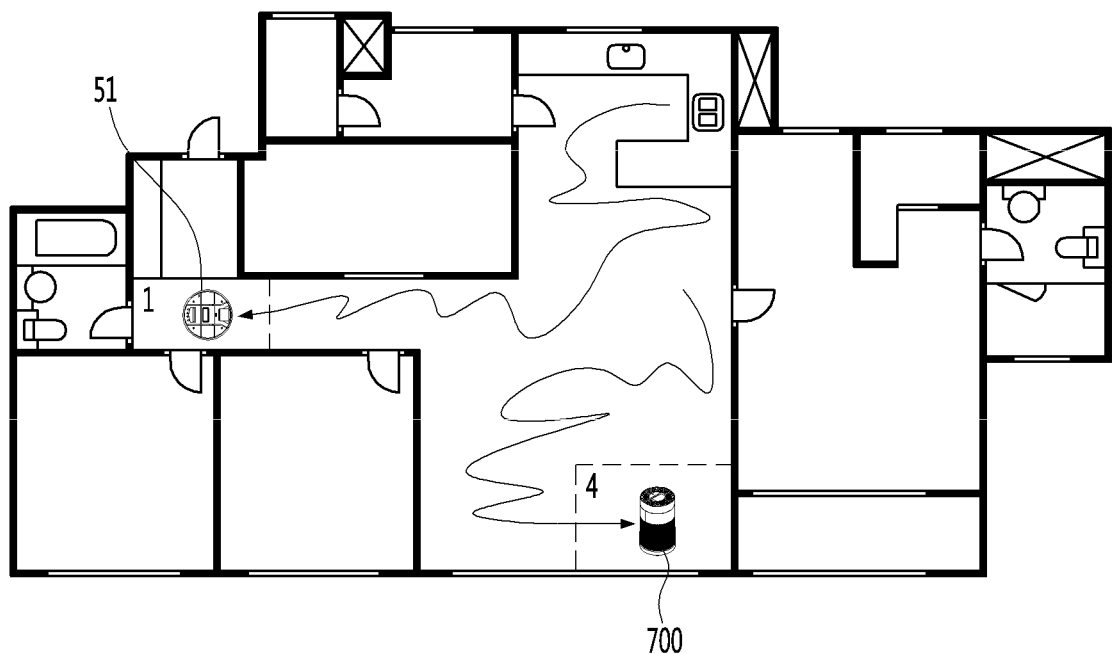
FIG. 9 is a view for describing a method by which an air cleaner and a moving agent both collect status information while moving and determine a zone in which air purification is to be performed according to the collected status information, according to an embodiment of the present invention.
Figure 10:
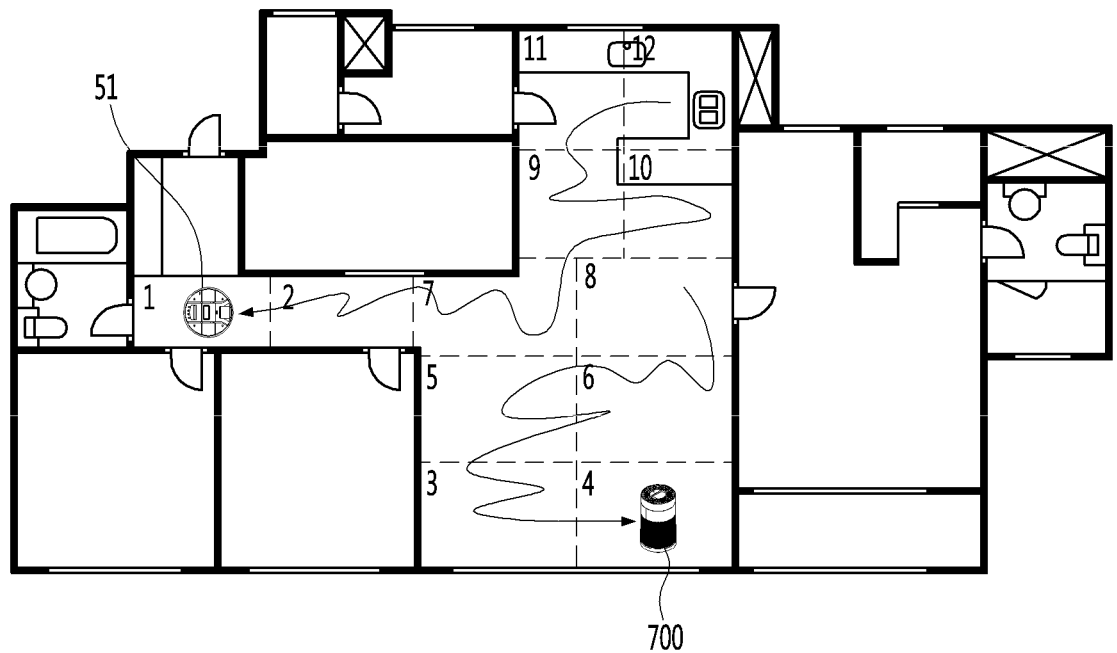
FIG. 10 is a view for describing a method by which an air cleaner and a moving agent both collect status information of a plurality of zones while moving and determine a zone in which air purification is to be performed according to the collected status information of the plurality of zones, according to an embodiment of the present invention.

FIG. 9 is a view for describing a method by which an air cleaner and a moving agent both collect status information while moving and determine a zone in which air purification is to be performed according to the collected status information, according to an embodiment of the present invention.

The processor of the air cleaner may control a driving portion such that the air cleaner moves and collect status information through a sensor while the air cleaner is moving or in a state in which the air cleaner moves and then stops.

Further, the processor of the moving agent may control a travel driving portion such that the moving agent moves, and collect status information while the air cleaner is moving or in a state in which the air cleaner moves and then stops. In this case, the processor of the moving agent may transmit the collected status information to the air cleaner.

Then, the processor may determine a specific zone in which the air purification is to be performed using the status information collected by the moving agent and the status information collected by the sensor.

Specifically, when the air quality of a zone 1 in which the moving agent 51 collects the status information is lower than a predetermined value, the processor of the air cleaner may determine the calculates the zone 1 in which the moving agent 51 collects the status information as a specific zone in which air purification is to be performed. Further, when the air quality of a zone 4 in which the air cleaner 700 collects the status information is lower than a predetermined value, the processor of the air cleaner may determine the calculates the zone 4 in which the air cleaner 700 collects the status information as a specific zone 6 in which air purification is to be performed.

When the air quality of a zone 1 in which the moving agent 51 collects the status information is lower than a target air quality set by a user, the processor of the air cleaner may determine the calculates the zone 1 in which the moving agent 51 collects the status information as a specific zone in which air purification is to be performed. Further, when the air quality of a zone 4 in which the air cleaner 700 collects the status information is lower than a target air quality set by a user, the processor of the air cleaner may determine the calculates the zone 4 in which the air cleaner 700 collects the status information as a specific zone 6 in which air purification is to be performed.

Further, when dust occurrence information is obtained in the zone 1 in which the moving agent 51 collects the status information, the processor of the air cleaner may determine the calculates the zone 1 in which the moving agent 51 collects the status information as a specific zone in which air purification is to be performed. Further, when dust occurrence information is obtained in the zone 4 in which the air cleaner 700 collects the status information is lower than a predetermined value, the processor of the air cleaner may determine the calculates the zone 1 in which the air cleaner 700 collects the status information as a specific zone 6 in which air purification is to be performed.

As described above, according to the present invention, it is possible to determine a zone where air purification is to be performed by using both the status information collected by the moving agent and the status information collected by the air cleaner. Accordingly, according to the present invention, it is possible to expand a detection range of the status information, and it is not necessary to arrange a plurality of sensors in a plurality of zones of the indoor space because the status information is collected using two moving electronic devices.

On the other hand, the air quality of both the zone 1 where the status information is collected by the moving agent 51 and the zone 4 where the status information is collected by the air cleaner 700 is lower than the predetermined value or the target air quality set by the user.

In this case, the processor may compare the air quality of the zone 1 where the status information is collected by the moving agent 51 with the air quality of the zone 4 where the status information is collected by the air cleaner 700 and determines a specific zone in which air purification is to be performed.

When the air quality of the first zone 1 in which the moving agent 51 collects status information and the air quality of the second zone 4 in which the sensor collects status information are both lower than a predetermined value or a target air quality set by a user, the processor of the air cleaner may determine a zone of which air quality is worse than the other among the first zone 51 and the second zone 700 as a specific zone in which air purification is to be performed.

When the air quality of the first zone 1 in which the moving agent 51 collects status information and the air quality of the second zone 4 in which the sensor of the air cleaner collects status information are both lower than a predetermined value or a target air quality set by a user, the processor of the air cleaner 700 may determine the second zone 4 in which the sensor of the air cleaner collects status information as a specific zone in which air purification is to be performed.

As described above, according to the present invention, it is possible to determine a zone in which air purification is to be performed using both the status information collected by the moving agent and the status information collected by the air cleaner, and preferentially perform air purification on a zone of which the air quality is worse than that of the other. Therefore, according to the present invention, the detection range of the status information may be expanded, and the air purification may be preferentially performed on a zone where air purification is more required.

Further, according to the present invention, it is possible to determine one or more zones in which air purification is to be performed using both the status information collected by the moving agent and the status information collected by the air cleaner, and preferentially perform air purification on a zone in which the air cleaner collects status information among the zones. Thus, according to the present invention, it is possible to expand the detection range of the status information, and when there are a plurality of areas requiring air purification, to perform air purification for a zone close to the air cleaner, thereby preventing waste due to movement.

On the other hand, when a specific zone is determined, the processor of the air cleaner may perform air purification for the specific zone.

Specifically, when the air cleaner is currently located in a specific zone, the processor of the air cleaner may perform air purification for the zone where the air cleaner is located. On the other hand, when the air cleaner is not located in the specific zone, the processor of the air cleaner may control the driving portion such that the air cleaner moves to the specific zone and perform air purification in the specific zone.

FIG. 9 is a view for describing a method by which an air cleaner and a moving agent both collect status information of a plurality of zones while moving and determine a zone in which air purification is to be performed according to the collected status information of the plurality of zones, according to an embodiment of the present invention.

The processor of the air cleaner may control a driving portion such that the air cleaner moves and collect status information for a plurality of zones 3, 4, 5, 6, and 7 through a sensor while the air cleaner is moving or in a state in which the air cleaner moves and then stops.

Further, the processor of the moving agent may control a travel driving portion such that the moving agent moves, and collect status information for the plurality of zones 3, 4, 5, 6, and 7 while the air cleaner is moving or in a state in which the air cleaner moves and then stops. In this case, the processor of the moving agent may transmit the status information for the plurality of zones to the air cleaner.

Then, the processor may determine a specific zone in which the air purification is to be performed using the status information for the plurality of zones 3, 4, 5, 6, and 7 collected by the moving agent and the status information for the plurality of zones 3, 4, 5, 6, and 7 collected by the sensor.

Here, the specific zone may be a zone having the worst air quality among a plurality of zones in which the moving agent collect the status information and a plurality of zones in which a sensor of the air cleaner collect the status information.

Specifically, the processor of the air cleaner may determine a zone of which the air quality is worst among the plurality of zones 1, 2, 7, 9, 10, 11, and 12 in which the moving agent 51 collects status information and the plurality of zones 3, 4, 5, 6, and 8 in which the air cleaner 700 collects status information. Further, the processor of the air cleaner may determine a zone of which the air quality is worst as a specific zone in which air purification is to be performed among the plurality of zones 1, 2, 7, 9, 10, 11, and 12 in which the moving agent 51 collects status information and the plurality of zones 3, 4, 5, 6, and 8 in which the air cleaner 700 collects status information.

On the other hand, the specific zone may be a zone of which the air quality is lower than a predetermined value among a plurality of zones in which the moving agent collect the status information and a plurality of zones in which a sensor of the air cleaner collect the status information.

Specifically, the processor of the air cleaner may determine a plurality of zones of which the air quality is lower than a predetermined value, among the plurality of zones 1, 2, 7, 9, 10, 11, and 12 in which the moving agent 51 collects status information and the plurality of zones 3, 4, 5, 6, and 8 in which the air cleaner 700 collects status information. Further, the processor of the air cleaner may determine any one of the plurality of zones of which air quality is lower than the predetermined value as a specific zone in which air purification is to be performed.

In this case, the processor of the air cleaner may determine a zone closest to a current position of the air cleaner among the plurality of zones of which air quality is lower than the predetermined value as a specific zone in which air purification is to be subsequently performed.

On the other hand, the specific zone may be a zone of which the air quality is lower than a target air quality set by the user, among a plurality of zones in which the moving agent collect the status information and a plurality of zones in which a sensor of the air cleaner collect the status information.

In this case, the processor of the air cleaner may determine a zone closest to a current position of the air cleaner among the plurality of zones of which air quality is lower than the target air quality as a specific zone in which air purification is to be subsequently performed.

As described above, according to the present invention, it is possible to expand the sensing range, and quickly search for a zone requiring air purification among the plurality of zones using both the status information collected by the moving agent and the status information collected in the air cleaner.

Figure 11:
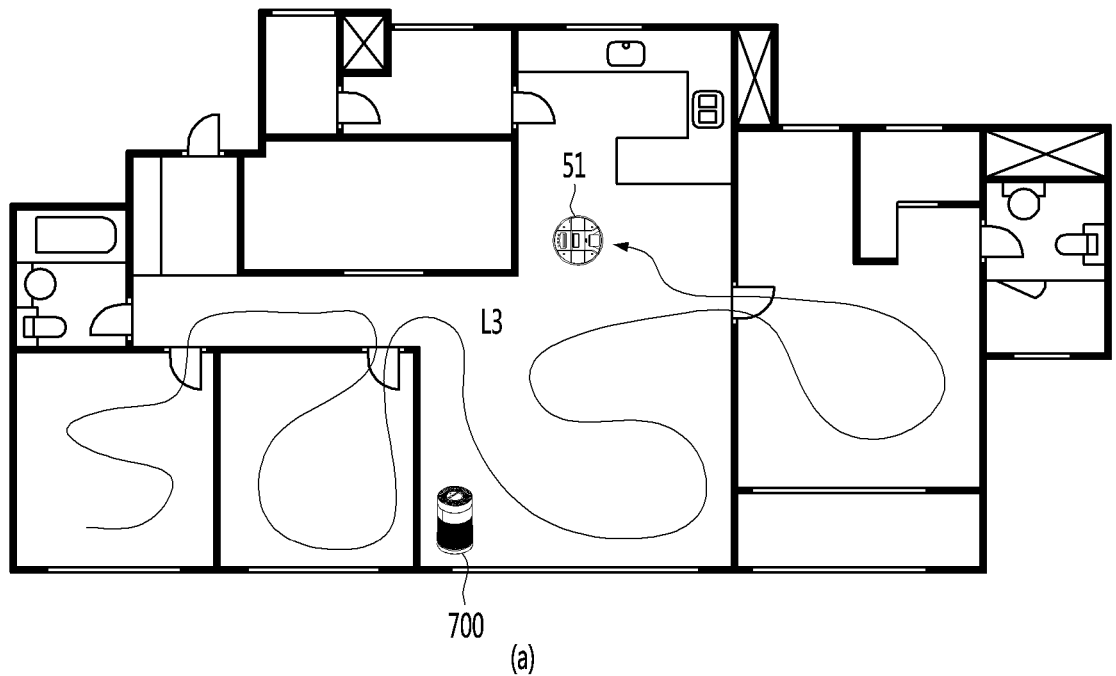
FIG. 11 is a view for describing a method for starting an operation of the air cleaner as an air quality deteriorates, according to an embodiment of the present invention.
Figure 11:
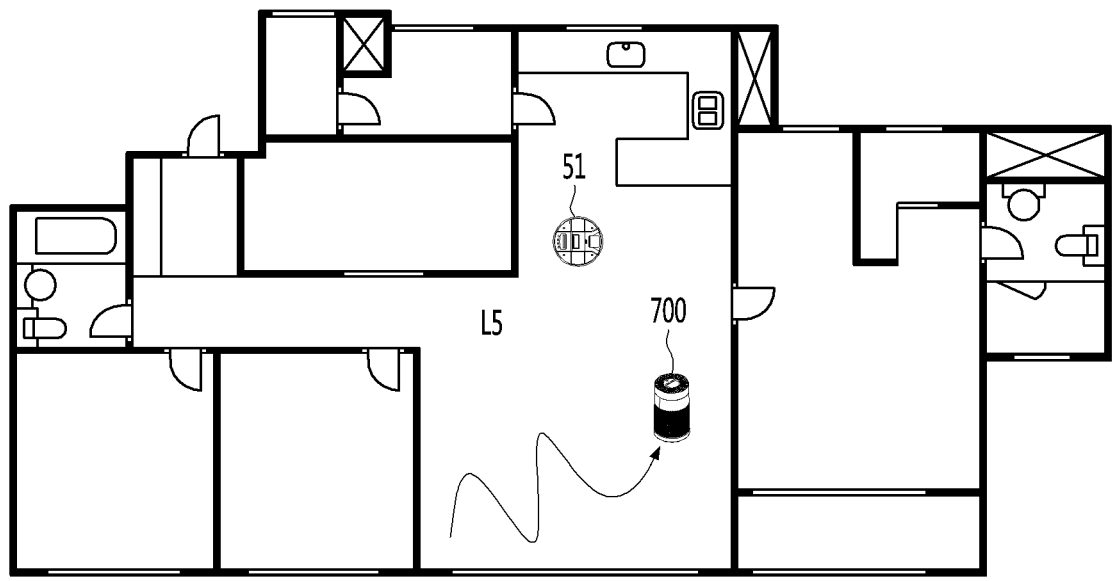

FIG. 11 is a view for describing a method for starting an operation of the air cleaner as an air quality deteriorates, according to an embodiment of the present invention.

When the purification start command is received from the moving agent as the air quality of an indoor space deteriorates, the processor of the air cleaner may start air purification.

Specifically, referring to FIG. 11A, the air cleaner 700 is currently in an inactive state Here, deactivation of the air cleaner may mean the power off of the air cleaner, or a state in which the air cleaner does not perform air purification or collecting of status information, or does not move.

Meanwhile, in a state where the air cleaner 700 is inactive, the moving agent can collect the status information of the indoor space. In this case, the moving agent may collect the status information of the indoor space while moving or stopping.

On the other hand, the moving agent 51 may determine whether the air quality of the indoor space has deteriorated. Specifically, the moving agent 51 may determine whether the air quality of the indoor space has become lower than a predetermined value. In this case, the moving agent may collect status information of a plurality of zones in the indoor space, and determine whether the air quality of the indoor space is lower than the predetermined value using the status information of the plurality of zones.

When the air quality of the indoor space has deteriorated, the moving agent may transmit a purification start command to the air cleaner.

On the other hand, when a purification start command is received from the moving agent, the processor of the air cleaner may start air purification.

In this case, the processor of the air cleaner may perform air purification at a current position, and perform the air purification while moving on the indoor space as shown in FIG. 11B.

When the indoor air quality is good, it is not necessary to operate the air cleaner. Accordingly, when the air quality of the indoor space is good, it is possible to reduce power consumption of the air cleaner by allowing the air cleaner not to perform dust detection and air purification. In addition, according to the present invention, when the moving agent may sense an air quality while moving, instead of the air cleaner, and when the air quality deteriorates, allow the air cleaner to be activated, thereby reducing power consumption and operating the air cleaner when necessary.

Figure 12:
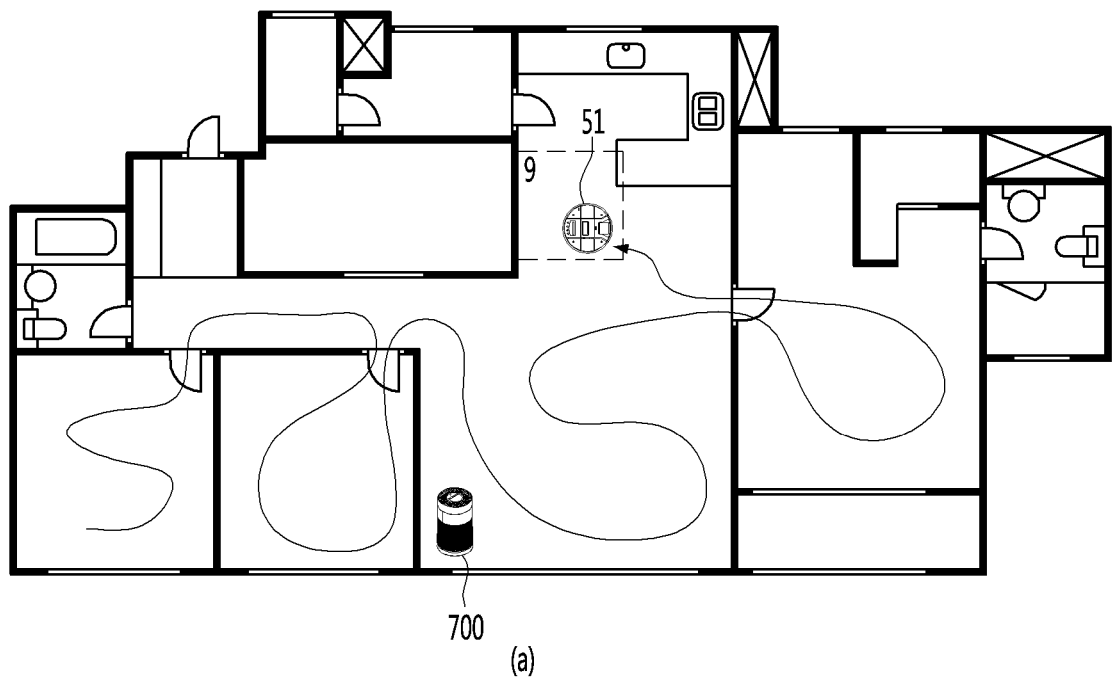
FIG. 12 is a view for describing a method by which air conditioner starts air purification in a zone of which an air quality has deteriorated, according to an embodiment of the present invention.
Figure 12:
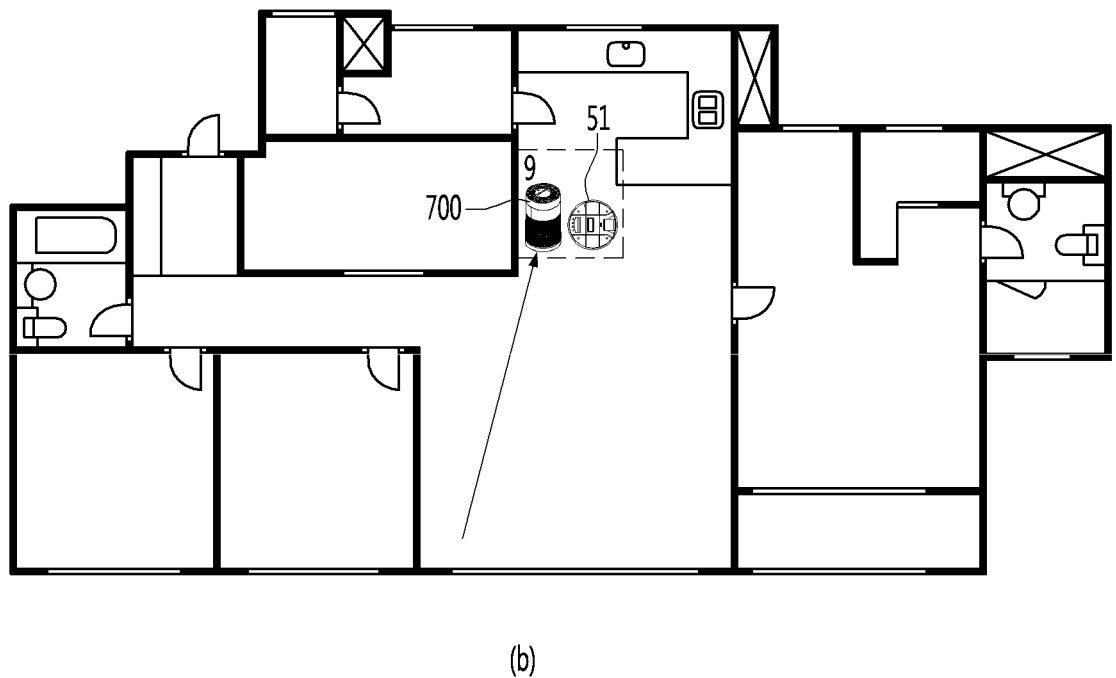

FIG. 12 is a view for describing a method by which air conditioner starts air purification in a zone of which an air quality has deteriorated, according to an embodiment of the present invention.

As the air quality of a predetermined zone of the indoor space deteriorates, when a purification start command and status information for a predetermined zone are received from the moving agent, the processor of the air cleaner may determines the predetermined zone as a specific zone, moves to the specific zone, and perform air purification.

Specifically, referring to FIG. 12A, the air cleaner 700 is currently in a deactivated state. Here, deactivation of the air cleaner may mean the power off of the air cleaner, or a state in which the air cleaner does not perform air purification and collecting of status information.

Meanwhile, in a state where the air cleaner 700 is deactivated, the moving agent may collect the status information of the indoor space. In this case, the moving agent may collect the status information of the indoor space while moving or stopping.

On the other hand, the moving agent 51 may determine whether an air quality of a predetermined zone 9 has deteriorated. Specifically, the moving agent 51 may determine whether the air quality of the predetermined zone 9 has become lower than a predetermined value or a target air quality set by the user.

When the air quality of the predetermined zone 9 of the indoor space has deteriorated, the moving agent 51 may transmit a purification start command and the status information of the predetermined zone 9 to the air cleaner.

On the other hand, when a purification start command is received from the moving agent, the processor of the air cleaner may start air purification. The processor of the air cleaner may also determine the predetermined zone 9 as a specific zone in which air purification is to be performed using the received status information of the predetermined zone 9.

In this case, the processor of the air cleaner may move to the specific zone and perform air purification for the specific zone, as shown in FIG. 12B.

In another embodiment, the moving agent 51 may obtain dust occurrence information in the predetermined zone 9.

When dust occurrence information is obtained in the predetermined zone 9, the moving agent 51 may transmit the purification start command and the status information of the predetermined zone 9 to the air cleaner.

On the other hand, when the purification start command and the status information of the predetermined zone 9 are received from the moving agent, the processor of the air cleaner processor of the air cleaner may also determine the predetermined zone 9 as a specific zone in which air purification is to be performed using the received status information of the predetermined zone 9.

Further, the processor of the air cleaner may move to the specific zone and perform air purification for the specific zone.

When an air quality of an indoor space is good, it is not necessary to operate the air cleaner. Accordingly, when the air quality of the indoor space is good, it is possible to reduce power consumption of the air cleaner by allowing the air cleaner not to perform dust detection and air purification. According to the present invention, when the moving agent detects an air quality while moving instead of the air cleaner and air purification is necessary in a predetermined zone, the air cleaner may immediately move to perform air purification, thus allowing the air cleaner to operate in the corresponding zone when air purification is necessary while reducing power consumption.

Figure 13:
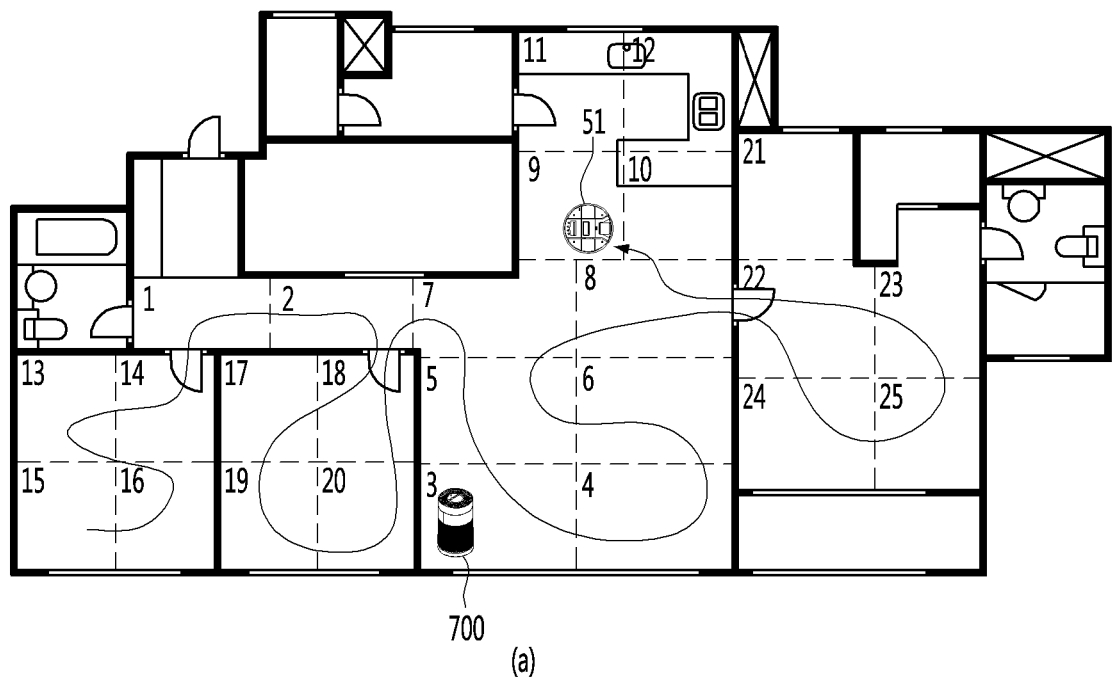
FIG. 13 is a view for describing a method for providing status information for a plurality of zones to an air cleaner when the air cleaner is activated according to an embodiment of the present invention.
Figure 13:

FIG. 13 is a view for describing a method for providing status information for a plurality of zones to an air cleaner when the air cleaner is activated according to an embodiment of the present invention.

Activation of the air cleaner may mean that the air cleaner is powered on, the air cleaner starts air purification, or the air cleaner starts to collect status information.

Referring to FIG. 13A, the air cleaner 700 is currently in a deactivated state.

On the other hand, in a state in which the air cleaner 700 is deactivated, the moving agent may collect status information for a plurality of zones 1, 2, 3, 4, 5, 6, 7, 8, 9, 13, 14, 15, 16, 17, 18, 19, 20, 22, 23, 24, and 25.

When the air cleaner is activated, the processor of the air cleaner may receive the status information on the plurality of zones, collected while the air cleaner is deactivated, from the moving agent through the communication unit.

In this case, the processor of the air cleaner may determine a specific zone in which the air purification is to be performed using the status information for the plurality of zones.

Specifically, the processor of the air cleaner may determine a zone of which an air quality is worst among the plurality of zones 1, 2, 3, 4, 5, 6, 7, 8, 9, 13, 14, 15, 16, 17, 18, 19, 20, 22, 23, 24, and 25 as a specific zone in which air purification is to be performed.

Further, the processor of the air cleaner may determine a zone of which an air quality does not reach a target air quality among the plurality of zones 1, 2, 3, 4, 5, 6, 7, 8, 9, 13, 14, 15, 16, 17, 18, 19, 20, 22, 23, 24, and 25 as a specific zone in which air purification is to be performed.

Further, the processor of the air cleaner may determine a zone of which an air quality is worse than a predetermined value among the plurality of zones 1, 2, 3, 4, 5, 6, 7, 8, 9, 13, 14, 15, 16, 17, 18, 19, 20, 22, 23, 24, and 25 as a specific zone in which air purification is to be performed.

Further, the processor of the air cleaner may determine a zone in which dust occurrence information is issued among the plurality of zones 1, 2, 3, 4, 5, 6, 7, 8, 9, 13, 14, 15, 16, 17, 18, 19, 20, 22, 23, 24, and 25 as a specific zone in which air purification is to be performed.

On the other hand, when the specific zone is determined, the processor of the air cleaner may move to the determined specific zone 25 and perform the air purification for the specific zone 25, as shown in FIG. 13B.

When the air cleaner is newly activated, the air cleaner may need to start moving and search for a zone where air purification is required. In it noted that the present invention utilizes status information collected by the moving agent while the air cleaner is deactivated. Thus, there is an advantage that the activated air cleaner is able to immediately move and perform air purification without searching for a zone where the air purification is required.

Figure 14:
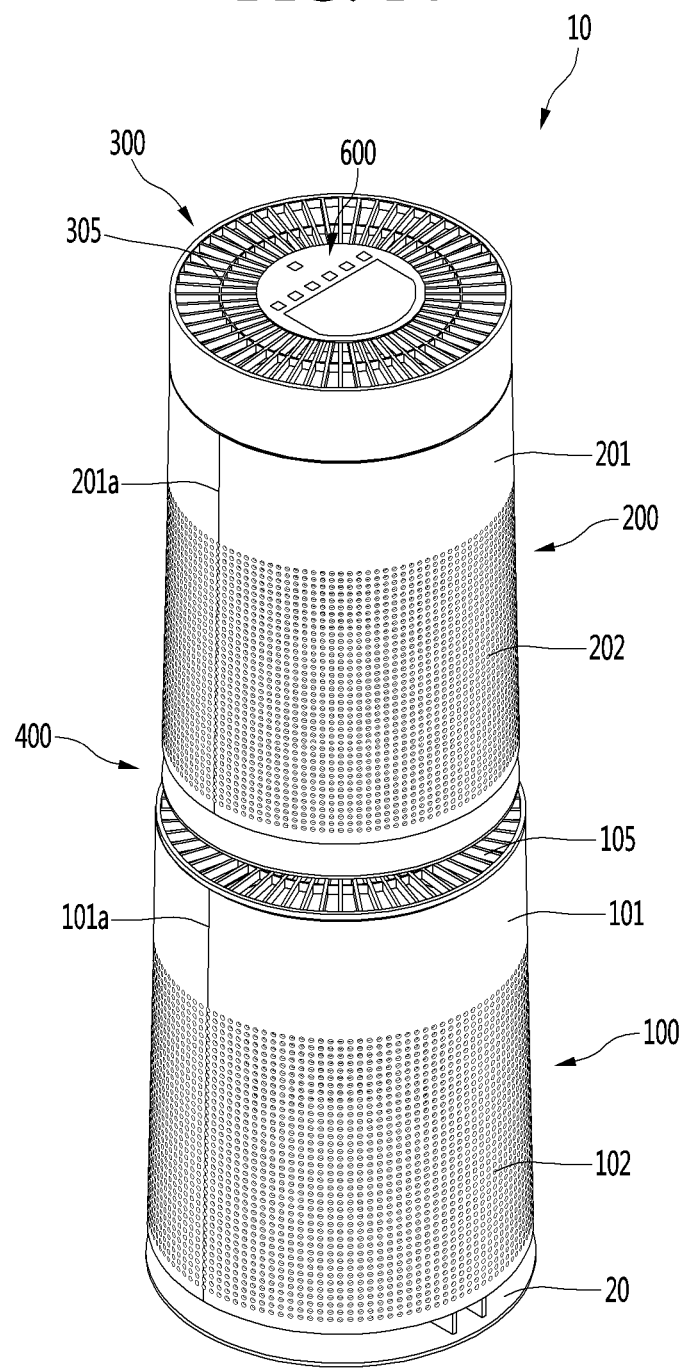
FIG. 14 is a perspective view illustrating an outer appearance of an air cleaner according to an embodiment.

FIG. 14 is a perspective view illustrating an outer appearance of an air cleaner according to an embodiment.

Referring to FIG. 14, the air cleaner 10 according to the embodiment includes blowing devices 100 and 200 which generate air flow and an air flow control device 300 which changes a discharging direction of the air flow generated in the blowing devices 100 and 200. The blowing devices 100 and 200 include a first blowing device 100 which generates first air flow and a second blowing device 200 which generates second air flow.

The first blowing device 100 and the second blowing device 200 are disposed in the vertical direction. As an example, the second blowing device 200 may be disposed on an upper side of the first blowing device 100. In this case, the first air flow forms a flow which sucks indoor air existing in a lower side of the air cleaner 10 and the second air flow forms a flow which sucks indoor air existing in the upper side of the air cleaner 10.

The air cleaner 10 includes cases 101 and 201 which form an outer appearance thereof.

In detail, the cases 101 and 201 include a first case 101 which forms an outer appearance of the first blowing device 100. The first case 101 may have a cylindrical shape. An upper portion of the first case 101 may be configured to have a diameter which is smaller than a lower portion thereof. That is, the first case 101 may have a truncated cone shape.

The first blowing device 100 and the second blowing device 200 may be referred to as "first air cleaning module 100" and "second air cleaning module 200", respectively, in that the first blowing device 100 and the second blowing device 200 perform the function of cleaning the air in a cleaning space. The first blowing device 100 may be referred to as "lower air cleaning module" or "lower module" in that the first blowing device 100 is disposed on the lower portion of the air cleaner 10 and the second blowing device 200 may be referred to as "upper air cleaning module" or "upper module" in that the second blowing device 200 is disposed on the upper portion of the air cleaner 10. The air flow control device 300 may be referred to as "air flow control module 300".

The first case 101 includes a first separation portion 101a which assembles or disassembles two parts which constitute the first case 101. The first case 101 further includes a hinge portion (not shown) which is provided on the opposite of the first separation portion 101a. The two parts are capable of relatively rotating about the hinge portion.

When at least one part of the two parts rotates, the first case 101 is opened, and is capable of being separated from the air cleaner 10. A locking device may be provided on a portion at which the two parts are coupled, that is, a side opposite to the hinge portion. The locking device may include a locking projection or a magnet member. An inside component of the first blowing device 100 is capable of being replaced or being repaired by the first case 101 being opened.

The first case 101 includes a first suction portion 102 in which air is sucked. The first suction portion 102 includes a through hole which is formed by passing through at least a portion of the first case 101. A plurality of first suction portions 102 are provided.

The plurality of first suction portions 102 are evenly formed in the circumferential direction along the outer circumferential surface of the first case 101 so that air suction is capable of being performed even in any direction relative to the first case 101. That is, air is capable of being sucked in 360-degree directions relative to a center line in the vertical direction which passes by an inside center of the first case 101.

Accordingly, suction amount of air can be increased by the first case 101 having a cylindrical shape and a plurality of first suction portions 102 being formed along the outer circumferential surface of the first case 101. A flow resistance to sucked air can be reduced by avoiding a cube shape having an edge portion such as the case of the air cleaner in the related art.

Air which is sucked through the first suction portion 102 may flow substantially in the radial direction from the outer circumferential surface of the first case 101. Directions will be defined. Relative to the FIG. 14, a vertical direction is referred to as an axial direction and a transverse direction is referred to as a radial direction. The axial direction may correspond to a central axis direction of a first fan 160 and a second fan 260 to be described below, that is, a motor shaft direction of the fan. The radial direction may be understood as a direction which is perpendicular to the axial direction.

The circumferential direction is understood as a virtual circle direction which is formed when rotating about the axial direction and having the distance of the radial direction as a rotation radius.

The first blowing device 100 further includes a base 20 which is provided in the lower side of the first case 101 and is placed on the ground. The base 20 is positioned by spacing apart from the lower end portion of the first case 101 in the lower direction. A base suction portion 103 is formed in a separation space between the first case 101 and the base 20.

Air which is sucked through the base suction portion 103 is capable of flowing in the upper direction through a suction port 112 of a suction grill 110 (see FIG. 15) which is provided in the upper side of the base 20.

In other words, the first blowing device 100 includes a plurality of suction portions 102 and 103. Air which existing in the lower portion of the indoor space may be easily introduced to the first blowing device 100 through the plurality of suction portions 102 and 103. Accordingly, the suction amount of air may be increased.

A first discharging portion 105 is formed on the upper portion of the first blowing device 100. The first discharging portion 105 may be formed on a first discharging grill 195 of a first discharging guide device 190 (see, FIG. 15) which is provided in the first blowing device 100. The first discharging guide device 190 forms an outer appearance of the upper end portion of the first blowing device 100. Air which is discharged through the first discharging portion 105 may flows in the upper side in the axial direction.

The cases 101 and 201 include a second case 201 which forms an outer appearance of the second blowing device 200. The second case 201 may have a cylindrical shape. An upper portion of the second case 201 may be configured to have a diameter which is smaller than a lower portion thereof. In other words, the second case 201 may have a truncated cone shape.

The second case 201 includes two parts and a hinge portion which are capable of being assembled or being disassembled through a second separation portion 201*a*. The second case 201 may be configured to be openable like the first case 101. A detail description refers to the description regarding to the first case 101. An inside component of the second blowing device 200 are capable of being replaced or being repaired by the second case 201 being opened.

A diameter of the lower end portion of the second case 201 may be formed to be smaller than a diameter of the upper end portion of the first case 101. Accordingly, in a general shape of the cases 101 and 201, the lower cross-sectional area of the cases 101 and 102 may be formed to be greater than the upper cross-sectional area. Accordingly, the air cleaner 10 may be stably supported on the ground.

The second case 201 includes a second suction portion 202 in which air is sucked. The second suction portion 202 includes a through hole which is formed by passing through at least a portion of the second case 201. A plurality of second suction portions 202 are provided.

The plurality of second suction portion 202 are evenly formed in the circumferential direction along the outer circumferential surface of the second case 201 so that air suction is capable of being performed even in any direction relative to the second case 201. In other words, air is capable of being sucked in 360-degree directions relative to a center line in the vertical direction which passes by an inside center of the second case 201.

Accordingly, suction amount of air can be increased by the second case 201 having a cylindrical shape and a plurality of second suction portions 202 being formed along the outer circumferential surface of the second case 201. A flow resistance to sucking air can be reduced by avoiding a cube shape having an edge portion such as the case of the air cleaner in the related art.

Air which is sucked through the second suction portion 202 may flow substantially in the radial direction from the outer circumferential surface of the second case 201.

The air cleaner 10 includes a dividing device 400 which is provided between the first blowing device 100 and the second blowing device 200. By the dividing device 400, the second blowing device 200 may be positioned to be spaced apart in the upper side of the first blowing device 100. The description regarding to the dividing device 400 will be described below, with reference to the accompanying drawings.

The air flow control device 300 may be installed on the upper side of the second blowing device 100. An air flow path of the second blowing device 100 may communicate with an air flow path of the air flow control device 300 relative to the air flow. The air passing through the second blowing device 100 is capable of being discharged through a second discharging portion 305 to the outside via the air flow path of the air flow control device 300. The second discharging portion 305 is formed on the upper end portion of the air flow control device 300.

Figure 24:
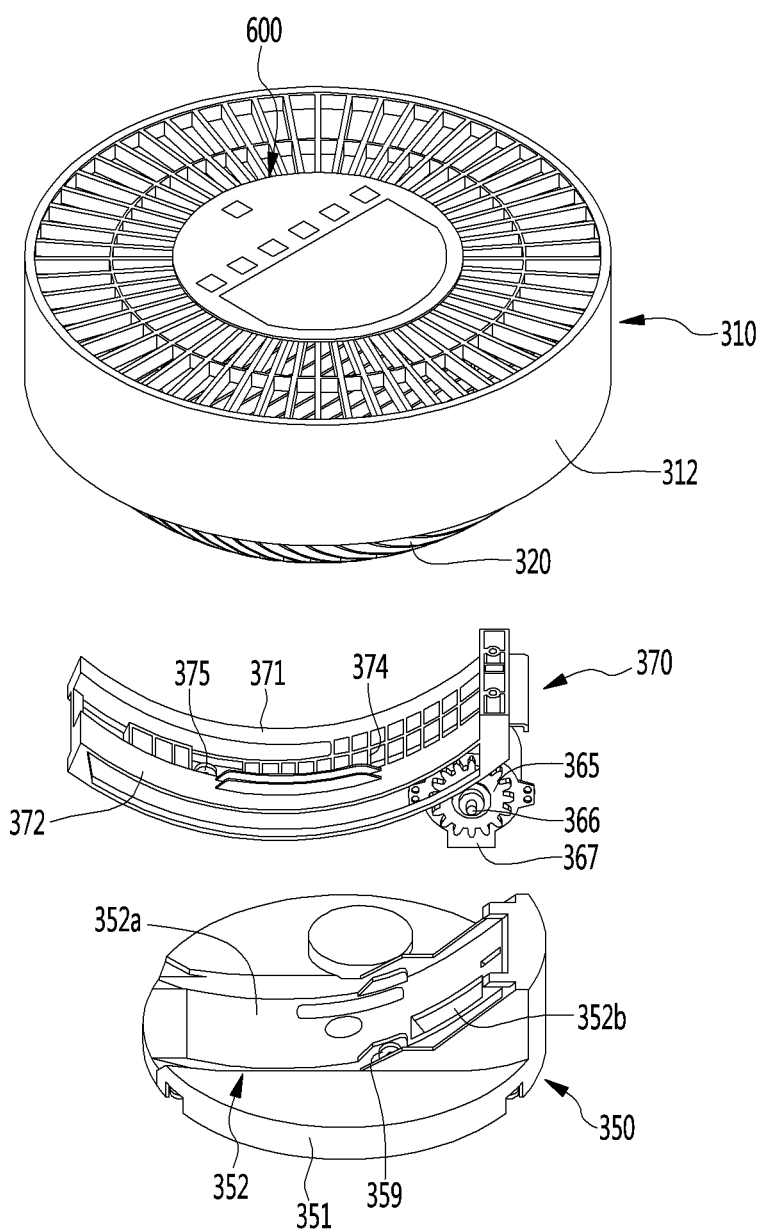
FIG. 24 is an exploded perspective view illustrating the configuration of the air flow control device according to the embodiment.

The air flow control device 300 may be provided to be movable. In detail, the air flow control device 300 is in a laid state (first position) as illustrated in FIG. 14 or is in an inclinedly erected state (second position) as illustrated in FIG. 24. Description related to this will be described later.

In addition, a display device 600 which displays operation information of the air cleaner is provided at an upper portion of the air flow control device 300. The display device 600 is movable together with the air flow control device 300.

Figure 15:
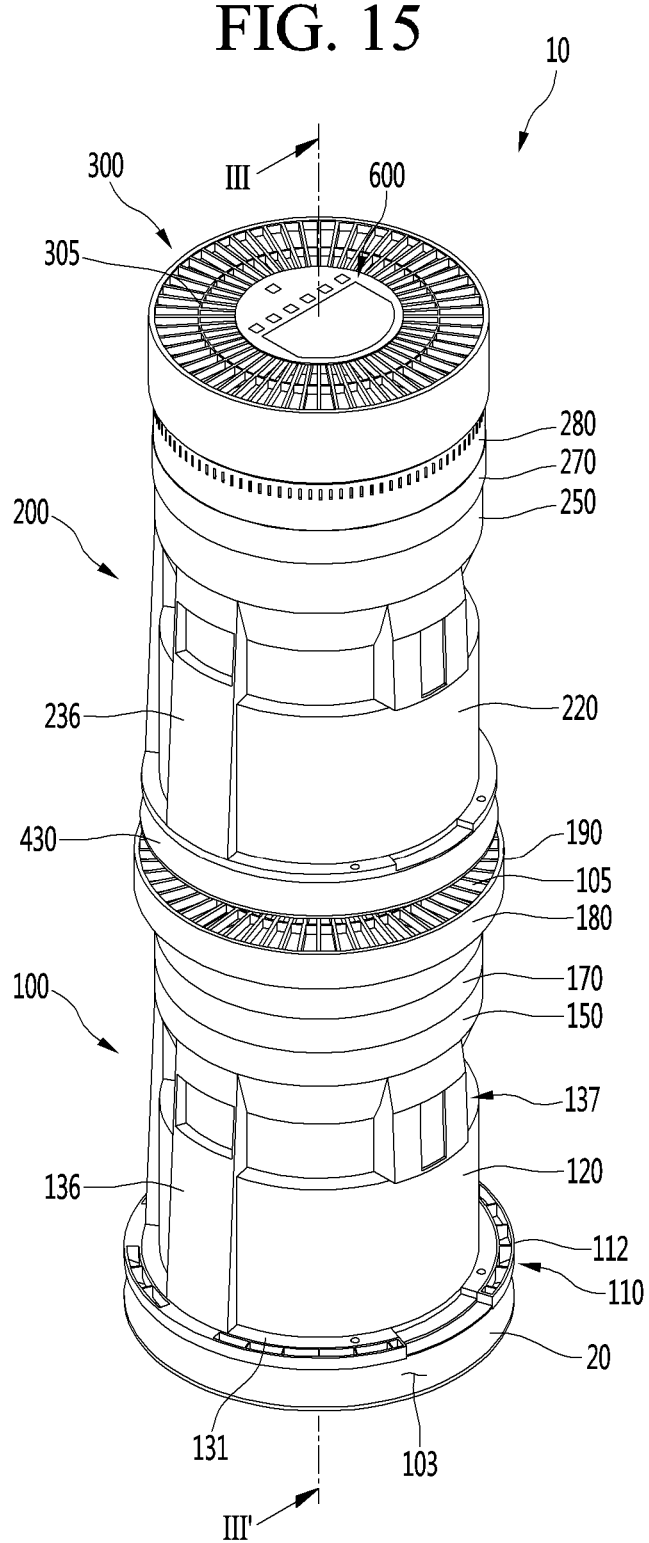
FIG. 15 is a perspective view illustrating an internal configuration of the air cleaner according to the embodiment.
Figure 16:
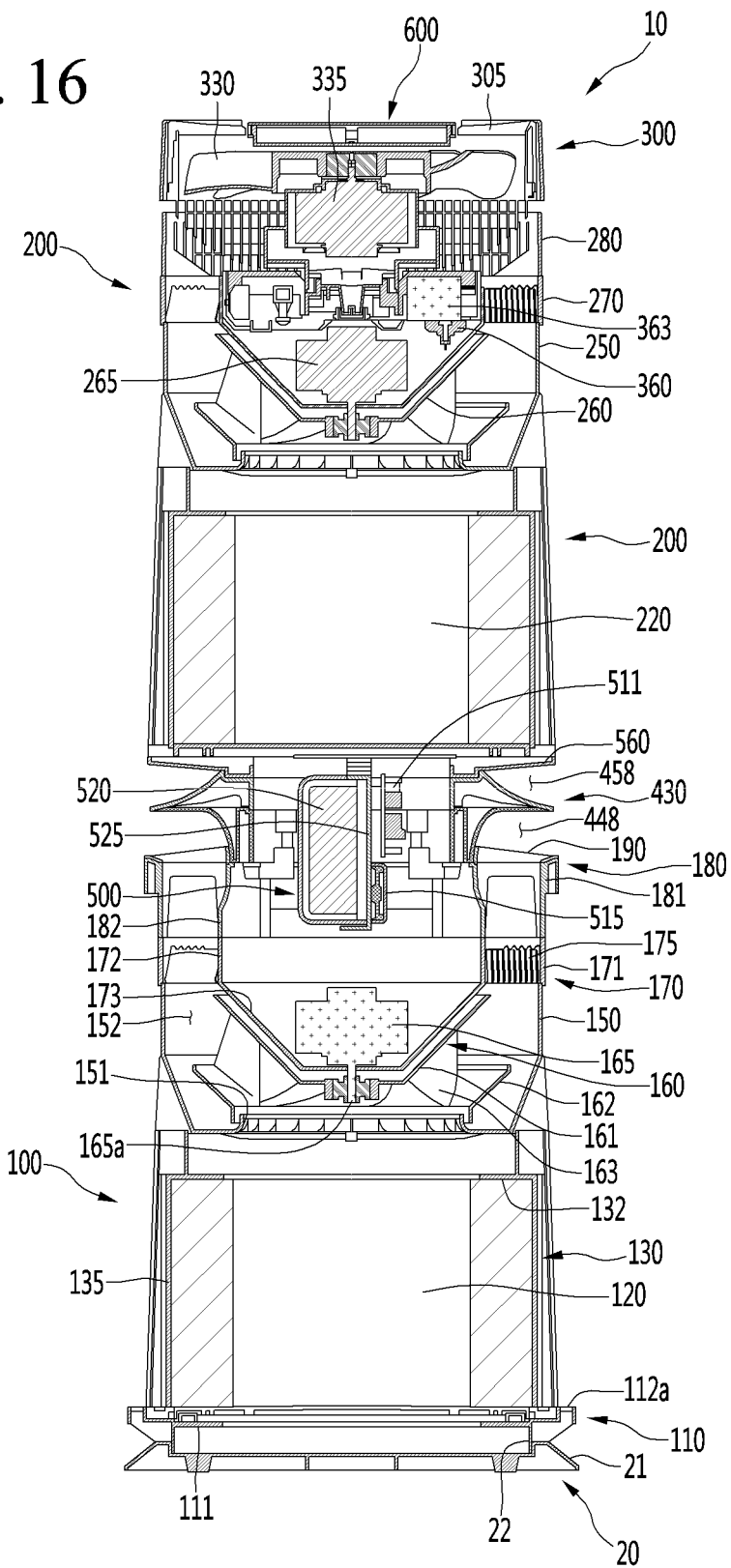
FIG. 16 is a sectional view taken along line III-III' of FIG. 15.

FIG. 15 is a perspective view illustrating an internal configuration of the air cleaner according to the embodiment. FIG. 16 is a sectional view taken along line III-III' of FIG. 15.

Referring to FIGS. 15 and 16, a base 20 and a suction grill 110 which is disposed on the upper side of the base 20 are included in the first blowing device 100 according to the embodiment.

The base 20 includes a base main body 21 which is placed on the ground and a base projecting portion 22 which projects from the base main body 21 in the upper direction and on which the suction grill 110 is placed. The base projecting portion 22 may be provided at both sides of the base 20.

The base main body 21 and the suction grill 110 are spaced apart from each other by the base projecting portion 22. A base suction portion 103 which forms a suction space of air is included between the base 20 and the suction grill 110.

The suction grill 110 includes a grill main body 111 having a substantially ring shape and a rim portion protruding from the outer circumferential surface of the grill main body 111 in the upper direction. By the configuration of the grill main body 111 and the rim portion, the suction grill 110 may have a stepped structure.

The suction grill 110 includes a suction portion 112 formed on the rim portion. The suction portion 112 is configured to protrude along the circumference of the rim portion in the upper direction and extend in the circumferential direction. In addition, a plurality of suction holes 112a are formed in the suction portion 112. The plurality of suction holes 112a may communicate with the base suction portion 103.

Air sucked through the plurality of suction holes 112a and the base suction portion 103 may pass through a first filter member 120. The first filter member is provided in a cylindrical shape, and has a filter surface which filters air. The air passing through the plurality of suction holes 112a may be introduced to the inside portion of the first filter member 120 by passing through the outer circumferential surface of the cylindrical first filter member 120.

The first blowing device 100 further includes a first filter frame 130 which forms a mounting space of the filter member 120. Specifically, the first filter frame 130 includes a first frame 131 which forms a lower portion of the first filter frame 130 and a second frame 132 which forms an upper portion of the first filter frame 130.

The first filter frame 130 further includes a first filter supporting portion 135 which extends from the first frame 131 to the second frame 132 in the upper direction. The first frame 131 and the second frame 132 are spaced apart from each other by the first filter supporting portion 135. A plurality of first filter supporting portions 135 are provided and the plurality of the first filter supporting portions 135 are arranged in the circumferential direction and thus may be connected to the rim portions of the first frame 131 and the second frame 132.

A mounting space of the first filter member 120 is defined by the plurality of first filter supporting portions 135 and the first frame 131 and the second frame 132. In addition, a first supporting portion cover 136 may be coupled to the outside of the first filter supporting portion 135.

A sensor device 137 may be installed in the first filter frame 130. The sensor device 137 may include a dust sensor which senses an amount of dust in the air and a gas sensor which senses an amount of gas in the air. The dust sensor and the gas sensor may be disposed to be supported by the second frame 132 of the first filter frame 130.

The first filter member 120 may be detachably mounted on the mounting space. The first filter member 120 has a cylindrical shape and air may be introduced through the outer circumferential surface of the first filter member 120. Impurities such as fine dust in air are filtered in a process of passing through the first filter member 120.

The air can be introduced from any direction relative to the first filter member 120, by the first filter member 120 having the cylindrical shape. Accordingly, filtering area of air can be increased.

The mounting space may have a cylindrical shape corresponding to the shape of the first filter member 120. The first filter member 120 may be slidably introduced toward the mounting space in the mounting process. Contrary, the first filter member 120 may be slidably withdrawn from the mounting space in the separating process.

The first blowing device 100 further includes a first fan housing 150 which is installed on the outlet side of the first filter member 120. A housing space portion 152 in which a first fan 160 is accommodated is formed in the first fan housing 150. In addition, the first fan housing 150 may be supported by the first filter frame 130.

A first fan introducing portion 151 which guides introduction of air to inside portion of the first fan housing 150 is included in the lower portion of the first fan housing 150. It is prevented a finger or the like of a user from being putted to the inside portion of the first fan housing 150 when the first filter member 150 is separated by the grill being provided in the first fan introducing portion 151.

The first blowing device 100 further includes an ionizer for removing or sterilizing smell particles in the air. The ionizer is coupled to the first fan housing 150 and is capable of acting the air which flows in the inside portion of the first fan housing 150.

The sensor device 137 and the ionizer 158 may also be installed in a second blowing device 200 to be described later. As another example, the sensor device 137 and the ionizer 158 may be installed in one of the first blowing device 100 and the second blowing device 200.

The first fan 160 is placed on the upper side of the first fan introducing portion 151. As an example, the first fan 160 includes a centrifugal fan which introduces air in the axial direction and then discharges air to the upper side in the radial direction.

In detail, the first fan 160 includes a hub 161 to which a rotating shaft 165a of the first fan motor 165 which is the centrifugal fan motor is coupled, a shroud 162 which is disposed in a state of being spaced apart from the hub 161, and a plurality of blades 163 which are disposed between the hub 161 and the shroud 162. The first fan motor 165 may be coupled to the upper side of the first fan 160.

The hub 161 may have a bowl shape of which diameter is gradually reduced in the lower direction. The hub 161 includes a shaft coupling portion to which the rotating shaft 165a is coupled and a first blade coupling portion which extends to be inclined from the shaft coupling portion in the upper direction.

The shroud 162 includes a lower end portion on which a shroud suction port into which air which is passed through the first fan introducing portion 151 is sucked is formed and a second blade coupling portion which extends from the lower end portion in the upper direction.

One surface of the blade 163 may be coupled to the first blade coupling portion of the hub 161 and the other surface thereof may be coupled to the second blade coupling portion of the shroud 162. The plurality of blades 163 may be disposed to be spaced apart in the circumferential direction of the hub 161.

The first blowing device 100 further includes a first air guide device 170 which guides a flow of air which is passed through the first fan 160 by being coupled to the upper side of the first fan 160.

The air guide device 170 includes an outside wall 171 having a cylindrical shape and an inside wall 172 which is positioned on the inside of the outside wall 171 and has a cylindrical shape. The outside wall 171 is disposed to surround the inside wall 172. A first air flow path through which air flows is formed between an inner circumferential surface of the outside wall 171 and the outer circumferential surface of the inside wall 172.

The first air guide device 170 includes a guide rib 175 which is disposed on the first air flow path 172a. The guide rib 175 extends from the outer circumferential surface of the inside wall 172 to the inner circumferential surface of the outside wall 171. A plurality of guide ribs 175 may be disposed to be spaced apart from each other. The plurality of guide ribs 175 perform a function which guides the air introduced to the first air flow path of the first air guide device 170 via the first fan 160 in the upper direction.

The guide rib 175 may extend to be inclined from the lower portion of the outside wall 171 and the inside wall 172 in the upper direction. As an example, the guide rib 175 is formed to be rounded and thus guides so that air may flow to be inclined in the upper direction.

The first air guide device 170 further includes a motor accommodating portion 173 which extends from the inside wall 172 to the lower side and thus accommodates the first fan motor 165. The motor accommodating portion 173 may have a bowl shape of which diameter is gradually reduced in the lower direction. The shape of the motor accommodating portion 173 may correspond to the shape of the hub 161. In addition, the motor accommodating portion 173 may be inserted into the inside portion of the hub 161.

The first fan motor 165 may be supported to the upper side of the motor accommodating portion 173. The rotating shaft 165a of the first fan motor 165 may extend from the first fan motor 165 in the lower direction and be coupled to the shaft coupling portion of the hub 161 through the lower surface portion of the motor accommodating portion 173.

The first blowing device 100 according to the embodiment further includes a second air guide device 180 which is coupled to the upper side of the air guide device 170 and guides air which is passed through the first air guide 170 to the discharging guide device 190.

The air guide device 180 includes a first guide wall 181 which has a substantially cylindrical shape and a second guide wall 182 which is positioned to the inside of the first guide wall 181 and has a substantially cylindrical shape. The first guide wall 181 may be disposed to surround the second guide wall 182.

A second air flow path through which air flow is formed between an inner circumferential surface of the first guide wall 181 and the outer circumferential surface of the second guide wall 182. Air which flows the first air flow path 172a of the first air guide device 170 flows in the upper direction through the second air flow path. The second air flow path may be referred to as a "discharge flow path." In addition, the first discharging portion 105 is disposed on the upper side of the second air flow.

A first space portion in which at least a portion of a PCB device 500 is accommodated is formed in the inside of the second guide wall 182 having a cylindrical shape. The PCB device 500 includes a power supply portion 520 and a main PCB 511.

The power supply portion 520 is understood as a device which receives commercial power supplied from a power line connected to the air cleaner 10 to supply power to the main PCB 511 and a plurality of parts in the air cleaner 10. The power supply portion 520 may include a PCB (power PCB) for AC power.

The main PCB 511 may include a PCB for DC power, which is driven by a DC voltage converted in the PCB for AC power.

The PCB device 500 further includes a PCB supporting plate 525 for supporting the power supply portion 520 and the main PCB 511. The main PCB 511 may be supported on one surface of the PCB supporting plate 525, and the power supply portion 520 may be supported on the other surface of the PCB supporting plate 525.

The PCB device 500 includes a communication module 515 through which the air cleaner 10 is capable of communicating with an external device. As an example, the communication module 515 may include a Wi-Fi module. The communication module 515 is supported on the PCB supporting plate 525, and may be disposed at the lower side of the main PCB 511.

The first blowing device 100 further include a first discharging guide device 190 which is disposed on the upper side of the second air guide device 180, that is, the outlet side of air flow passing through the second air guide device 180 relative to the air flow and guides the air discharge to the outside portion of the air cleaner 10. A first discharging portion 105 through which air is discharged is formed in the first discharging guide device 190.

Figure 17:
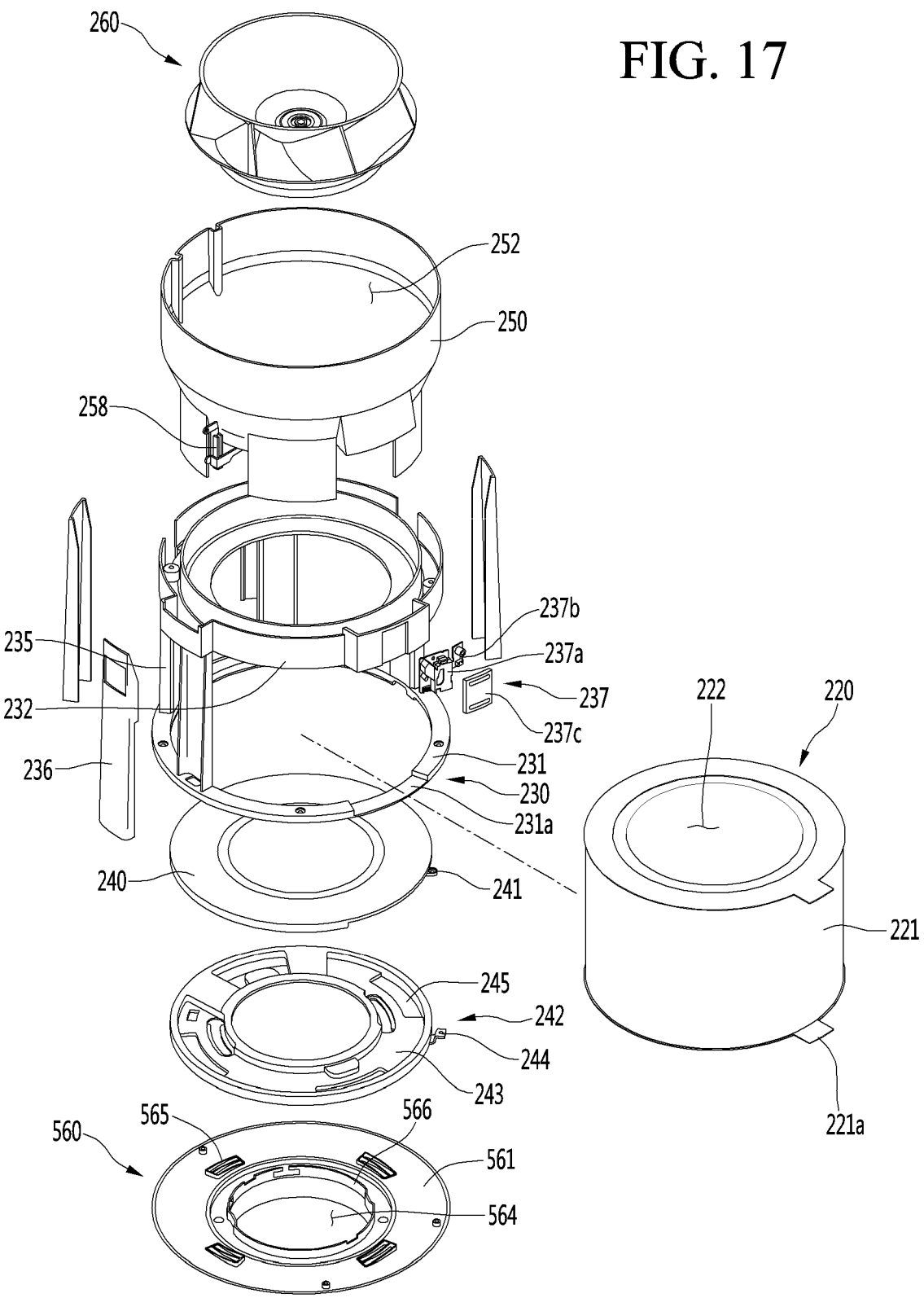
FIG. 17 is an exploded perspective view illustrating a configuration of the second blowing device according to the embodiment.

The second blowing device 200 includes a second filter member 220, a supporting device 240 which supports the lower portion of the second filter member 220, and a lever device 242 which is provided on the lower side of the supporting device 240 to support the second filter member 220 and the supporting device 240 (see FIG. 17).

The second blowing device further includes a lever supporting device 560 which supports the second filter member 220 or the lever device of the second blowing device 200. The lever supporting device 560 has a substantially annular shape. The lever supporting device 560 includes a third space portion which defines an installation space in which the PCB device 500 is located. The third space portion is formed at a substantially center portion of the lever supporting device 560 by passing through the lever supporting device 560 in the vertical direction.

A dividing device 400 is provided between the first blowing device 100 and the second blowing device 200. The dividing device 400 includes a dividing plate 430 for separating or blocking air flow generated in the first blowing device 100 and air flow generated in the second blowing device 200. By the dividing plate 430, the first and second blowing devices 100 and 200 are capable of being disposed to be spaced apart from each other in the vertical direction.

In other words, a separation space in which the dividing plate 430 is located is formed between the first and second blowing devices 100 and 200. The first discharging guide device 190 of the first blowing device 100 may be located at a lower end portion of the separation space, and the lever supporting device 560 of the second blowing device 200 may be located at an upper end portion of the separation space.

The separation space may be divided into an upper space and a lower space by the dividing plate 430. The lower space is understood as a first space portion 448 through which air discharged from the first discharging portion 105 of the first discharging guide device 190 passes in a process in which the air flows to the outside of the air cleaner 10. In addition, the upper space constitutes a second space 458 as a grasping space in which the user is capable of putting a hand when moving the air cleaner 10.

The air discharged from the first discharging part 105 is guided by the dividing plate 430 to flow to the outside of the air cleaner 10. Accordingly, it is possible to prevent the air from being introduced to the second blowing device 200.

FIG. 17 is an exploded perspective view illustrating a configuration of the second blowing device according to the embodiment.

Referring to FIG. 17, the second blowing device 200 according to the embodiment includes a lever supporting device 560, a lever device 242, a supporting device 240, a second filter member 220, a second filter frame 230, a second fan housing 250, and a second fan 260.

The second filter member 220 may have a cylindrical shape having an opened upper portion. The second filter member 220 includes a filter main body 221 which has a cylindrical filter portion of which inside is empty and a filter hole 222 which is formed to be opened at the upper end portion of the filter main body 221. A filter grasping portion 221a is provided at an upper or lower portion of the filter main body 221. Air may be introduced to the inside of the filter main body 221 through the outer circumferential surface of the filter main body 221, and may be discharged from the second filter member 220 through the filter hole 222. The configuration of the second filter member 220 may be applied to the first filter member 120.

The lever supporting device 560 includes a lever supporting main body 561 having an annular shape. The lever supporting main body 561 extends to be slightly inclined in the upper direction with respect to the axial direction toward the outer circumferential surface of the inner circumferential surface thereof. That is, a surface which constitutes the lever supporting main body 561 constitutes an inclined surface. A space between the inclined surface and the upper surface of the dividing plate 430 provides the second space portion 458 in which a user's hand is capable of being located. The lever supporting main body 561 may be referred to as a "blocking portion" in that air which is discharged through the first discharging portion 105 of the first blowing device 100 is blocked from being introduced to the second blowing device 200.

The lever supporting device 560 further includes a movement guide portion 565 which protrudes from the lever supporting main body 561 in the upper direction. A plurality of movement guide portions 565 may be arranged to be spaced apart from one another in the circumferential direction of the lever supporting main body 561. In addition, the lever supporting device 560 further includes a supporting projection 566 which protrudes in the upper direction from the inner circumferential surface of the lever supporting main body 561. The supporting projection 566 supports the lever device of the second blowing device 200.

The lever device 242 may be provided to be operable by a user. As an example, the lever device 242 may be provided to be rotatable in the circumferential direction. In detail, the lever device 242 includes a lever main body 243 which has a substantially ring shape and is provided to be rotatable. In addition, a plurality of cut-out portions 245 which are disposed at positions corresponding to the plurality of movement guide portions 565 are formed in the lever main body 243.

The plurality of cut-out portions 245 are spaced apart from one another, and are arranged in the circumferential direction of the lever main body 243. In addition, each of the plurality of cut-out portions 245 may be formed to be rounded with a predetermined curvature in the circumferential direction, corresponding to the curvature of the outer circumferential surface of the lever main body 243.

The lever device 142 is supported on the upper surface of the lever supporting main body 561. If the lever device 242 is supported by the lever supporting main body 561, the plurality of movement guide portions 565 may be arranged to be inserted into the plurality of cut-out portions 245. In detail, the plurality of movement guide portions 565 may protrude to the upper side of the plurality of cut-out portions 245 by passing through the plurality of cut-out portions 245.

The length of each of the plurality of cut-out portions 245 may be formed longer than the length of the movement guide portion 565. Thus, the lever device 242 can rotate in the state in which the movement guide portion 565 is inserted into the cut-out portion 245. In addition, one end portion of the movement guide portion 565 may be interfered with one end portion of the cut-out portion 245 in a process in which the lever device 242 rotates in one direction, and the other end portion of the movement guide portion 565 may be interfered with the other end portion of the cut-out portion 245. A second handle 244 is provided on the outer circumferential surface of the lever main body 243.

A supporting device 240 which supports the second filter member 220 is provided on the upper side of the lever device 242. The supporting device 240 includes a first handle 241 which is coupled to the second handle 244. The user may rotate the lever main body 143 and the supporting device 140 in the clockwise direction or in the counterclockwise direction by grasping the first and second handles 241 and 244. The lever device 242 supports the lower surface of the supporting device 240. The supporting device 240 may include a support projecting portion (not shown) which is in contact with the movement guide portion 565. The support projecting portion protrudes in the lower direction from the lower surface of the supporting device 240, and may be provided at a position corresponding to the movement guide portion 565. In addition, the shape of the support projecting portion corresponds to the shape of the movement guide portion 565, and includes an inclined surface which is formed to gradually protrude in the circumferential direction. In addition, the direction in which the movement guide portion 565 gradually protrudes and the direction in which the support projecting portion gradually protrudes may be opposite to each other.

As an example, if the direction in which the movement guide portion 565 further protrudes is the counterclockwise direction, the direction in which the support projecting portion further protrudes may be the clockwise direction. The support projecting direction may be disposed at a position corresponding to the cut-out portion 245. In other words, the movement guide portion 565 and the support projecting portion may be disposed at a position at which they are inserted into the cut-out portion 245.

The lever device 242 and the supporting device 240 may rotate together. In the rotation process, the movement guide portion 565 and the support projecting portion may be interfered with each other. In detail, if the lower portion of the support projecting portion and the upper portion of the movement guide portion 565 are in contact with each other, the lever device 242 and the supporting device 240 are lifted in the upper direction. In addition, the second filter member 220 supported by the supporting device 240 is in a state in which the second filter member 220 is coupled to the second blowing device 200 while moving in the upper direction.

On the other hand, if the lower portion of the support projecting portion and the upper portion of the movement guide portion 565 are in contact with each other or if the inference between the support projecting portion and the movement guide portion 565 is released, the lever device 242 and the supporting device 240 move downward. In addition, the second filter member 220 supported by the supporting device 240 is in a state (released state) in which the second filter member 220 is separable from the second blowing device 200.

The second blowing device 200 further includes a second filter frame 230 which forms a mounting space of the second member 220. In detail, the second filter frame 230 includes a first frame 231 which forms a lower portion of the second filter frame 230 and a second frame 232 which forms an upper portion of the second filter frame 230.

The first frame 231 includes a frame depression portion 231a having a shape depressed downward. The frame depression portion 231a may be configured such that at least a portion of the first frame 231 is depressed. The frame depression portion 231a provides a space portion in which the first and second handles 241 and 244 are movable. The first and second handles 241 and 244 are located in the space portion, to rotate in the clockwise direction or in the counterclockwise direction.

The second frame 232 is located to be spaced apart from the first frame 231 in the upper direction. The second frame 232 has a substantially ring shape. The ring-shaped inside portion space of the second frame 232 forms at least a portion of an air flow path passing through the second filter frame 230. In addition, the upper portion of the second frame 232 supports the second fan housing 250.

The second filter frame 230 further includes a second filter supporting portion 235 which extends from the first frame 231 to the second frame 232 in the upper direction. The first frame 231 and the second frame 232 are spaced apart from each other by the second filter supporting portion 235. A plurality of second filter supporting portions 235 are provided and the plurality of the first second supporting portions 235 are arranged in the circumferential direction and thus may be connected to the rim portions of the first frame 231 and the second frame 232.

A mounting space of the second filter member 220 is defined by the first and second frames 231 and 232 and the plurality of second filter supporting portions 235. In addition, a first supporting portion cover 236 may be coupled to the outside of the second filter supporting portion 235.

A sensor device 237 may be installed in the second filter frame 230. The sensor device 237 may include a dust sensor 237a which senses an amount of dust in the air and a gas sensor 237b which senses an amount of gas in the air. The dust sensor 237a and the gas sensor 237b may be disposed to be supported by the second frame 232 of the second filter frame 230. The sensor device 237 further includes a sensor cover 237c which covers the dust sensor 237a and the gas sensor 237b.

The second filter member 220 may be detachably mounted on the mounting space. The second filter member 220 has a cylindrical shape and air may be introduced through the outer circumferential surface of the second filter member 220. Impurities such as fine dust in air are filtered in a process of passing through the second filter member 220.

The air can be introduced from any direction relative to the first filter member 120, by the second filter member 220 having the cylindrical shape. Accordingly, filtering area of air can be increased. The mounting space may have a cylindrical shape corresponding to the shape of the second filter member 220. The second filter member 220 may be slidably introduced toward the mounting space in the mounting process. Contrary, the second filter member 220 may be slidably withdrawn from the mounting space in the separating process.

On the other hand, the second filter member 220 is slid toward the mounting space to the inside in the radial direction in a state being separated from the mounting space, is supported on the upper surface of the supporting device 240 and thus is in close contact upwardly by an operation of the first and second handles 241 and 244. At this time, the second filter member 220 is in a coupling position.

The second blowing device 200 further includes a second fan housing 250 which is installed on the outlet side of the second filter member 220. A housing space portion 252 in which the second fan 260 is accommodated is formed in the second fan housing 250. The configuration of the second fan housing 250 and the second fan 260 is identical to the configuration of the first fan housing 150 and the first fan 160, and therefore, a detailed description regarding to the second fan housing 250 and the second fan 260 refers to the description regarding to the first fan housing 150 and the first fan 160.

The second blowing device 200 further includes an ionizer 258 for removing or sterilizing smell particles in the air. The ionizer 258 is coupled to the second fan housing 250 and is capable of acting the air which flows in the inside portion of the second fan housing 250. The ionizer 258 may have the same configuration as the ionizer of the first blowing device 100.

Figure 18:
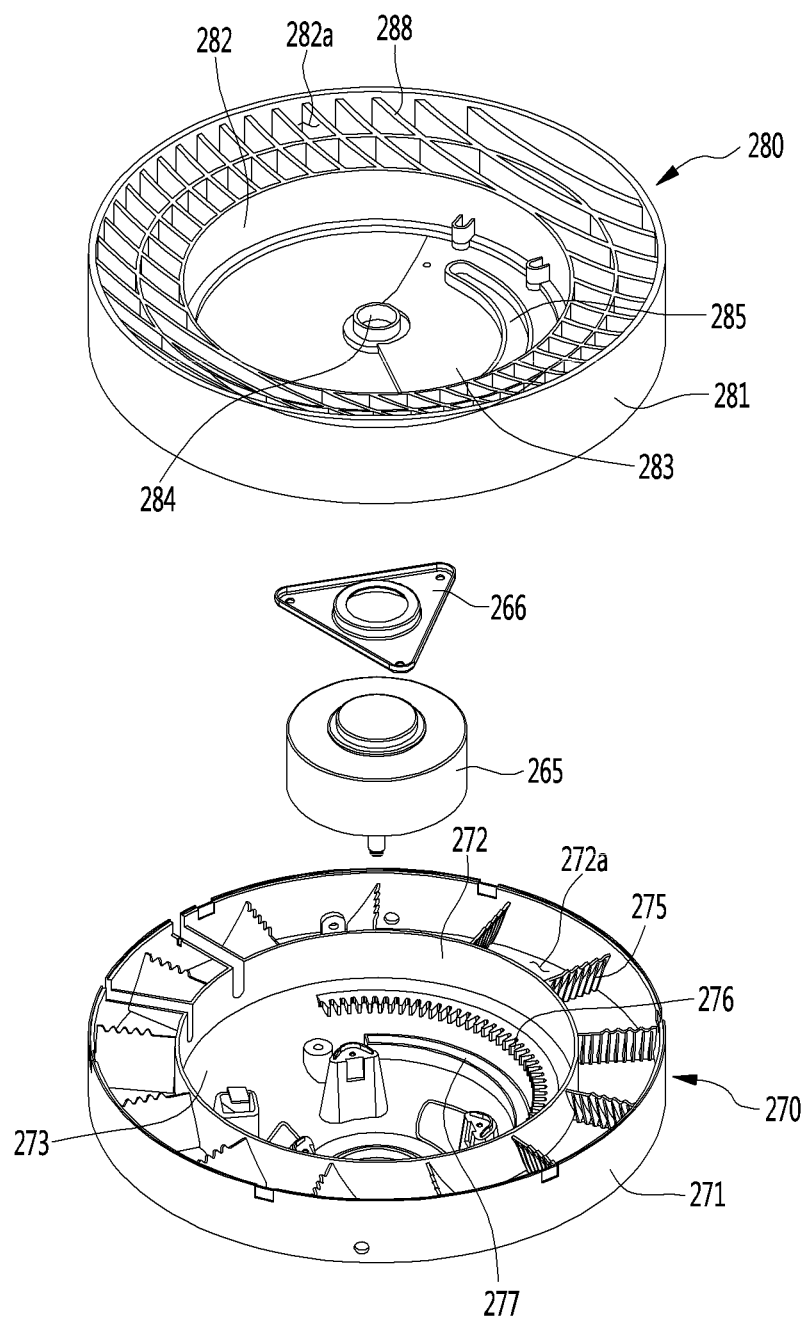
FIG. 18 is an exploded perspective view illustrating a third air guide device and a second discharging guide device according to the embodiment.
Figure 19:
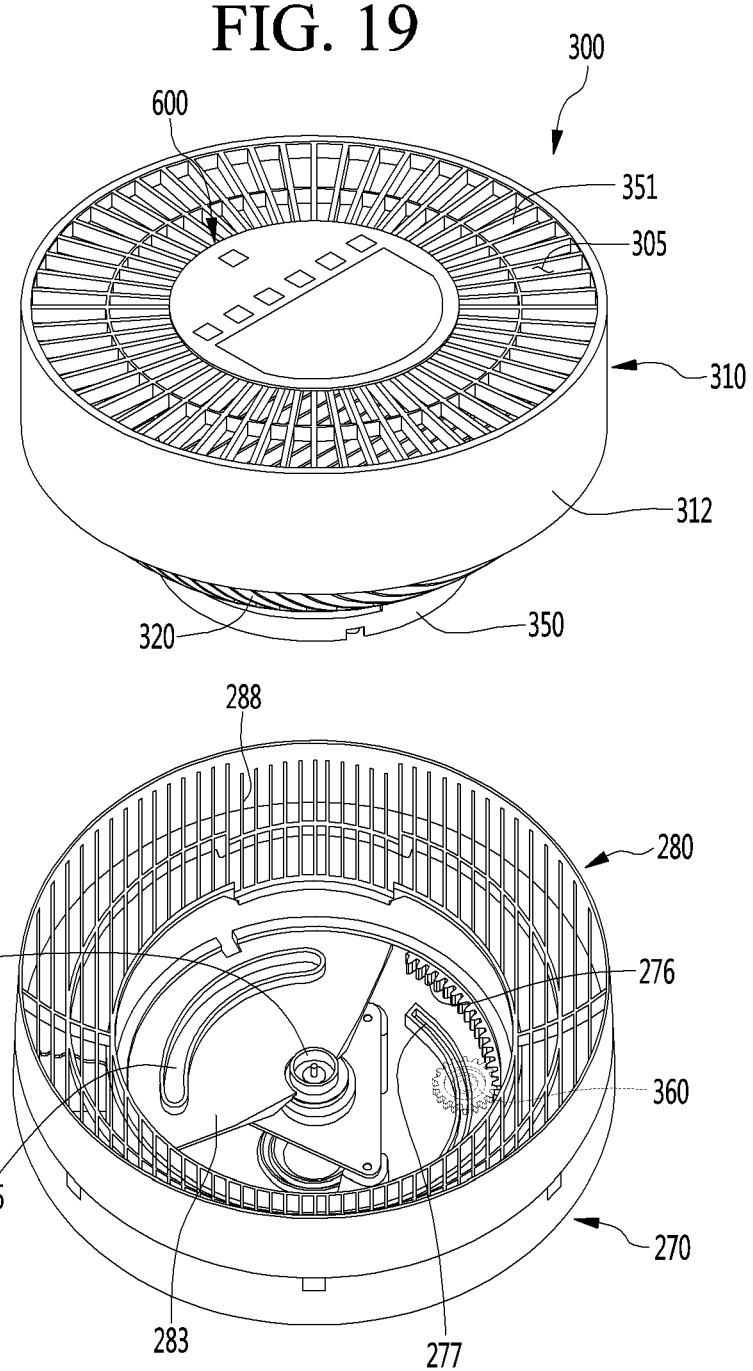
FIG. 19 is an exploded perspective view illustrating a configuration of an air flow control device and a component to which the air flow control device is coupled according to the embodiment.
Figure 20:
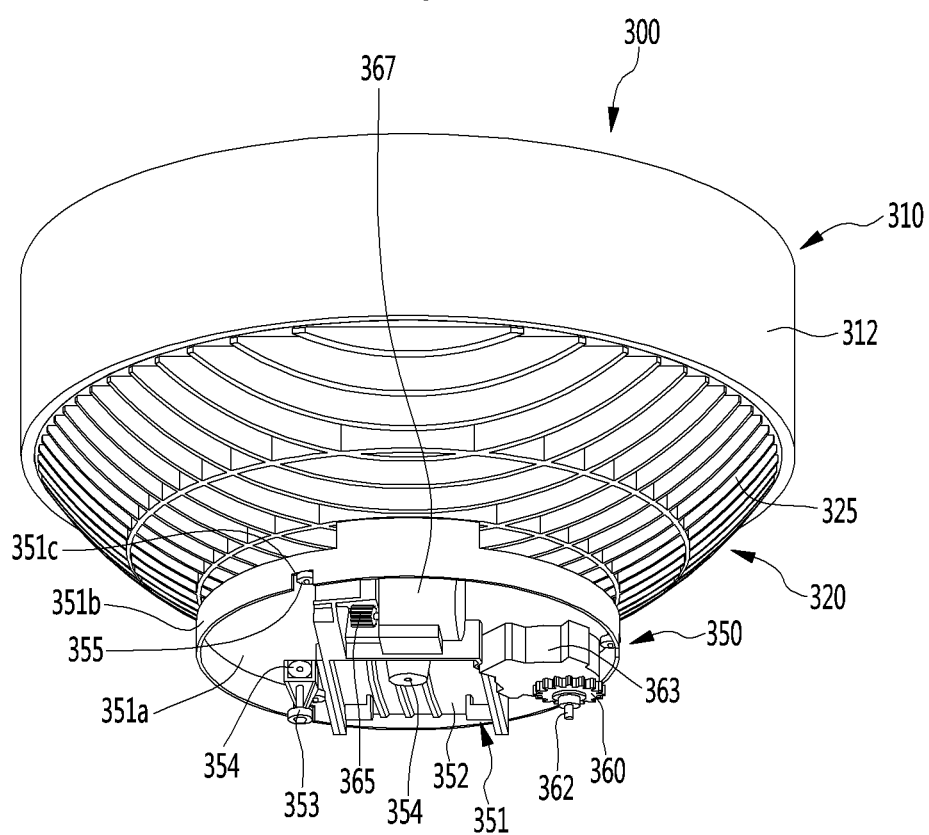
FIG. 20 is a perspective view illustrating a configuration of the air flow control device according to the embodiment.
Figure 21:
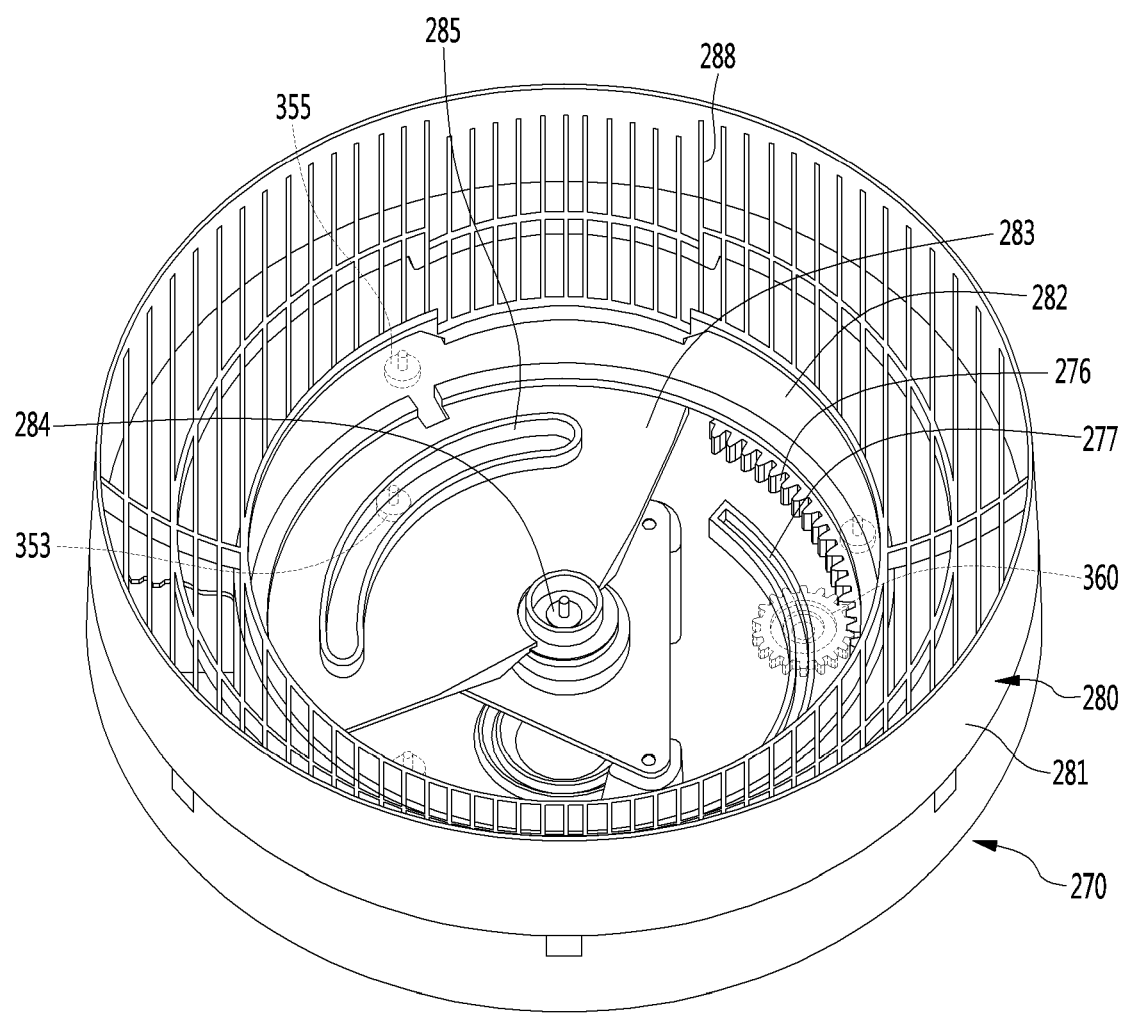
FIG. 21 is a view illustrating a state in which the third air guide device and the second discharging guide device are coupled to each other according to the embodiment.
Figure 22:
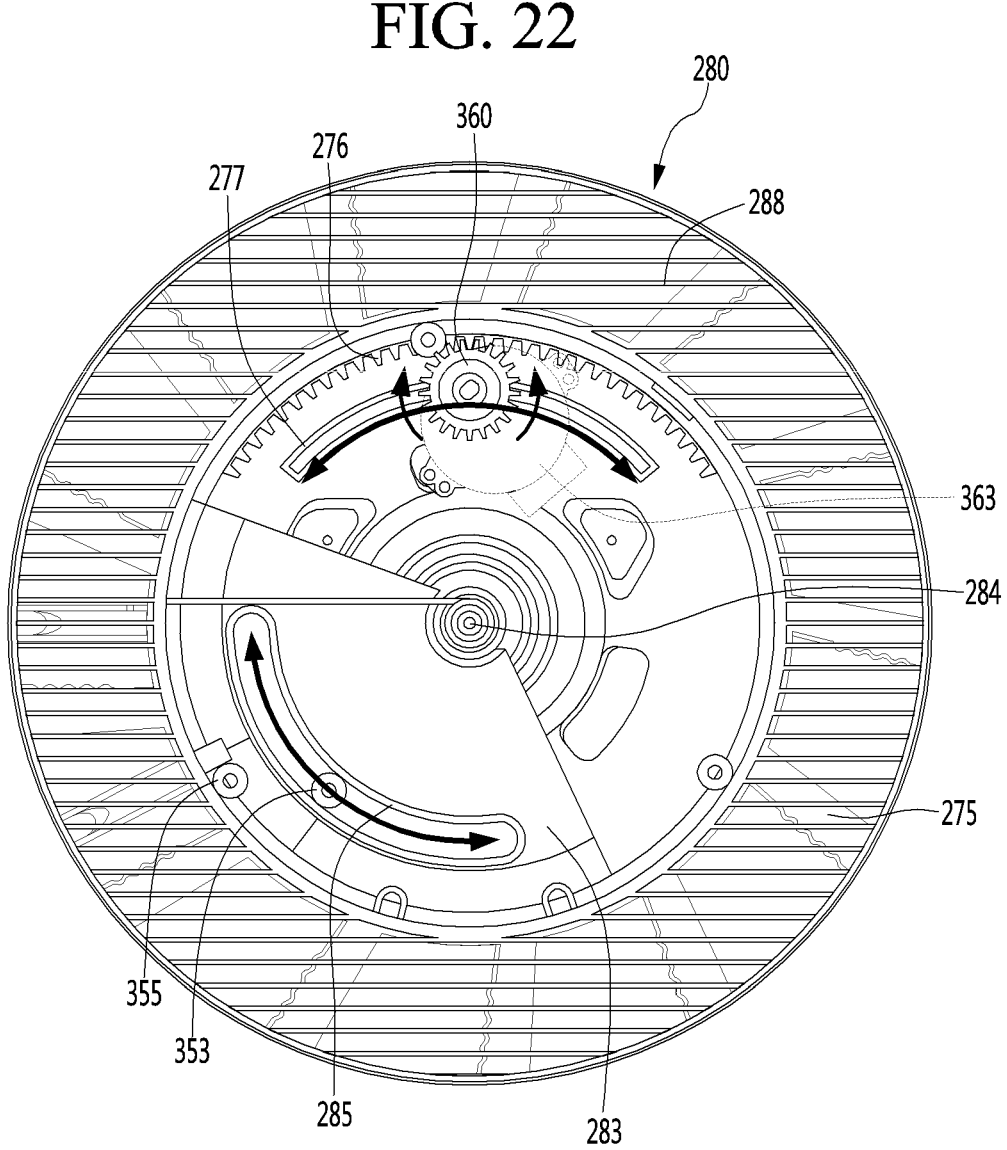
FIG. 22 is a view illustrating a state in which a first guide mechanism acts to perform rotation in the lateral direction of the air flow control device according to the embodiment.
Figure 23:
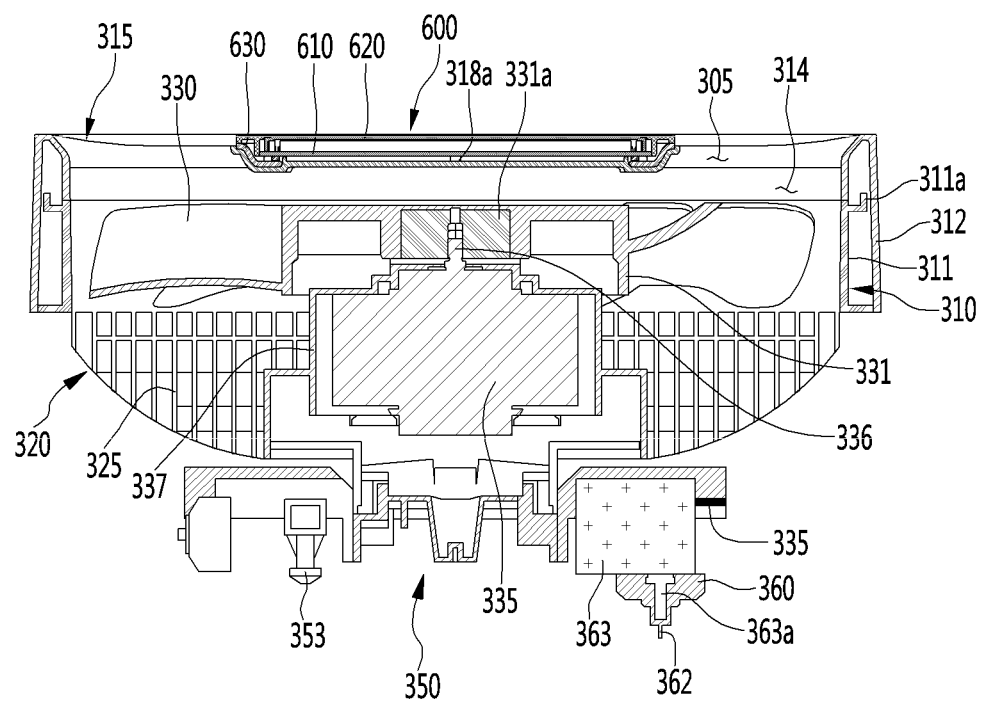
FIG. 23 is a sectional view illustrating the configuration of the air flow control device according to the embodiment.

FIG. 18 is an exploded perspective view illustrating a third air guide device and a second discharging guide device according to the embodiment. FIG. 19 is an exploded perspective view illustrating a configuration of an air flow control device and a component to which the air flow control device is coupled according to the embodiment. FIG. 20 is a perspective view illustrating a configuration of the air flow control device according to the embodiment. FIG. 21 is a view illustrating a state in which the third air guide device and the second discharging guide device are coupled to each other according to the embodiment. FIG. 22 is a view illustrating a state in which a first guide mechanism acts to perform rotation in the lateral direction of the air flow control device according to the embodiment. FIG. 23 is a sectional view illustrating the configuration of the air flow control device according to the embodiment.

Referring to FIGS. 18 to 23, the second blowing device 200 includes a third air guide device 270 which guides a flow of air which passed through the second fan 260 by being coupled to the upper side of the second fan 260.

The third air guide device 270 includes an outside wall 271 which forms the outer circumferential surface of the third air guide device 270 and an inside wall 272 which is positioned on the inside of the outside wall 271 and has a cylindrical shape. A first air flow path 272a through which air flows is formed between an inner circumferential surface of the outside wall 271 and the outer circumferential surface of the inside wall 272.

The third air guide device 270 includes a guide rib 275 which is disposed on the first air flow path 272a. The guide rib 275 extends from the outer circumferential surface of the inside wall 272 to the inner circumferential surface of the outside wall 271.

The third air guide device 270 further includes a motor accommodating portion 273 which extends from the inside wall 272 in the lower direction and thus accommodates the second fan motor 265. The motor accommodating portion 273 has a bowl shape of which diameter is gradually reduced toward the lower side.

The second fan motor 265 is coupled to the upper side of the second fan 260 and thus provides a driving force to the second fan 260. A motor coupling portion 266 is provided on one side of the second fan motor 265 and the motor coupling portion 266 guides to be fixed the second fan motor 265 to the third air guide device 270.

The third air guide device 270 includes guide devices 276 and 277 for guiding a movement of the air flow control device 300.

The guide devices 276 and 277 includes a first rack 276 and a shaft guide groove 277 which are included in the motor accommodating portion 273.

The first rack 276 is understood as configuration which is linked to the first gear 360 of the air flow control device 300. The first rack 276 may be provided on the inner circumferential surface of the motor accommodating portion 273 and may be provided along the set curvature in the circumferential direction. The length of the first rack 276 may be formed as the length which is set based on the distance linked to the first gear 360.

The flow converting device 300 may be rotated in the lateral direction, that is, in the clockwise direction or in the counterclockwise direction. In this process, the first gear 360 may be rotated along the predetermined rotating radius about the rotating shaft 354 of the flow converting device 300.

The shaft guide groove 277 is a groove which guides rotation of the first gear 260 and is understood as configuration which extends to be rounded with a predetermined curvature. As an example, the shaft guide groove 277 may be formed to be rounded in the circumferential direction. In other words, the shaft guide groove 277 may have an arc shape.

The first gear shaft 362 of the first gear 360 may be inserted into the shaft guide groove 277. In a process of rotation of the first gear 360, the first gear shaft 360 may be moved along the shaft guide groove 277.

The second blowing device 200 includes a second discharging guide device 280 which is installed on the upper side of the third air guide device 270 and guides a flow of air which passed through the third air guide device 270.

The second discharging guide device 280 may have a substantially annular shape of which the inside portion is empty. Specifically, the second discharging guide device 280 includes a discharging outside wall 281 which forms the outside circumferential surface of the second discharging guide device 280 and has a cylindrical shape and a discharging inside wall 282 which forms an inner circumferential surface of the second discharging guide device 280 and has a cylindrical shape.

The discharging outside wall 281 is disposed to surround the discharging inside wall 282. A second air flow path 282a, i.e., a discharging flow path in which flow of air passing through the third air guide device 270 in which air flows is performed is formed between the inner circumferential surface of the discharging outside wall 281 and the outer circumferential surface of the discharging inside wall 282. The discharging flow path may be positioned on the upper side of the first air flow path 272a in which the guide rib 275 is provided.

The second discharging guide device 280 further includes a second discharging grill 288 which is disposed on the discharging flow path 282a. The second discharging grill 288 extends from the outer circumferential surface of the discharging inside wall 282 to the inner circumferential surface of the discharging outside wall 281.

The second discharging guide device 280 further includes a rotation guide plate 283 which is coupled to the discharging inside wall 282. The rotation guide plate 283 may extend from the inner circumferential surface of the discharging inside wall 282 toward an inside center of the second discharging guide device 280.

The rotation guide plate 283 includes a shaft inserting portion 284 which provides a rotation center in the lateral direction of the air flow control device 300. The rotating shaft 354 may be inserted into the shaft inserting portion 284. The shaft inserting portion 284 may be positioned in the inside central portion of the second discharging guide 280. The rotation guide plate 283 may be understood as a supporting plate for supporting the shaft inserting portion 284.

A bearing groove 285 further include in the rotation guide plate 283. A first bearing 353 which is provided on the air flow control device 300 may be inserted into the bearing groove 285. The bearing groove 285 is a groove which guides movement of the first bearing 353 and is understood as configuration which extends to be rounded with a predetermined curvature. As an example, the bearing groove 285 may be formed to be rounded in the circumferential direction. In other words, the bearing groove 285 may has an arc shape.

In a process of rotation of the air flow control device 300 in the lateral direction, the first bearing 353 may be capable of moving by inserted into the bearing groove 285 and thus allows a friction force which is generated in the process of rotation of the air flow control device 300 to be reduced.

The air flow control device 300 includes a third fan housing 310 in which a third fan 330 is accommodated. The third fan housing 310 has a substantially annular shape. For convenience of description, the first fan 160 and the second fan 260 may be referred to as a "blowing fan," and the third fan 330 may be referred to as a "circulation fan." In other words, the first fan 160 and the second fan 260 may be referred to as a "main fan," and the third fan 330 may be referred to as a "sub-fan."

In detail, the third fan housing 310 includes a housing cover 312 which forms an outer appearance. A housing main body 311 which has an annular shape is provided in the inside of the housing cover 312. In other words, the housing cover 312 is coupled to the outer circumferential surface of the housing main body 311, and may be supported by the housing main body 311.

The housing main body 311 includes a cover supporting portion 311a which protrudes from the outer circumferential surface of the housing main body 311 to support the inside of the housing cover 312. The cover supporting portion 311a has a bent shape, and the outer surface of the cover supporting portion 311a may be coupled to the inner surface of the housing cover 312.

The housing cover 312 is disposed to surround the housing main body 311, and the housing main body 311 and the housing cover 312 may be rotated or moved together. The third fan 330 is accommodated in the inside portion of the housing main body 311. In addition, a housing flow path 314 through which air flows as the third fan 330 is driven is formed in an inside portion space of the housing main body 311. A blade 333 of the third fan 330 may be located in the housing flow path 314. By rotation of the blade 333, air is capable of flowing in the upper direction via the housing flow path 314. The housing flow path 314 may extend from a space in which the blade 333 is located to an upper space of the blade 333.

A discharging grill 315 which forms the second discharging portion 305 through which air passing through the third fan 330 is discharged is provided on the upper side of the third fan housing 310. In detail, referring to FIG. 17, the discharging grill 315 includes a grill outer wall 316, a grill inner wall 317 provided at the inside of the grill outer wall 316, and a plurality of grill portions 315a which extend from the grill outer wall 316 to the grill inner wall 317. Spaces between the plurality of grill portions 315a form the second discharging portion 305.

Since the second discharging portion 305 along with the first discharging portion 105 of the first blowing device 100 is provided in the air cleaner 10, the discharging amount of air is improved, and air is discharged in various directions.

Each of the grill outer wall 316 and the grill inner wall 317 has a cylindrical shape, and the grill outer wall 316 may be disposed to surround the grill inner wall 317. In addition, the second discharging portion 305 may be formed on the upper side of the housing flow path 314. Thus, air which passes through the housing flow path 314 is capable of being discharged to the outside of the air cleaner 10 via the second discharging portion 305 of the discharging grill 315.

The discharging grill 315 further includes a depression portion 318 which has a shape depressed at a substantially center portion of the discharging grill 315 and supports the display device 600. The depression portion 318 may be provided in the lower end portion of the grill inner wall 317.

A supporting rib 318a which supports a display PCB 610 of the display device 600 is provided in the depression portion 318. The supporting rib 318a may protrude in the upper direction from the upper surface of the depression portion 318. In addition, the grill inner wall 317 may support the lower side of the display PCB 610.

The display device 600 includes a PCB assembly 601. The PCB assembly 601 includes the display PCB 610 on which an illumination source is provided, a reflector 620 which is coupled to the upper side of the display PCB 610 and concentrates light irradiated from the illumination source in the upper direction such that displayed information is capable of being displayed as various characters, numbers, or symbols, and a diffusing plate 630 which is supported on the discharging grill 315 and guides light irradiated from the illumination source to be refracted and then face the upper surface of the display device, i.e., a rim portion 650 of a display screen 602.

An axial flow fan may be included in the third fan 330. Specifically, the third fan 330 may be operated in order to axially discharge air which is axially introduced. In other words, the air which flows toward the third fan 330 in the upper direction via the second fan 260, the first air flow path 272a of the third air guide device 270 and the discharging flow path 282a of the second discharging guide device 280 is discharged from the third fan 330 and thus may be discharged to the outside through the second discharging portion 305 which is positioned on the upper side of the third fan 330.

The third fan 330 includes a hub 331 having a shaft coupling portion to which a rotating shaft 336 of the third fan motor 335 which is the axial flow motor is coupled and a plurality of blades 333 which are coupled to the hub 331 in the circumferential direction. The third fan motor 335 is coupled to the lower side of the third fan 330 and may be disposed in the inside of the third motor housing 337.

The first fan motor 165 and the second fan motor 265 may be disposed in series relative to the longitudinal direction of the air cleaner 10. The second fan motor 265 and the third fan motor 335 may be disposed in series relative to the longitudinal direction of the air cleaner 10. In summary, the rotating shafts of the first fan motor 165, the second fan motor 265 and the third fan motor 335 or the first fan 160, the second fan 260 and the third fan 330 are may be positioned on the same axis in the longitudinal direction.

The air flow control device 300 further includes a flow guide portion 320 which is coupled to the lower side of the third fan housing 310 and thus guides the air passing by the second discharging guide device 280 to the third fan housing 310.

The flow guide portion 320 includes an introduction grill 325 which guides the air introduction to the third fan housing 310. The introduction grill 325 may have a concave shape in the lower direction.

A shape of the second discharging grill 288 of the second discharging guide device 280 is formed in a concave shape in the lower direction corresponding to the shape of the introduction grill 325. The introduction grill 325 may be seated on the upper side of the second discharging grill 288. By this configuration, the introduction grill 325 may be stably supported to the second discharging grill 288.

The air flow control device 300 further includes a rotation guide device 350 which is installed on the lower side of the flow guide portion 320 and thus guides rotation in the lateral direction and rotation in the vertical direction of the air flow control device 300. The rotation in the lateral direction is referred to as "first direction rotation" and the rotation in the vertical direction is referred to as "second direction rotation."

The rotation guide device 350 includes a guide main body 351 which is coupled to the movement guide portion 320. The guide main body 351 includes a lower surface portion 351a at which the first and second guide mechanisms are installed and a rim portion 351b which is provided on the rim of the lower surface portion 351a and protrudes in the lower direction.

The rotation guide device 350 includes a first guide mechanism which guides the first direction rotation of the air flow control device 300 and a second guide mechanism which guides the second direction rotation of the air flow control device 300.

The first guide mechanism includes a first gear motor 363 which generates a driving force and a first gear 360 which is coupled to the first gar motor 363 to be rotatable. As an example, the first gear motor 363 may include a step motor of which the rotation angle is easily controlled.

The first gear 360 is coupled to a motor shaft 363a of the first gear motor 363. The first guide mechanism further includes a first gear shaft 362 which extends in the lower direction, i.e., toward the third air guide device 270 or the second discharging guide device 280 from the first gear 360.

The first gear 360 is geared to the first rack 276 of the third air guide device 270. A plurality of gear teeth are formed in the first gear 360 and the first rack 276. When the first gear motor 363 is driven, the first gear 360 rotates and thus links to the first rack 276. At this time, the third air guide device 270 is fixed configuration and thus the first gear 360 is movable.

The shaft guide groove 277 of the third air guide device 270 is capable of guiding movement of the first gear 360. Specifically, the first gear shaft 362 may be inserted into the shaft guide groove 277. The first gear shaft 362 may be moved in the circumferential direction along the shaft guide groove 277 in a rotation process of the first gear 360.

The first guide mechanism further includes a rotating shaft 354 which constitutes rotation center of the air flow control device 300. The first gear 360 and the first gear shaft 362 may be rotated along a rotating radius which is set about the rotating shaft 354. At this time, the set rotating radius is referred to as "first rotating radius."

The first rack 276 and the shaft guide groove 277 may be formed to have a length corresponding to the rotation amount or rotation angle of the air flow control device 300. In detail, the length in the circumferential direction of the first rack 276 and the shaft guide groove 277 may be formed slightly greater than the distance in the circumferential direction in which the air flow control device 300 rotates. Accordingly, in a process of movement of the first gear 360, the first gear 360 can be prevented from being separated from the first rack 276. In addition, in a process of movement of the first gear shaft 362, the first gear shaft 362 can be prevented from interfering with the end portion of the shaft guide groove 277.

The rotating shaft 354 may be provided on a lower surface portion 351*a* of the guide main body 351. In detail, the rotating shaft 354 may protrude in the lower direction from the lower surface portion 351*a*. The rotating shaft 354 is inserted in a shaft insertion portion 284 of the second discharging guide device 280, and may be rotated in the shaft insertion portion 284. In other words, when the first gear 360 rotates, the first gear shaft 362 and the first gear 360 rotate about the rotating shaft 354 in the circumferential direction. The rotating shaft 354 rotates in the shaft inserting portion 284. Accordingly, the air flow control device 300 may be rotated in a first direction, that is, in the clockwise direction or in the counterclockwise direction about the longitudinal direction as the axial direction.

The first guide mechanism further includes bearings 353, and 355 for easily rotating the air flow control device 300 in the first direction. The bearings 353, 355 can reduce a friction force which is generated in the rotation process of the air flow control device 300.

The bearings 353 and 355 include a first bearing 353 which is provided on the lower surface of the rotation guide device 350. As an example, the first bearing 353 may be included a ball bearing.

In addition, the first guide mechanism further includes a bearing supporting portion 354 which protrudes in the lower direction from the lower surface portion 351*a* to support the first bearing 353. The bearing supporting portion 354 is formed in a set length, to guide the first bearing 353 to be disposed at a position at which the first bearing 353 is capable of being in contact with the rotation guide plate 283.

The rotation guide plate 283 includes a bearing groove 285 into which the first bearing 353 is inserted. In a process of rotation of the air flow control device 300 in the first direction, the first bearing 353 may be movable with the first bearing being inserted into the bearing groove 285.

At this time, the first bearing 353 may be rotated along a rotating radius which is set about the rotating shaft 354. At this time, the set rotating radius is referred to as "second rotating radius". The second rotating radius may be formed to be less than the first rotating radius. In other words, a distance from the rotating shaft 354 to the first bearing 353 may be formed shorter than a distance from the rotating shaft 354 to the first gear shaft 352. According to this configuration, the lower surface portion 351*a* is capable of being rotated by being stably supported by the third air guide device 270 and the second discharging guide device 280.

When the first gear shaft 362 is moved along the shaft guide groove 277, the first bearing 353 may be moved along the bearing groove 285. In order to allow the first gear shaft 362 and the first bearing 353 to be smoothly moved, a set curvature of the shaft guide groove 277 and a set curvature of the bearing groove 285 may be equal to each other.

The bearings 353 and 355 further include a second bearing 355. The second bearing 355 may be rotatably installed at the rim portion 351*b*. A bearing insertion portion 351*c* to which the second bearing 355 is coupled may be formed at the rim portion 351*b*. The bearing insertion portion 351*c* may be configured to be depressed in the upper direction from the lower surface of the rim portion 351*b*. In addition, a plurality of second bearing 355 may be provided. The second bearing 355 may be provided to be capable of being in contact with the discharging inside wall 282 of the second discharging guide device 280, that is, the inner circumferential surface of the discharging inside wall 282 may form the contacting surface of the second bearing 355. The air flow control device 300 is easily rotated in the first direction by the second bearing 355 rotating about the rotating shaft 354 along the inner circumferential surface of the discharging inside wall 282.

The first direction rotation of the air flow control device 300 will be briefly described with reference to FIG. 22. If the first gear motor 363 is operated, the first gear 360 may be rotated. When viewed from the top, the first gear motor 363 is rotated in the clockwise direction or the counterclockwise direction. Accordingly, the first gear 360 is capable of being rotated in the clockwise direction or the counterclockwise direction.

As an example, if the first gear motor 363 is rotated in the clockwise direction, the first gear 360 and the first gear shaft 362 may be moved in the counterclockwise direction along the shaft guide groove 277. On the other hand, if the first gear motor 363 is rotated in the counterclockwise direction, the first gear 360 and the first gear shaft 362 may be moved in the clockwise direction along the shaft guide groove 277.

As the first gear 360 is moved in the clockwise direction or in the counterclockwise direction, the air flow control device 300 is capable of being rotated in the same direction as the movement direction of the first gear 360. In this process, the first bearing 353 is moved along the bearing groove 285, and the second bearing 355 is moved along the inner circumferential surface of the discharging inside wall 282. Accordingly, the air flow control device 300 can be stably rotated along a set flow path in the lateral direction.

Figure 25:
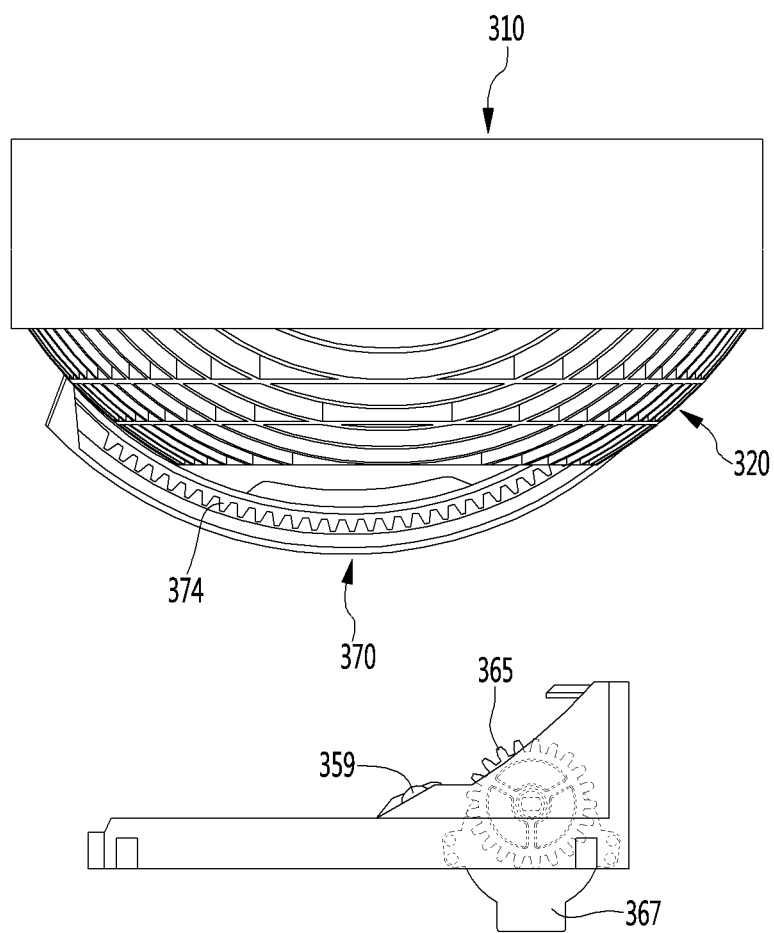
FIG. 25 is an exploded perspective view illustrating a configuration of a driving portion and a fixing portion of the air flow control device according to the embodiment.
Figure 26:
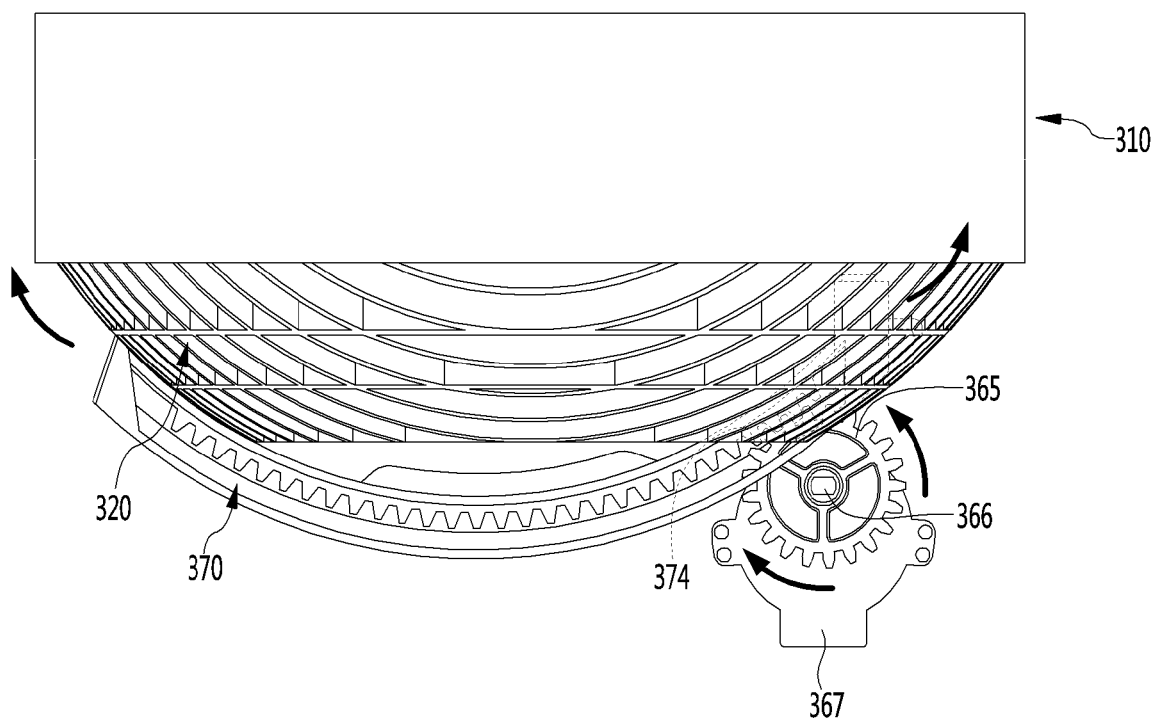
FIG. 26 is a view illustrating a state in which a second rack and a second gear, which are provided in the air flow control device, are interlocked with each other according to the embodiment.

FIG. 24 is an exploded perspective view illustrating the configuration of the air flow control device according to the embodiment. FIG. 25 is an exploded perspective view illustrating a configuration of a driving portion and a fixing portion of the air flow control device according to the embodiment. FIG. 26 is a view illustrating a state in which a second rack and a second gear, which are provided in the air flow control device, are interlocked with each other according to the embodiment.

Referring to FIGS. 20, 14, and 25, the air flow control device 300 according to the embodiment includes a second guide mechanism which guides rotation in the vertical direction of the air flow control device 300. The second guide mechanism includes a fixing guide member 352 which is fixed to the guide main body 351. The center shaft 354 is provided in the lower surface of the fixing guide member 352.

The fixing guide member 352 supports the lower side of the rotation guide member 370, and includes a first guide surface 352*a* which guides second direction rotation of the rotation guide member 370. The first guide surface 352*a* forms at least a portion of the upper surface of the fixing guide member 352, and may extend to be rounded in the upper direction, corresponding to a rotation path of the rotation guide member 370.

The fixing guide member 352 further includes a first guide bearing 359 which is capable of reducing the friction force which is generated at the time of rotating movement of the rotation guide member 370 by being provided to be capable of being in contact with the rotation guide member 370. The first guide bearing 359 may be positioned to the side of the first guide surface 352*a*.

The fixed guide member 352 further includes a second gear inserting portion 352*b* into which the second gear 365 is capable of being inserted for rotation of the rotation guide member 370. The second gear inserting portion 352*b* is formed on one side of the first guide surface 352*a*. As an example, the second gear inserting portion 352*b* may have a shape of at least a portion of the first guide surface 352*a* being cut.

The second gear 365 is positioned to the lower side of the first guide surface 352*a* and at least a portion of the second gear 365 may be configured to project to the upper side of the second gear inserting portion 352*b* through the second gear inserting portion 352*b*.

The second guide mechanism further includes a second gear motor 367 which couples to the second gear 365 and provides a driving force. As an example, the second gear motor 367 may include a step motor. The second guide mechanism further includes a second gear shaft 366 which extends from the second gear motor 367 to the second gear 365. When the second gear motor 367 is driven, the second gear shaft 366 and the second gear 365 may be rotated together.

The second guide mechanism further includes a rotation guide member 370 which is provided on the upper side of the fixing guide member 352. The rotation guide member 370 is coupled to the lower side of flow guide portion 320.

Specifically, the rotation guide member 370 includes a main body portion 371 which is supported by the fixing guide member 352. The main body portion 371 includes a second guide surface 372 which moves along the first guide surface. The first guide surface 372 may be formed to be rounded corresponding to a curvature of the first guide surface 352*a*.

The rotation guide member 370 further includes a second guide bearing 375 which is capable of reducing the friction force which is generated at the time of rotating movement of the rotation guide member 370 by being provided to be capable of being in contact with the fixing guide member 352. The second guide bearing 375 may be positioned on the side of the second guide surface 372.

The rotation guiding member 370 further includes a second rack 374 which is linked to the second gear 365. A plurality of gear teeth are formed in the second gear 365 and the second rack 374 and the second gear 365 and the second rack 374 may be geared to each other through the plurality of gear teeth.

If the second gear motor 367 is driven, the rotation guide member 370 has a movement which rotates in the vertical direction by linkage of the second gear 365 and the second rack 374. Accordingly, the air flow control device 300 performs second direction rotation according to the movement of the rotation guide member 370.

The second direction rotation of the air flow control device 300 will be briefly described with reference to FIG. 26.

If the second gear motor 367 is operated, the second gear 365 may be rotated. The second gear motor 367 is rotated in the clockwise direction or in the counterclockwise direction relative to the radial direction. Accordingly, the second gear 365 is capable of being rotated in the clockwise direction or in the counterclockwise direction.

As an example, if the second gear motor 367 is rotated in the clockwise direction, the second gear 365 is rotated in the clockwise direction, and the second rack 374 is rotated in the counterclockwise direction by linkage with the second gear 365. As the second rack 374 is rotated, the rotation guide member 370 and the flow guide portion 320 are capable of being rotated together. Finally, the fan housing 310 can be rotated in the counterclockwise direction.

On the other hand, if the second gear motor 367 is rotated in the counterclockwise direction, the second gear 365 is rotated in the counterclockwise direction, and the second rack 374 is rotated in the clockwise direction by linkage with the second gear 365. As the second rack 374 is rotated, the rotation guide member 370 and the flow guide portion 320 are capable of being rotated together. Finally, the fan housing 310 can be rotated in the clockwise direction. Accordingly, the air flow control device 300 can be stably rotated along a set path in the vertical direction.

Figure 27:
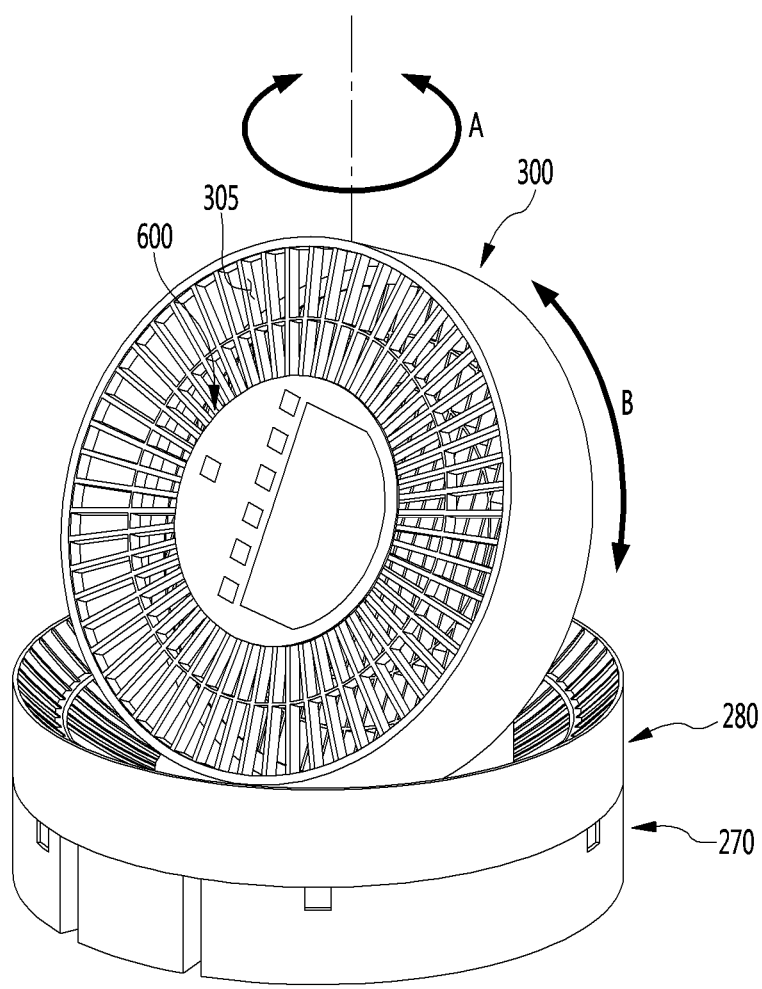
FIGS. 27 and 28 illustrate a state in which an air flow control device is located at a second position according to an embodiment of the present invention.
Figure 28:
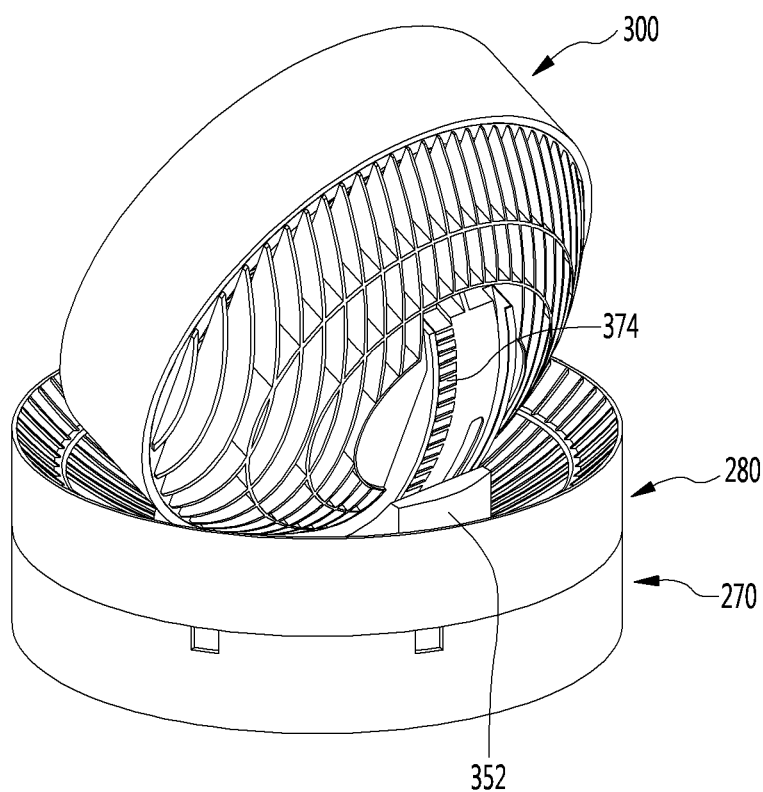
Figure 29:
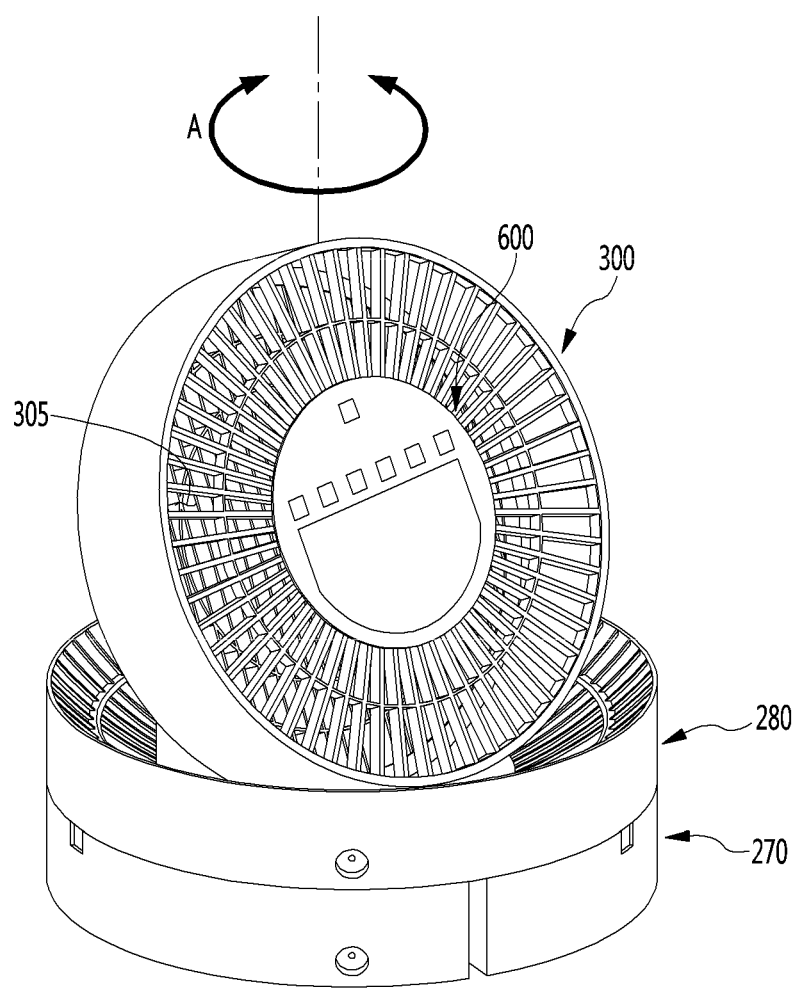
FIG. 29 is a view illustrating a state in which the air flow control device of FIG. 27 is rotated in direction A.

FIGS. 27 and 28 are views illustrating a state in which the air flow control device is located at a second position according to the embodiment. FIG. 29 is a view illustrating a state in which the air flow control device of FIG. 27 is rotated in direction A.

FIGS. 27 and 28 illustrate a state in which the air flow control device 300 protrudes to the upper side of the second discharging guide device 280, i.e., a state (second position) in which the fan housing 310 is erected in the upper direction as the rotation guide member 370 is rotated in the upper direction.

As the air flow control device 300 is operated to be vertically rotatable in a direction of "B" shown in FIG. 27, the air flow control device 300 may be located at the first direction (see FIG. 1) or the second position. When the air flow control device 300 is located at the first position, the introducing grill 325 is mounted on the upper surface of the second discharging grill 288. On the other hand, when the air flow control device 300 is located at the second position, the introducing grill 325 is spaced apart from the upper surface of the second discharging grill 288 in the upper direction.

The third fan 330 may be selectively operated based on whether the air flow control device 300 is located at the first position or the second position.

In detail, referring to FIG. 23, the first and second fans 160 and 260 may be rotated to generate air flow in the state in which the air flow control device 300 is located at the first position. Air suction and discharging (first flow) at a lower portion of the air cleaner 10 may be generated by the operation of the first fan 160. In addition, air suction and discharging (second flow) at an upper portion of the air cleaner 10 may be generated by the operation of the second fan 260. The first flow and the second flow may be separated from each other by the dividing device 400.

In addition, the third fan 330 may be selectively operated. If the third fan 330 is operated, the second flow may be more strongly generated. In other words, strong discharging air current at the upper portion of the air cleaner 10 is generated by the second fan 260 and the 330, and may be discharged through the second discharging portion 305. It will be apparent that the third fan 330 may not be operated.

Meanwhile, in the state in which the air flow control device 300 is located at the second position, the first and second fans 160 and 260 may be rotated to generate the first flow and the second flow. In addition, the third fan 330 may be operated. The second position is understood as a position which is inclined by a set angle in the upper direction, relative to the first position of the air flow control device 300. As an example, the set angle may be about 60 degrees.

Figure 37:
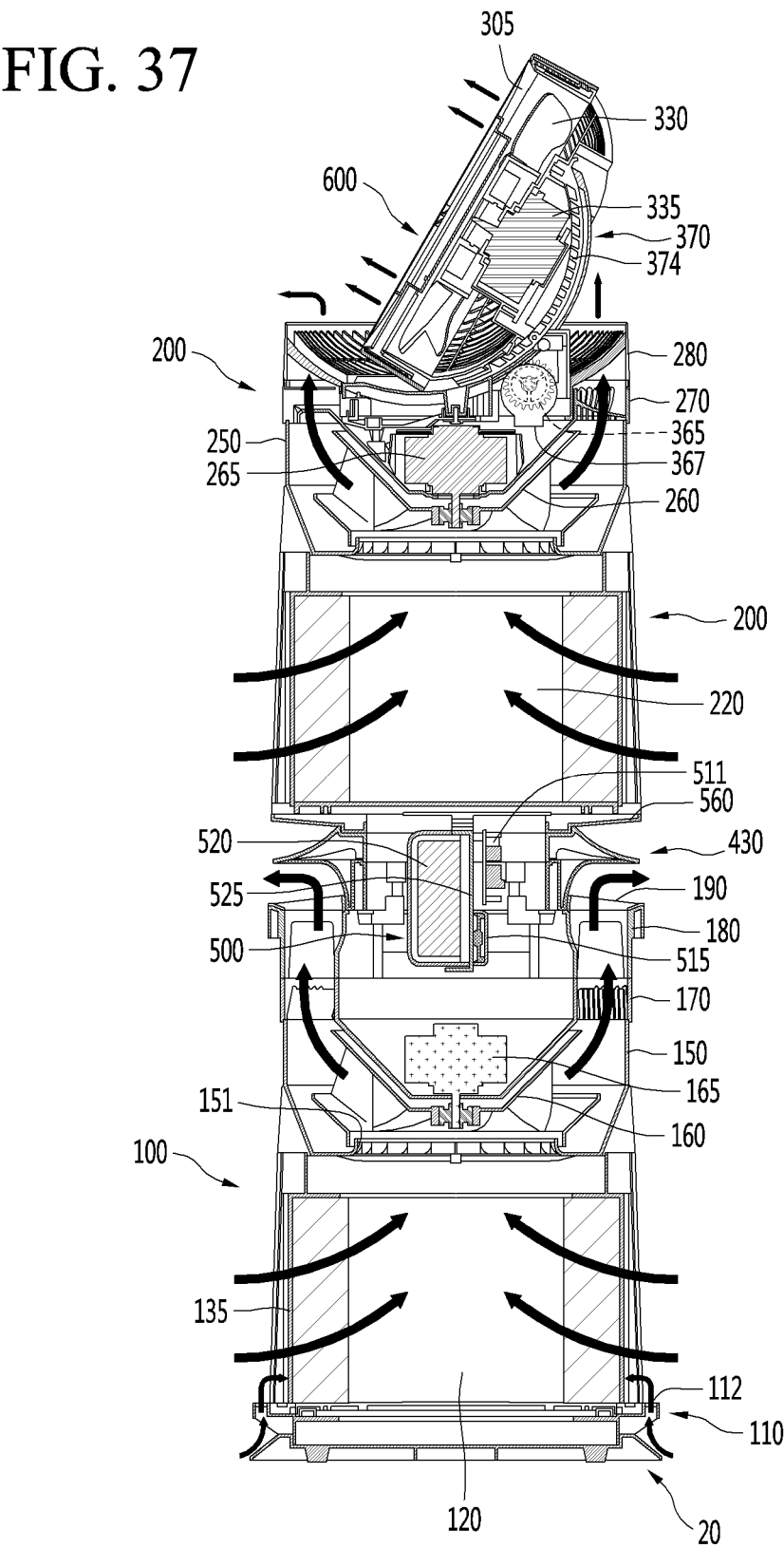

In detail, referring to FIG. 37, by the operation of the third fan 330, at least a portion of air which is discharged through the second discharging guide device 280 may be introduced to the inside portion of the third fan housing 310, and may be discharged from the second discharging portion 305 via the third fan 330. Accordingly, purified air can reach a position distant from the air cleaner 10.

In the state in which the air flow control device 300 is located at the second position, the air flow control device 300 may be rotated in the lateral direction, relative to the side direction. FIG. 27 illustrates a state in which the air flow control device 300 is located to face in one direction (left direction relative to FIG. 27) in the state in which the air flow control device 300 is located at the second position. Here, the one direction may be a direction which faces at 45 degrees to the left side, relative to the front of the air cleaner 10.

The air flow control device 300 may be located to face in another direction in the state in which the air flow control device 300 is located at the second position. Here, the other direction may be a face which faces at 45 degrees at the left side, relative to the front of the air cleaner 10. In other words, the rotation angle of the air flow control device 300 may be about 90 degrees.

As described above, the air flow control device 300 is capable of being rotated in the lateral direction relative to the axial direction, and thus discharging air current can be blown to a long distance in various directions, relative to the air cleaner 10.

Figure 30:
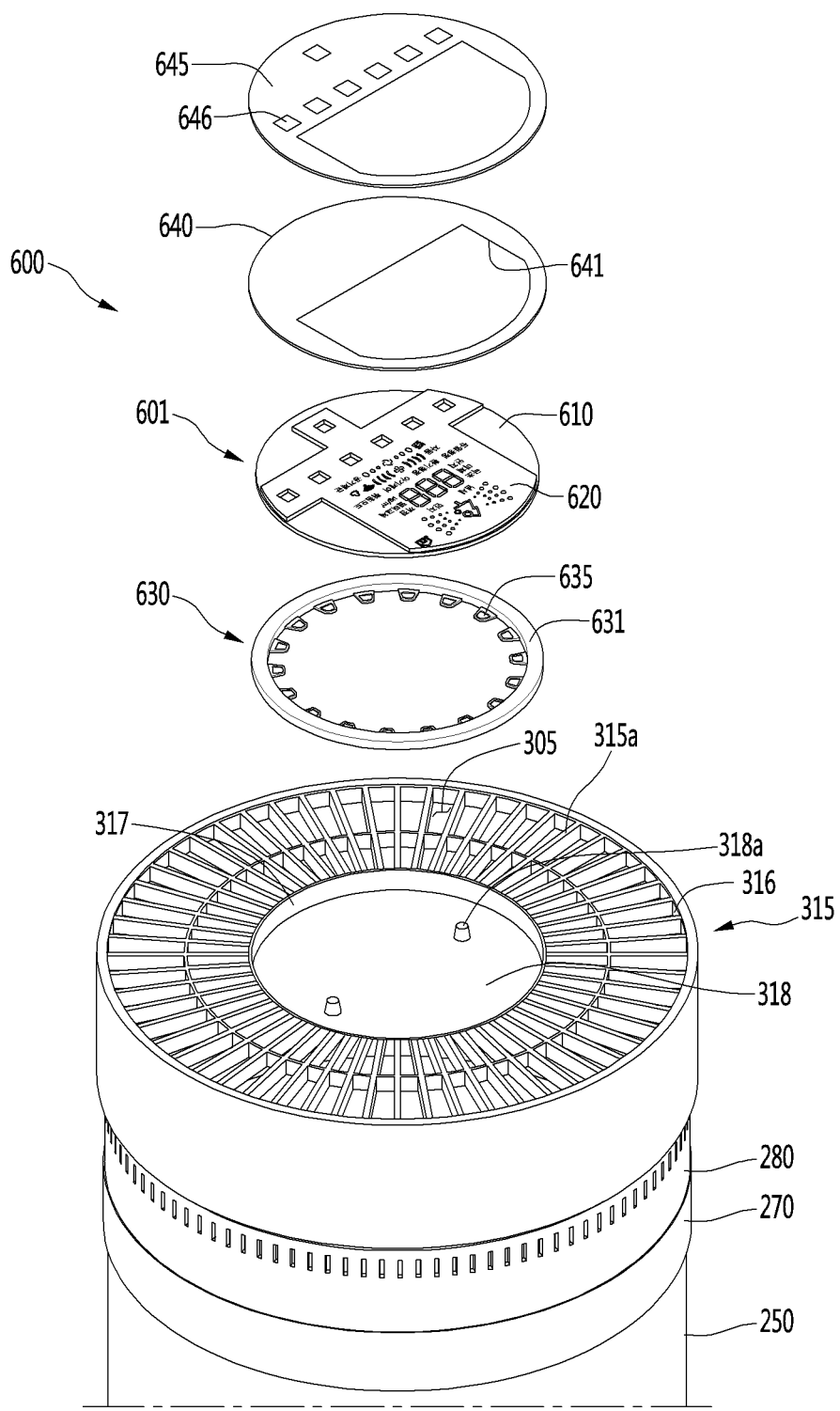
FIG. 30 is an exploded perspective view illustrating a configuration of the display device which is coupled to the discharging grill according to the embodiment.
Figure 31:
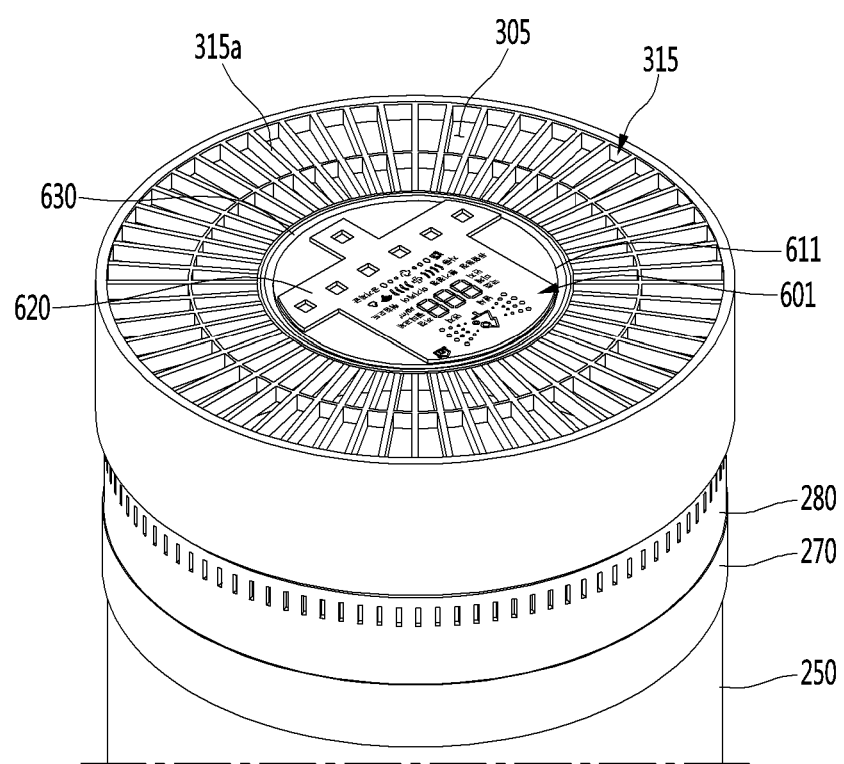
FIG. 31 is a view illustrating a state in which a PCB assembly is coupled to the discharging grill according to the embodiment.
Figure 32:
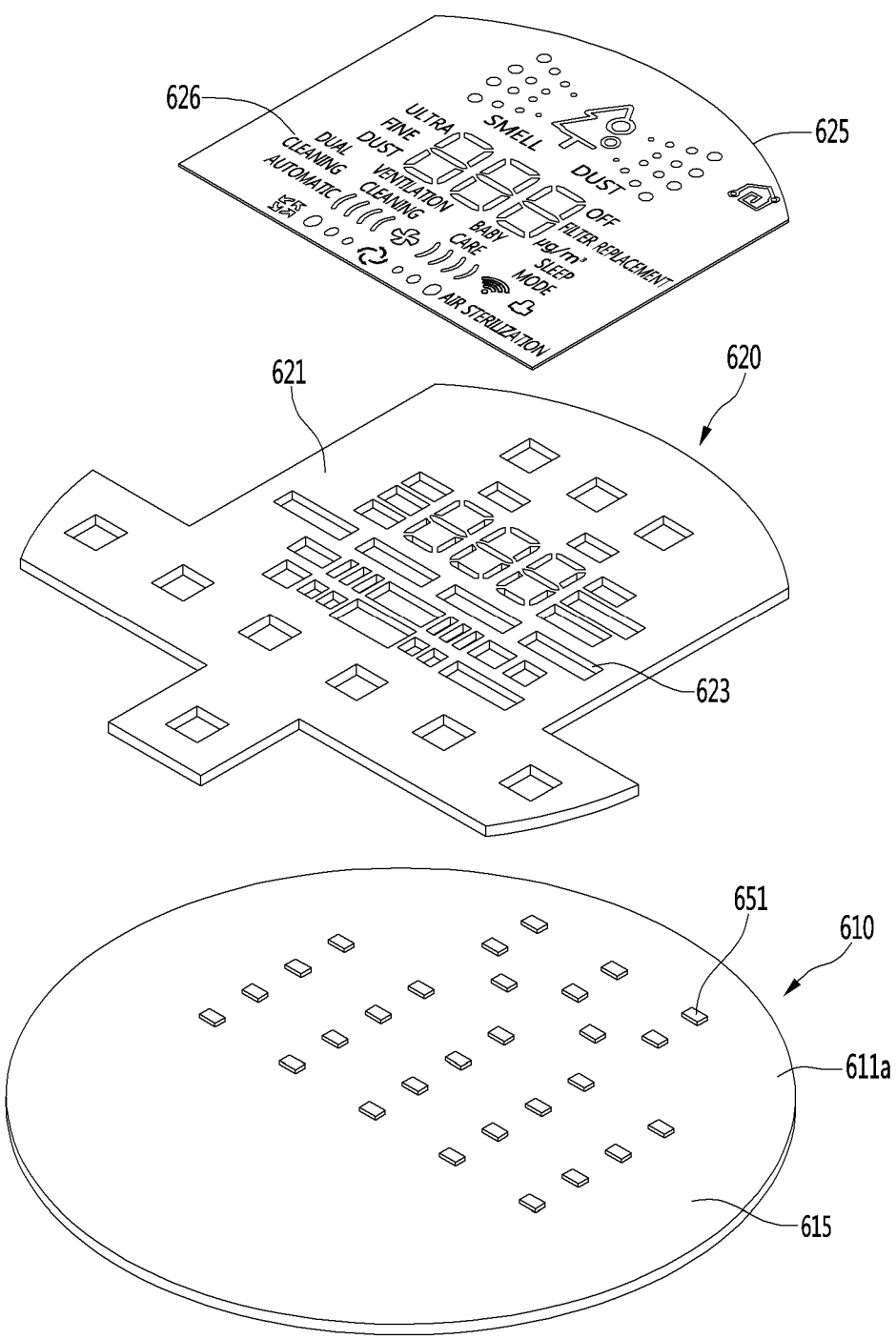
FIG. 32 is an exploded perspective view illustrating a configuration of the PCB assembly according to the embodiment.
Figure 33:
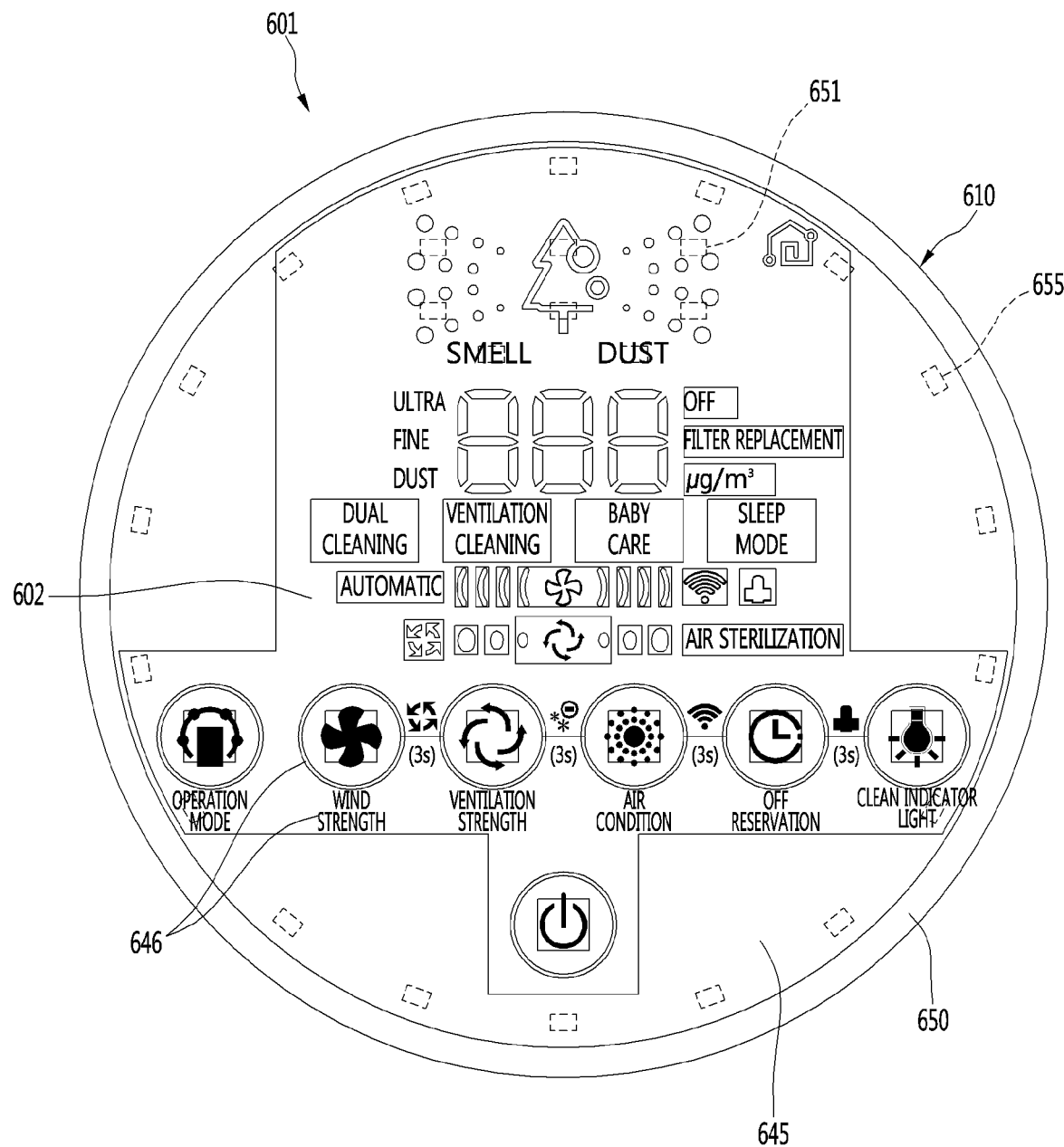
FIG. 33 is a view illustrating a configuration of the upper surface of a display device according to the embodiment.
Figure 34:
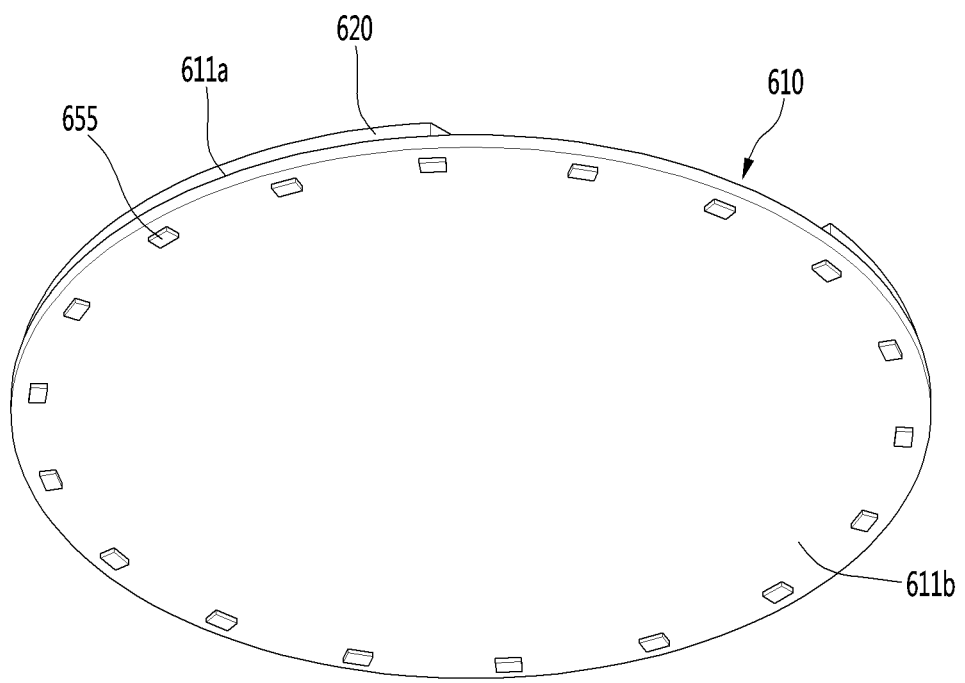
FIG. 34 is a view illustrating a configuration of the lower surface of the PCB assembly according to the embodiment.

FIG. 30 is an exploded perspective view illustrating a configuration of the display device which is coupled to the discharging grill according to the embodiment. FIG. 31 is a view illustrating a state in which a PCB assembly is coupled to the discharging grill according to the embodiment. FIG. 32 is an exploded perspective view illustrating a configuration of the PCB assembly according to the embodiment. FIG. 33 is a view illustrating a configuration of the upper surface of a display device according to the embodiment. FIG. 34 is a view illustrating a configuration of the lower surface of the PCB assembly according to the embodiment.

Referring to FIGS. 30 to 34, the display device 600 according to the embodiment may be installed at an upper portion of the air cleaner 10. The display screen 602 of the display device 600 may constitute at least a portion of the upper surface of the air cleaner 10.

The display device 600 may be installed in the discharging grill 315. A depression portion 318 which has a shape depressed in the lower direction is provided at a substantially center portion of the discharging grill 315, and a plurality of grill portions 315a may extend toward the outside in the radial direction from the depression portion 318. In addition, the display device 600 may be disposed on the upper side of the depression portion 318.

The display device 600 includes a PCB assembly 601. The PCB assembly 601 includes a display PCB 610 on which a plurality of illumination sources 651 and 655 are provided, and a reflector 620 which is coupled to the upper side of the display PCB 610 to allow light irradiated from the plurality of illumination sources 651 to be concentrated toward the display screen 602.

The plurality of illumination sources 651 and 655 include a first illumination source 651 for displaying operation information of the air cleaner 10 and a second illumination source 655 for displaying the rim of the display screen 602 of the display device 600. The display screen 602 is a set area (hereinafter, referred to as a display area) in which the information is capable of being displayed, and is formed on the upper surface of the display device 600. In addition, the rim of the display screen 602 may form a boundary of the display area.

The display PCB 610 includes a board main body 611 which has a substantially circular shape. The board main body 611 includes a main body front surface portion 611a on which the first illumination source 651 is installed and a main body rear surface portion 611b on which the second illumination source 655 is installed.

A plurality of first illumination sources 651 may be provided on the main body front surface portion 611a, corresponding to the shape of a displayed content. In addition, a plurality of second illumination sources 655 may be provided. The plurality of second illumination sources 655 may be arranged along the rim of the main body rear surface portion 611b. As an example, the plurality of second illumination sources 655 may be arranged in a circular shape.

The reflector 620 includes a reflector main body 621 and a through hole 623 which is formed in the reflector main body 621 and allows light irradiated from the first illumination source 651 to be concentrated in the upper direction. The reflector main body 621 may be made of an opaque material by which the transmission of light is limited, or the opaque material may be coated on the reflector main body 621.

A reflector film 625 is provided on the upper side of the reflector 620. The reflector film 625 includes a pattern display portion 626 at which a content of displayed information, i.e., a predetermined character, number, or symbol is displayed. The light concentrated through the reflector 620 acts on the pattern display portion 626, thereby implementing predetermined information. The pattern display portion 625 may be made of a transparent material.

As an example, as shown in FIG. 32, the pattern display portion 626 may include characters such as "smell," "dust," "fine dust," and "filter replacement," an 888 pattern which is capable of displaying numbers, a symbol which represents a strength of a blowing amount, and the like.

The first illumination source 651 may be disposed at a position corresponding to the pattern display portion 626. As an example, the first illumination source 651 may be disposed on the lower side of the pattern display portion 626. Since a plurality of pattern display portions 626 are provided to implement various patterns, a plurality of first illumination sources 651 may be provided corresponding to the plurality of pattern display portions 626. Light irradiated from the first illumination source 651 may be exposed to the outside by passing through the pattern display portion 626. In addition, various information may be displayed by on/off control of the plurality of first illumination sources 651.

The display device 600 includes a diffusing plate 630 which surrounds the outside of the PCB assembly 601. The diffusing plate 630 may be understood as a component which forms a rim portion 650 of the display screen 602 by diffusing light irradiated from the second illumination source 655.

The diffusing plate 630 may be disposed along the rim of the depression portion 318. In detail, the diffusing plate 630 includes a plate main body 631 which is disposed to surround the display PCB 610 and an illumination accommodating portion 635 which protrudes from the inner circumferential surface of the plate main body 631 to allow the second illumination source 655 to be accommodated therein. The plate main body 631 may have a ring shape, and may be supported by the discharging grill 315. In addition, the plate main body 631 and the illumination accommodating portion 635 may be integrally formed.

The plate main body 631 and the illumination accommodating portion 635 may be made of a translucent material which is capable of refracting or diffusing light. As an example, the plate main body 631 and the illumination accommodating portion 635 may be made of an acrylic material.

The plate main body 631 may constitute the rim portion 650 of the display screen 602. In detail, the upper portion of the plate main body 631 may be exposed to the upper surface of the air cleaner 10, and light irradiated from the second illumination source 655 is diffused through the illumination accommodating portion 635 and the plate main body 631. In addition, the diffused light moves to the upper portion of the air cleaner 10, thereby constituting the rim portion 650.

Since the plate main body 631 and the illumination accommodating portion 635 are made of a translucent material, the rim portion 650 may be implemented using soft light. Thus, a display screen having a comfortable feeling can be implemented.

The display device 600 further includes a display cover 640 which is provided on the upper side of the PCB assembly 601. The display cover 640 may be understood as a component for supporting the outside of the display PCB 610 and maintaining a cover film 645 to be flat. The display cover 640 may be made of an opaque material for preventing transmission of light.

A cover hole 641 which has a shape corresponding to the reflector film 625 is formed in the display cover 640. According to the configuration of the cover hole 641, although the display cover 640 is coupled to the reflector 620, the reflector film 625 is capable of being exposed in the upper direction.

The cover film 645 is provided on the upper side of the display cover 640. As an example, the cover film 645 may be attached to the upper surface of the display cover 640. The cover film 645 may be made of a translucent material to allow a portion of light transferred from the PCB assembly 601 to be transmitted therethrough. As an example, the translucent material may include an acrylic or polymethyl methacrylate (PMMA) resin. The cover film 645 is provided, so that information displayed through the display device 600 can be prevented from being implemented to be extremely dazzling.

The cover film 645 includes a film display portion 646 which allows a user to input a predetermined command or displays a portion of a plurality of operation information of the air cleaner 10.

Figure 35:
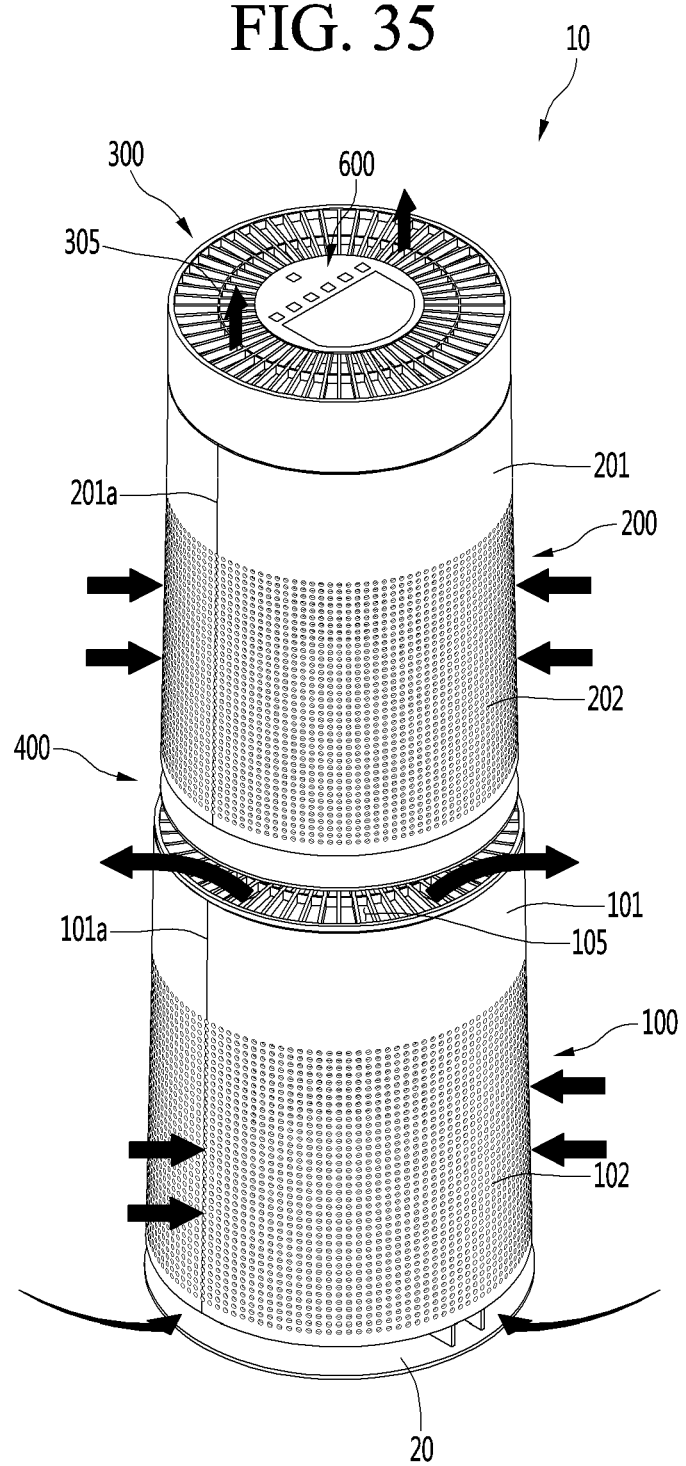
FIGS. 35 to 37 are views illustrating a state in which air flows in the air cleaner according to the embodiment.
Figure 36:
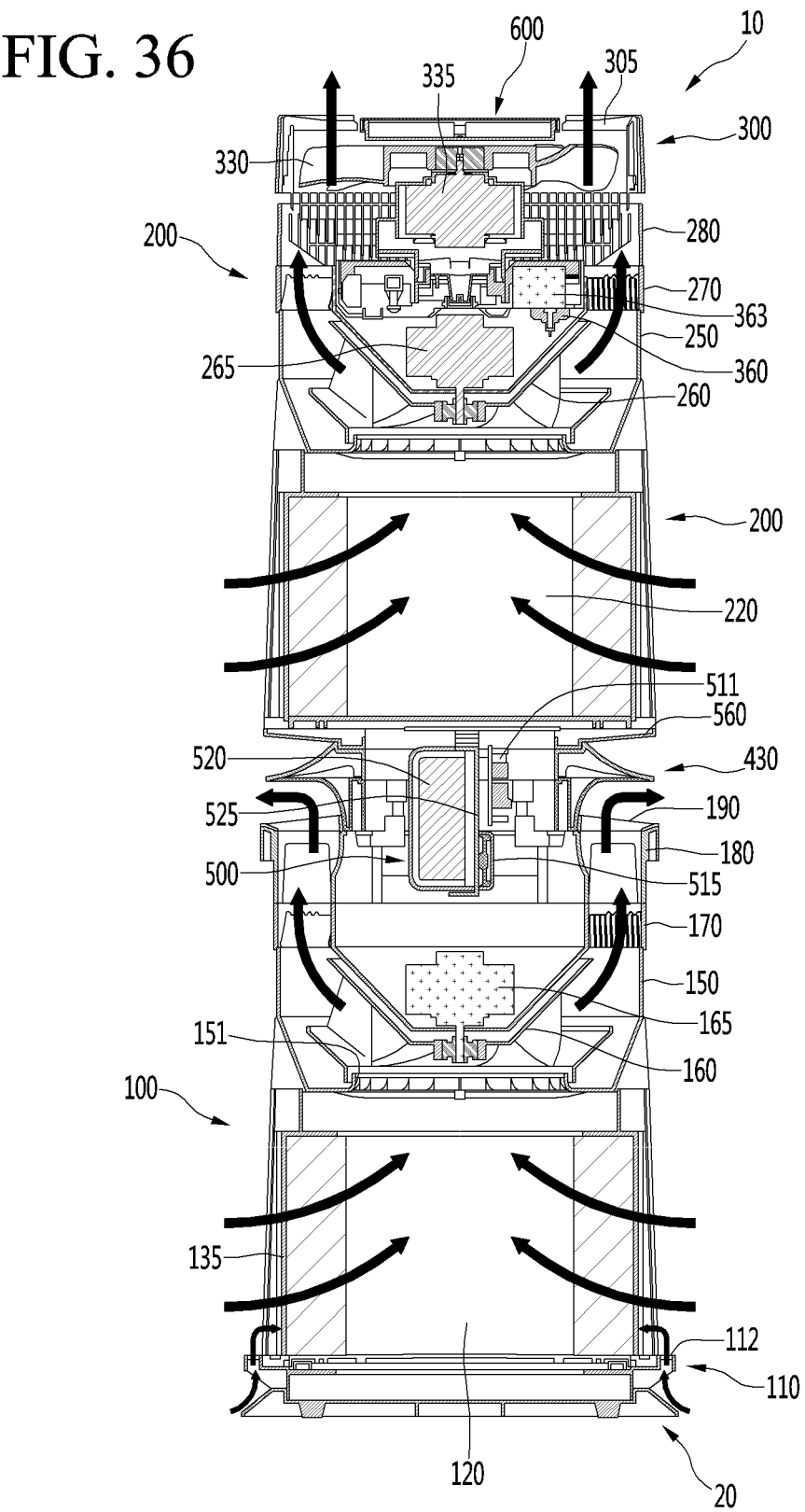

FIGS. 35 to 37 are views illustrating a state in which air flows in the air cleaner according to the embodiment.

First, the flow of air according to driving of the first blowing device 100 will be described. If the first fan 160 is driven, indoor air is sucked to the inside portion of the first case 101 through the first suction portion 102 and the base suction portion 103. The sucked air passes through the first filter member 120, and foreign materials in air may be filtered in this process. In a process in which air passes through the first filter member 120, the air is sucked in the radius direction of the first filter member 120, is filtered, and then flows in the upper direction.

The air which is passed through the first filter member 120 flows to the upper side in the radial direction while passing through the first fan 160 and stable flow in the upper direction is performed while passing through the first air guide device 170 and the second air guide device 180. Air passing through the first air guide device 170 and the second air guide device 180 passes by the first discharging guide device 190 and flows in the upper direction through the first discharging portion 105. Air which is discharged through the first discharging portion 105 is guided by the dividing plate 430 which positions to the upper side of the first discharging guide device 190 and thus is discharged to the outside of the air cleaner 10.

Meanwhile, if the second fan 260 is driven, indoor air is sucked to the inside portion of the second case 201 through the second suction portion 202 and the base suction portion 103. The sucked air passes through the second filter member 220, and foreign materials in air may be filtered in this process. In a process in which air passes through the second filter member 220, the air is sucked in the radius direction of the second filter member 220, is filtered, and then flows in the upper direction.

Air which passes through the second filter member 220 flows to the upper side in the radial direction while passing through the second fan 160, and stable flow in the upper direction is performed while passing through the third air guide device 270 and the second discharging guide device 280. Air which passes through the third air guide device 270 and the second discharging guide device 280 may be discharged through the second discharging portion 305 via the air flow control device 300.

The air flow control device 300 may be rotatably provided in the vertical direction by the second guide mechanism. As an example, as shown in FIGS. 22 to 24, if the air flow control device 300 is located at the first position, air which is discharged from the air flow control device 300 flows in the upper direction.

On the other hand, if the air flow control device 300 is placed at the second position, air which is discharged from the air flow control device 300 may flow toward the front upper side. By the air flow control device 300, the air volume of air which is discharged from the air cleaner 10 can be increased, and purified air can be supplied to a position distant from the air cleaner 10.

In detail, if the third fan 330 of the air flow control device 300 is driven, at least a portion of air which is discharged from the second discharging guide device 280 may be introduced to the inside portion of the third fan housing 310. Then, the introduced air passes through the third fan 330, and may be discharged to the outside through the second discharging portion 305.

Meanwhile, the air flow control device 300 may be rotated in the lateral direction by the first guide mechanism in the state in which the air flow control device 300 is located at the second position. As an example, as shown in FIGS. 14 and 15, when the air flow control device 300 faces the front upper side, air which is discharged through the second discharging portion 305 may flow toward the front upper side. On the other hand, as shown in FIG. 16, when the air flow control device 300 faces the rear upper side, air which is discharged through the second discharging portion 305 may flow toward the rear upper side.

According to this action, air which is discharged from the air cleaner 10 does not simply face in the upper direction but may face in the front direction, and thus an air current toward a space relatively distant from the air cleaner 10 is capable of being generated. Since the separate third fan 330 is provided in the air flow control device 300, the blowing force of the discharged air can be increased.

In addition, the air flow control device 300 is capable of performing the first direction rotation, and thus air can be discharged to both sides of the front of the air cleaner 10. Accordingly, an air current can be provided toward a relatively wide room space.

The air flow control device 300 may be selectively operated based on an operation mode of the air cleaner 10. When the air cleaner 10 is operated in a general operation mode (first operation mode), the air flow control device 300 is located at the first position at which the air flow control device 300 is laid as shown in FIGS. 22 and 23. Then, the first and second blowing devices 100 and 200 are driven, thereby forming a plurality of independent air currents.

In other words, if the first blowing device 100 is driven, air may be sucked through the first suction portion 102 and the base suction portion 103 and then discharged through the first discharging portion 105 by passing through the first filter member 120 and the first fan 160. In addition, if the second blowing device 200 is driven, air may be sucked through the second suction portion 202 and pass through the third fan 330 via the second filter member 220 and the second fan 260. The third fan 330 is driven to have a rotation number corresponding to the rotation number of the second fan 260, thereby guiding air flow.

Meanwhile, the air current may be changed toward both sides of the front of the air cleaner while the air flow control device 300 is performing the first direction rotation in the state in which the air flow control device 300 is located at the first position.

On the other hand, when the air cleaner 10 is operated in a flow conversion mode (second operation mode), the air flow control device 300 may protrude from the upper end portion of the air cleaner 10 by being rotated in the upper direction as shown in FIG. 24. Meanwhile, in the flow conversion mode, driving of the first and second blowing devices 100 and 200 may be identical to driving of the first and second blowing devices 100 and 200 in the general operation mode.

Then, the third fan 330 is driven, and accordingly, at least a portion of air which passes through the second fan 260 and the discharging flow path 282a of the second discharging guide device 280 is introduced to the third fan housing 310. In addition, at least a portion of the introduced air is discharged toward the front upper side or the rear upper side of the air cleaner 10 while passing through the third fan 330.

According to the present disclosure, a suction capacity can be improved since the suction portion is formed along an outer circumferential surface of a cylindrical case and a structural resistance of the case is not generated in an air suction process.

In addition, discharge of air in the upper direction can be guided through the second blowing device and a discharge of air in the front direction can be guided by the air flow control device which is provided on the upper side of the second blowing device. Discharge of air in the lateral direction can be guided, in a process of rotating of the air flow control device. Finally, an air cleaning function of the indoor space can be improved since discharge of air in various directions is guided relative to the air cleaner and a discharging air flow can be formed to a long distance from the air cleaner. A discharging air flow can be easily generated toward the circumferential space of the person in the room whether the person in the room sits down or stands up.

In addition, since the air flow control device includes a first guide mechanism which guides rotation in the lateral direction and a second guide mechanism which guides rotation in the vertical direction, the air flow control device can control a discharging air current while being rotated in the lateral direction by the operation of the first guide mechanism in a state in which the air flow control device is located at a first position at which the air flow control device is laid by the operation of the second guide mechanism or a second position at which the air flow control device is erected by the operation of the second guide mechanism.

In addition, since a third fan is provided in the air flow control device, air is capable of being discharged by adding a flow force generated by the third fan to air which flows through the second blowing device. Thus, a strong discharging air current is capable of being generated, so that an air current can reach to a position distant from the air cleaner.

In addition, since each of the first guide mechanism and the second guide mechanism includes a gear motor and a gear, rotation in the vertical direction or the lateral direction of the air flow control device can be easily performed.

In addition, a display device is provided at an upper portion of the air flow control device, so that operation information of the air cleaner can be easily recognized to the outside. In particular, the display device is well exposed to the outside not only when the air flow control device is in an inclinedly erected state (second position) relative to the axial direction but also when the air flow control device is in a laid state (first position) relative to the axial direction, so that operation information of the air cleaner can be easily identified.

In addition, the air flow control device includes a discharging grill, and a depression portion is provided at a center portion of the discharging grill. Thus, the display device can be installed, and a discharging portion through which air is discharged can be formed along the circumference of the depression portion. Accordingly, it is possible to improve the spatial utilization of the air cleaner. Furthermore, it is possible to prevent flow of air discharged through the discharging portion from being interfered by the display device.

In addition, the display device includes a PCB assembly, i.e., a display PCB having a first illumination source and a reflector which is coupled to the display PCB, so that it is possible to easily implement various characters, numbers, or symbols relative to the operation of the air cleaner.

In addition, a second illumination source is provided on the lower surface of the display PCB, and a diffusing plate having an illumination accommodating portion which accommodates the illumination source therein is provided on the lower side of the display PCB, so that light irradiated from the illumination source can be refracted through the diffusing plate to be easily moved to the rim portion of the front surface of the display device. Finally, it is possible to obtain an effect that information displayed through the display device is visually emphasized. Accordingly, the user can easily identify the information even in a slightly distant distance.

In addition, the blowing capacity of the air cleaner can be improved since the plurality of blowing devices are provided.

In addition, the air which flows in the radial direction through the centrifugal fan can be easily guided toward the discharging portion in the upper direction, since the centrifugal fan for increasing the blowing capacity of the air cleaner and the air guide device which is disposed on an outlet side of the centrifugal fan are provided.

In addition, phenomena that interfere with each other between the air flows can be prevented since the air flows which are independent from each other are generated through the first blowing device and the second blowing device. Accordingly, the air flowing capacity can be improved.

Figure 38:
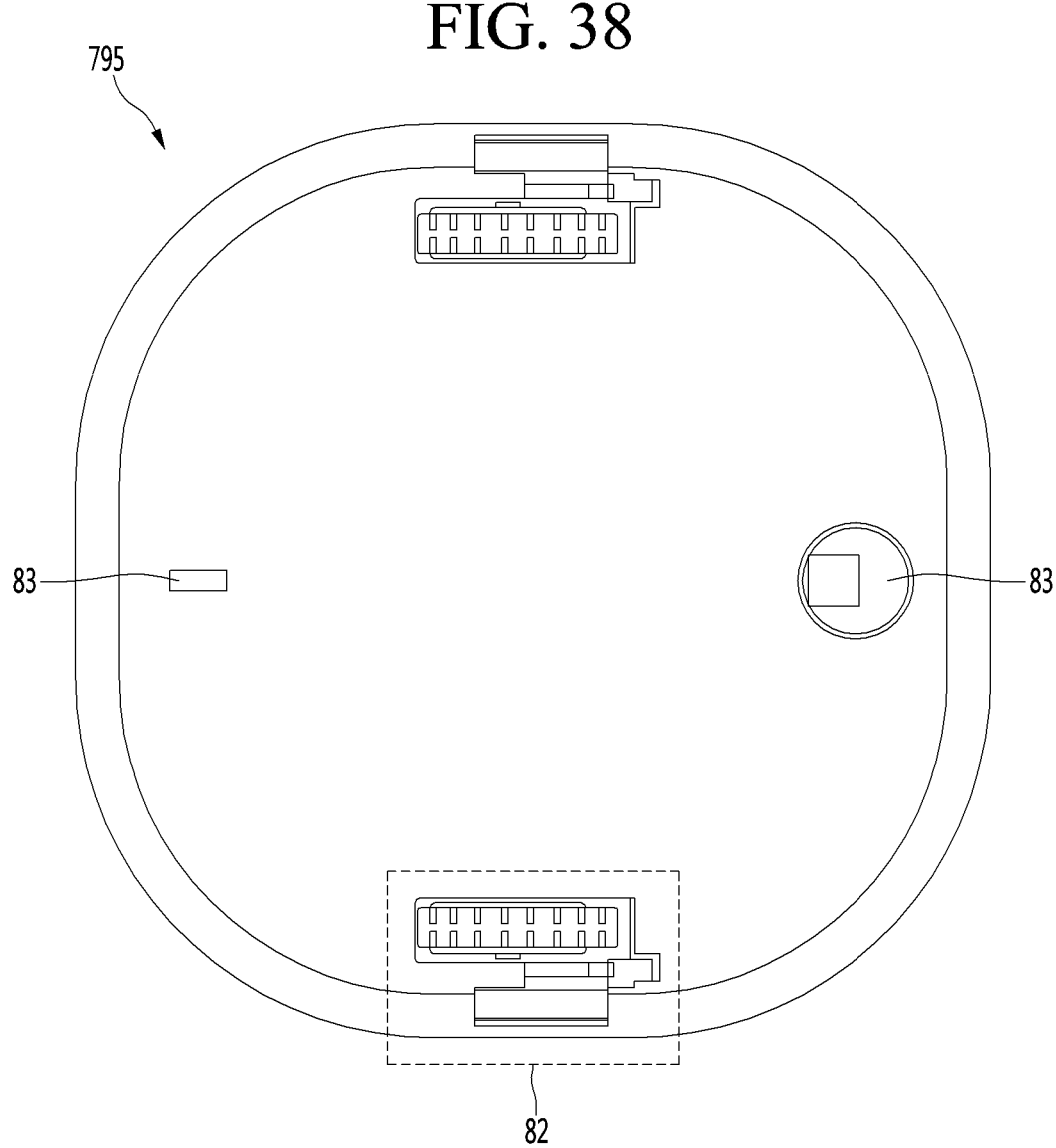
FIG. 38 is a bottom view showing an example of a driving portion of an air cleaner.
Figure 39:
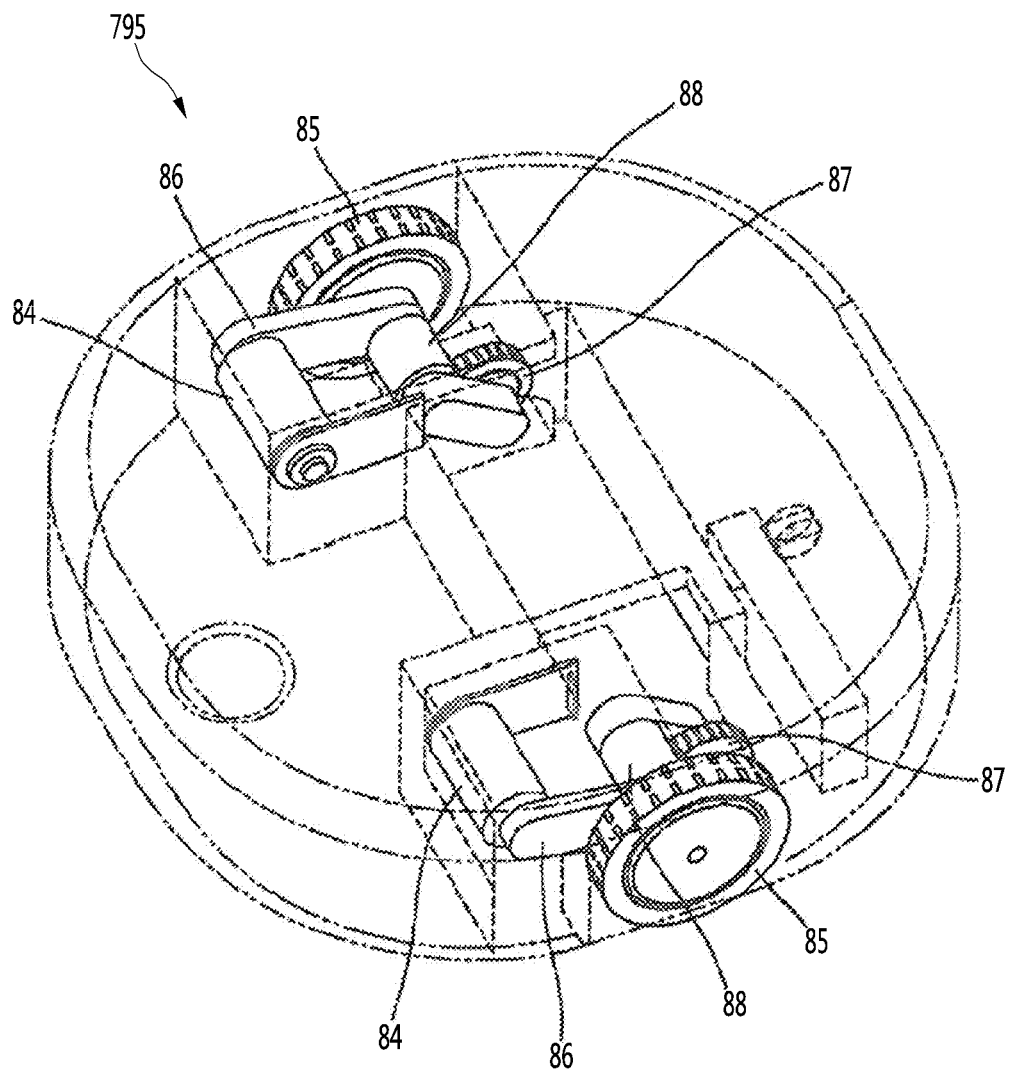
FIG. 39 is a diagram showing the inside of the driving portion shown in FIG. 38.

FIG. 38 is a bottom view showing an example of the driving portion of an air cleaner, and FIG. 39 is a view showing the inside of the driving portion shown in FIG. 38.

The configuration of the driving portion 795 may vary as necessary, and the configuration of the driving portion 795 according to an example will be described below.

The driving portion 795 may include at least one drive wheel 82 and an auxiliary wheel 83. For example, the driving portion 795 may include a pair of drive wheels 82 and an auxiliary wheel 83, and the drive wheel 82 and the auxiliary wheel 83 may protrude downward from the bottom surface of the body.

The drive wheel 82 may be driven by the driving force of the motor 84 and may be controlled by the controller 77. The driving force may not be transferred to the auxiliary wheel 83 and the auxiliary wheel may serve to assist in the traveling of the driving portion 795.

The controller 77 may individually control the drive wheels 82. By controlling the rotational directions and rotational speeds of the drive wheels 82 differently, the mobile indoor unit 6 may travel and rotate in various directions.

The drive wheel 82 may include at least one of a main wheel 85, an auxiliary wheel 87, a motor 84, a gear unit 86, and a clutch member 88.

The main wheel 85 is configured in a circular shape, and a plurality of grooves may be provided on the outer surface. A hole may be provided in the central portion of the main wheel 85.

The frictional force caused by the surface shape of the auxiliary wheel 87 may be higher than the frictional force caused by the surface shape of the main wheel 85. The diameter of the auxiliary wheel 87 may be smaller than the diameter of the main wheel 85.

The motor 84 may generate the driving force and the main wheel 85 may receive the driving force generated by the motor 84 through the gear unit 86.

The gear unit 86 may be connected to the main wheel 85 and the motor 84 to transfer the driving force of the motor 84 to the main wheel 85. The gear unit 86 may include a shaft connected to the motor 84 and the main wheel 85. A plurality of gears are installed in the gear unit 86 so as to be engaged with each other to transfer the driving force generated by the motor 84 to the main wheel 85.

The clutch member 88 may be connected to the auxiliary wheel 87 and the gear unit 86 and may transfer the driving force of the motor 84 to the auxiliary wheel 87. For example, the clutch member 88 may be configured by a magnetic clutch. The magnetic clutch may include a solenoid and may transfer the driving force to the auxiliary wheel 87 by using the magnetic force generated in the solenoid.

In another example, the clutch member 88 may receive a control signal associated with the operation of the clutch member 88 from the controller 77. The clutch member 88 may distribute the power of the main wheel 85 to the auxiliary wheel 87.

When the clutch member 88 is in an ON state, the clutch member 88 may be rotatable and may change the position of the auxiliary wheel 87.

When the mobile indoor unit 6 is in normal traveling, the clutch member 88 may be off, and the auxiliary wheel 87 may not be in contact with the ground or an obstacle. On the other hand, when the main wheel 85 of the mobile indoor unit 6 is idling or restrained by an obstacle, the clutch member 88 is turned on and the auxiliary wheel 87 may be in contact with the ground or an obstacle.

The controller 77 may control the operation of the clutch member 88 based on information related to the obstacle. Here, the information related to the obstacle may include information related to a distance between the obstacle and the body, a height, slope, shape, or surface of the obstacle, or the like. As an example, the controller 77 may control the driving portion 795 such that the auxiliary wheel 87 is in contact with the obstacle by turning on the clutch member 88 when the height of the obstacle lying in the traveling direction of the mobile indoor unit 6 is equal to or higher than a predetermined height value.

In this way, even when the main wheel 85 idles or is restrained by an obstacle while the mobile indoor unit 6 is traveling, the auxiliary wheel 87 may be driven to escape from the idling state or the restrained state.

The present invention described above may be implemented as computer readable codes on a medium on which a program is recorded. The computer readable medium includes all kinds of recording devices on which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like. In addition, the computer may include a processor 180 of a server. Accordingly, the above description should not be construed in a limiting sense in all respects and should be considered illustrative. The scope of the present invention should be determined by rational interpretation of the appended claims, and all changes within the scope of equivalents of the present invention are included in the scope of the present invention.

What is claimed is:

1. An air cleaner disposed in an indoor space, comprising:
   a blowing device including a suction port and a discharge port;
   a fan motor configured to generate an air flow;
   a purifying unit installed inside the blowing device to purify air;
   a driving portion configured to move the air cleaner;
   a communication unit configured to communicate with a moving agent moving in the indoor space; and
   a processor configured to:
      receive status information for a plurality of zones, wherein the status information includes at least one of air quality information and dust occurrence information collected by the moving agent,
      determine a specific zone among the plurality of zones in which air purification is to be performed using the status information collected by the moving agent, and
      perform air purification in the specific zone,
   wherein the processor is further configured to:
      determine zones of which an air quality is lower than a predetermined value among the plurality of zones based on the status information, and
      determine a zone closest to a current position of the air cleaner among the zones of which the air quality is lower than the predetermined value as the specific zone in which the air purification is to be performed.

2. The air cleaner of claim 1, wherein the processor is configured to:
   determine the specific zone in which air purification is to be subsequently performed based on the status information collected by the moving agent while performing air purification for a zone in which the air cleaner is currently located, and allow the driving portion to move to the specific zone when the air purification for the zone in which the air cleaner is currently located is completed.

3. The air cleaner of claim 2, further comprising:

a sensor of the air cleaner configured to collect additional status information including at least one of air quality information and dust occurrence information for the zone in which the air cleaner is currently located, wherein the processor is configured to, when an air quality of the zone in which the air cleaner is currently located is higher than the air quality of the specific zone, complete air purification for the zone in which the air cleaner is currently located and allow the driving portion to move to the specific zone.

4. The air cleaner of claim 2, wherein the processor is configured to, when the air cleaner performs air purification for a predetermined time or more for the zone in which the air cleaner is currently located or when an air quality of the zone in which the air cleaner is currently located is equal to or higher than the predetermined value, complete the air purification for the zone in which the air cleaner is currently located and allow the driving portion to move to the specific zone.

5. The air cleaner of claim 1, wherein the processor is configured to start air purification when a purification start command is received as an air quality of the indoor space deteriorates.

6. The air cleaner of claim 5, wherein the processor is configured to, when the purification start command and the status information for the specific zone are received from the moving agent, allow the driving portion to move to the specific zone, and perform the air purification.

7. The air cleaner of claim 1, wherein the processor is configured to, when the air cleaner is activated, receive the status information for the plurality of zones which is collected by the moving agent while the air cleaner is deactivated, and determine the specific zone using the status information for the plurality of zones.

8. An air cleaner disposed in an indoor space, comprising:
a blowing device including a suction port and a discharge port;
a fan motor configured to generate an air flow;
a purifying unit installed inside the blowing device to purify air;
a driving portion configured to move the air cleaner;
a communication unit configured to communicate with a moving agent moving in the indoor space;
a sensor configured to collect additional status information including at least one of air quality information and dust occurrence information for a zone in which the air cleaner is currently located; and
a processor configured to:
receive status information for a plurality of zones, wherein the status information includes at least one of air quality information and dust occurrence information collected by the moving agent,
determine zones of which an air quality is lower than a predetermined value among the plurality of zones based on the status information,
determine a first zone closest to a current position of the air cleaner among the zones determined based on the status information and a second zone in which the air cleaner is currently located,
determine a specific zone between the first zone and the second zone based on the status information and the additional status information, and
perform air purification in the specific zone.

9. The air cleaner of claim 8, wherein the processor is configured to determine a zone of which air quality is worse than the other among the first zone and the second zone as the specific zone in which air purification is to be performed when an air quality of the first zone in which the moving agent collects status information and an air quality of the second zone in which the sensor collects status information are both lower than the predetermined value or a target air quality set by a user.

10. The air cleaner of claim 8, wherein the processor is configured to, when an air quality of the first zone and an air quality of the second zone are both lower than the predetermined value or a target air quality set by a user, determine the second zone as the specific zone in which air purification is to be performed, and allow the driving portion to move to the first zone in which air purification is to be performed after the air purification for the second zone is complete.

11. The air cleaner of claim 8, wherein the plurality of zones includes a first plurality of zones in which the moving agent collects the status information and a second plurality of zones in which the sensor collects the additional status information.

* * * * *